US 6,736,007 B2

(12) United States Patent
Watanabe et al.

(10) Patent No.: US 6,736,007 B2
(45) Date of Patent: May 18, 2004

(54) ASSEMBLING METHOD FOR TIRE WHEEL ASSEMBLY AND ASSEMBLING LINE FOR TIRE WHEEL ASSEMBLY, AND WHEEL AND PRODUCTION METHOD FOR WHEEL

(75) Inventors: Shinichi Watanabe, Saitama (JP); Hisamitsu Takagi, Saitama (JP); Mikio Kashiwai, Saitama (JP); Shiro Sato, Saitama (JP); Hidemi Ichinose, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/111,380

(22) PCT Filed: Jul. 19, 2001

(86) PCT No.: PCT/JP01/06266

§ 371 (c)(1),
(2), (4) Date: Apr. 30, 2002

(87) PCT Pub. No.: WO02/36366

PCT Pub. Date: May 10, 2002

(65) Prior Publication Data

US 2002/0163245 A1 Nov. 7, 2002

(30) Foreign Application Priority Data

| Oct. 31, 2000 | (JP) | 2000-331889 |
| Dec. 1, 2000 | (JP) | 2000-366571 |
| Dec. 1, 2000 | (JP) | 2000-366572 |
| Dec. 1, 2000 | (JP) | 2000-366636 |

(51) Int. Cl.$^7$ ............................................. G01M 1/00
(52) U.S. Cl. ................................. 73/459; 301/5.21
(58) Field of Search ............................. 73/459, 460, 462, 73/468; 702/33, 41, 42, 150, 157, 173, 183, FOR 123, FOR 124, FOR 126, FOR 134, FOR 135; 301/5.21, 5.22; 74/573 R, 573 F

(56) References Cited

U.S. PATENT DOCUMENTS

| 5,211,782 A | | 5/1993 | Thelen |
| 5,271,664 A | * | 12/1993 | Fujita et al. ............... 301/5.22 |
| 5,564,792 A | * | 10/1996 | Archibald .................. 301/5.21 |
| 5,597,213 A | * | 1/1997 | Chase ....................... 301/37.43 |
| 6,286,195 B1 | * | 9/2001 | Takahashi .................. 29/407.1 |

FOREIGN PATENT DOCUMENTS

| JP | 51-92802 | 7/1976 |
| JP | 57-080901 A | 5/1982 |
| JP | 58-149202 | 10/1983 |
| JP | 1-95903 | 4/1989 |
| JP | 3-5601 | 1/1991 |
| JP | 3-9902 | 1/1991 |
| JP | 7-113715 | 5/1995 |
| JP | 11-132893 | 5/1999 |

(List continued on next page.)

Primary Examiner—Frantz F. Jules
(74) Attorney, Agent, or Firm—Armstrong, Kratz, Quintos, Hanson & Brooks, LLP

(57) ABSTRACT

A tire/wheel assembly assembling method, including a balance weight determination step, in which the weight and attachment position of a balance weight to be attached to a wheel are determined on the assumption that the minimum point of the RRO of the wheel will be phase matched with the maximum point of the RFV of a tire and based on the weight and position of the heavy point of the static unbalance of the wheel and the weight and position of the light point of the static unbalance of the tire, a balance weight attachment step, in which the balance weight is attached to the wheel based on the determined weight and attachment position, and an assembling step, in which the wheel and the tire are assembled together upon phase matching the minimum point of the RRO of the wheel with the maximum point of the RFV of the tire.

2 Claims, 31 Drawing Sheets

FOREIGN PATENT DOCUMENTS

| | | |
|---|---|---|
| JP | 11-248587 | 9/1999 |
| JP | 11-258096 | 9/1999 |
| JP | 11-258097 | 9/1999 |
| JP | 288728 A * | 10/1999 |
| JP | 11-287728 | 10/1999 |
| JP | 2000-19050 | 1/2000 |
| JP | 170843 A * | 6/2000 |
| JP | 2000-170843 | 6/2000 |

* cited by examiner

THE DIRECTION OF ROLLING

THE DIRECTION OF ROLLING

THE DIRECTION OF ROLLING

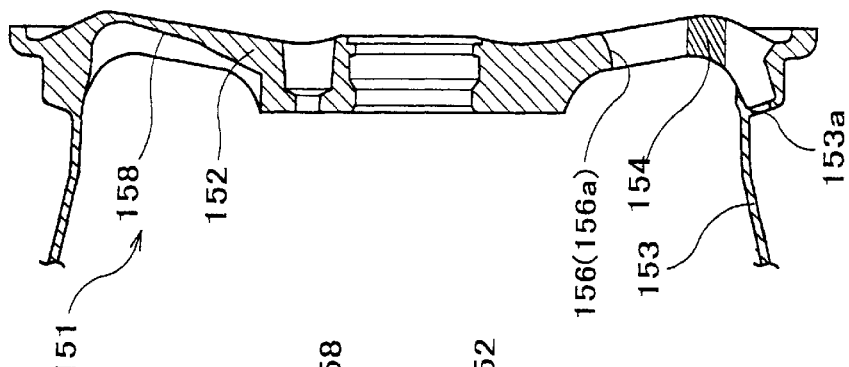
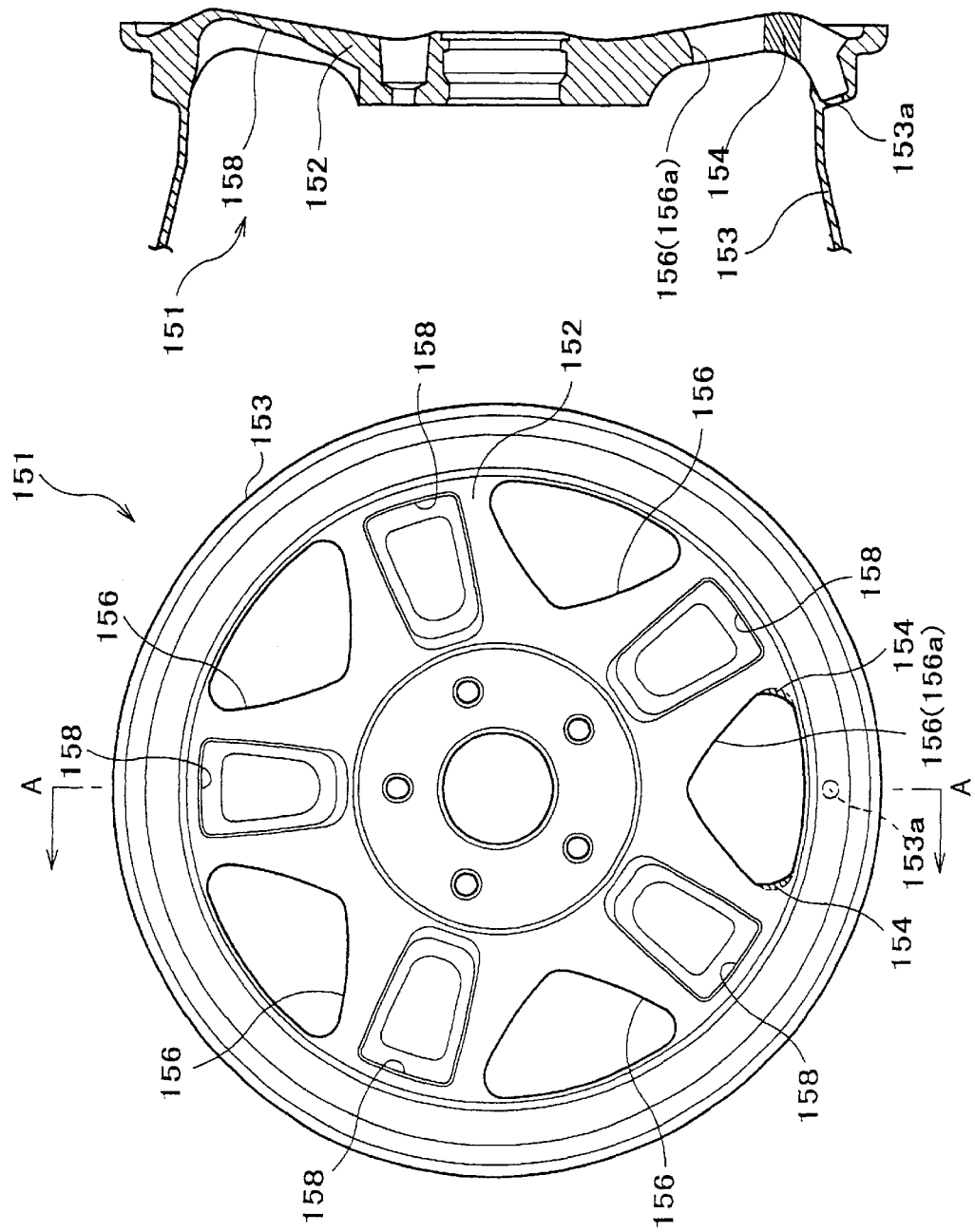

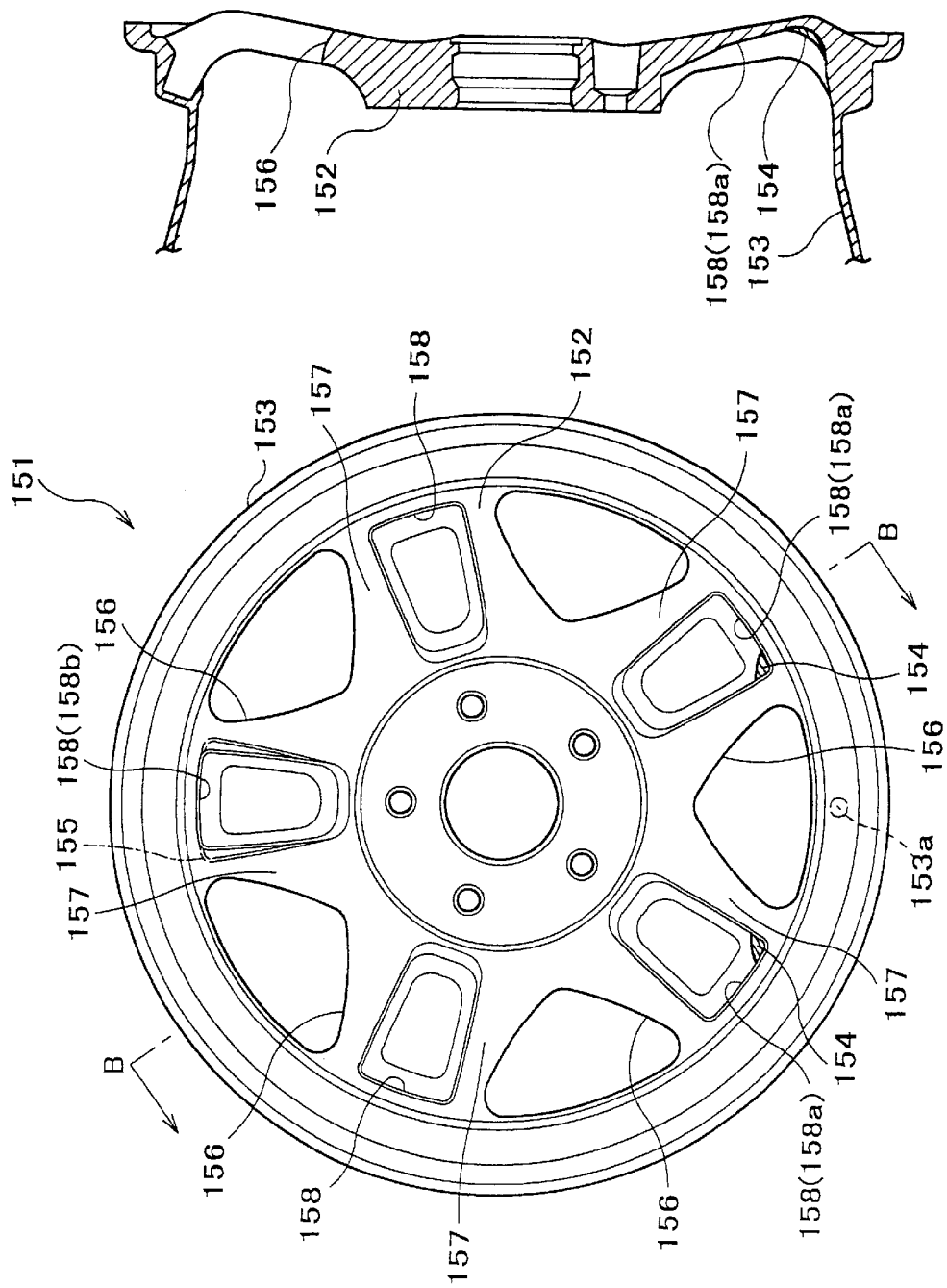

ASSEMBLING METHOD FOR TIRE WHEEL ASSEMBLY AND ASSEMBLING LINE FOR TIRE WHEEL ASSEMBLY, AND WHEEL AND PRODUCTION METHOD FOR WHEEL

BACKGROUND OF THE INVENTION

1. Field of the Invention

This invention concerns a tire/wheel assembly assembling method, a tire/wheel assembly assembling line, a wheel, and a wheel manufacturing method, which improve the working efficiency in assembling together a tire and a wheel and improve the outer appearance of the wheel.

2. Description of the Related Art

A tire/wheel assembly (car wheel) used in an automobile or other vehicle is comprised of a wheel and a tire, which is assembled onto the wheel. The wheel has an annular rim, onto which the tire is assembled, and a disk, which is welded to the rim and to which the hub of the shaft of a vehicle is fixed by means of bolts, etc.

Such wheels and tires are non-uniform in weight, dimensions, rigidity, etc. due to the scattering that occurs in the respective manufacturing processes. The uniformity of weight is referred to as balance. The condition in which balance is not achieved is called unbalance, and there is static unbalance and dynamic unbalance. Static unbalance refers to the non-uniformity of weight distribution that exists in the circumferential direction in the still condition and causes vibration of the car body in the vertical direction. Dynamic unbalance refers to the non-uniformity of weight distribution that exists in the rotating condition and causes vibration of the car body in the vertical and lateral directions as well as steering shimmy. The uniformity of the dimensions is referred to as "runout", and there is radial runout (referred to hereinafter as "RRO"), which is the runout in the radial direction (vertical runout), and lateral runout, which is the runout in the width direction (lateral runout). The uniformity of rigidity is referred to as "force variation", and there is radial force variation (referred to herein after as "RFO"), which is the variation of force in the radial direction, and lateral force variation, which is the variation of force in the width direction. Among these characteristics, a large unbalance and RFV in particular cause vibration of a vehicle. The unbalance and RFV must thus be lessened.

Balance in the direction around the rotation axis and in the direction of the rotation axis must thus be achieved with a tire/wheel assembly, in which a tire and a wheel are assembled together. However, if a wheel and tire are assembled together without consideration of the abovementioned static balance of the wheel and tire, unbalance in the direction around the rotation axis and in the direction of the rotation axis will occur. The condition in which the balance in the direction around the rotation axis is not achieved is static unbalance, and if static balance is not achieved, vibration in the vertical direction will occur during travel. The condition in which the balance in the direction of the rotation axis is not achieved is dynamic unbalance, and if dynamic balance is not achieved, vibration in the vertical and lateral directions will occur and cause steering shimmy, etc.

Since non-uniformity exists in the wheel alone and the tire alone as described above, in order to lessen the non-uniformity, the non-uniformity of the tire/wheel assembly, with which the wheel and tire are assembled together, is lessened as much as possible. Various methods are thus employed as methods of assembling a tire/wheel assembly. Two representative assembling methods shall be described below.

As a first method, there is the method of reducing the RFV of the tire/wheel assembly. With this method, a tire and a wheel are assembled together upon performing phase matching of the maximum point of the RFV of the tire with the minimum point of the RRO (so-called low point) of the wheel. By this assembling method, the tire/wheel assembly as a whole is made to approach a circular shape and the vibration in the vertical direction during the rotation of the tire/wheel assembly is reduced. Here, if the light point of the tire, which is the lightest part in the weight distribution in the circumferential direction of the tire, and the heavy point of the wheel, which is the heaviest part in the weight distribution in the circumferential direction of the wheel, are at mutually close positions, the static unbalance of the tire and the static unbalance of the wheel cancel each other out to lessen the static unbalance of the tire/wheel assembly as a whole. However, if assembly is performed with priority given to matching the direction of the maximum point of the RFV of the tire with the direction of the minimum point of RRO of the wheel as mentioned above, the light point of the tire and the heavy point of the wheel will normally not be matched and balance weights must be added further.

Thus in order to determine the weight and position of attachment of the balance weights after assembly, the tire/wheel assembly is set on an unbalance measuring device (referred to hereinafter as a "balancer") and the weight and position (angle) of the unbalance of the tire/wheel assembly are measured. After measurement, balance weights (lead, etc.), which correspond to the weight of the unbalance, are attached to the rim of the wheel at locations corresponding to the position of the unbalance to adjust the balance, and the measurement of unbalance and adjustment of the balance weights are repeated until the amount of unbalance becomes less than or equal to a fixed amount. In order to improve the efficiency of the balance weight attachment work, the position of attachment of the air valve, which becomes the heavy point, is used as a guide-line for the attachment position of the balance weights. Balance weights are normally attached at two locations at the outer side and the inner side of the wheel.

A second method is the method of lessening the unbalance of the tire/wheel assembly. With this method, the tire and wheel are assembled together upon performing phase matching of the light point of the static unbalance of the tire and the heavy point of the static unbalance of the wheel. By this assembly, the static unbalances of both the tire and wheel cancel each other out so that the static unbalance of the tire/wheel assembly as a whole is lessened and the vibration in the vertical direction during travel can be restrained. After assembly, the RFV is improved using a tire fitter. Furthermore, if unbalance still remains in the tire/wheel assembly, the weight and position (angle) of the unbalance of the tire/wheel assembly are measured using a balancer in order to lessen the unbalance. Balance weights, corresponding to the weight of the unbalance, are then attached to the rim of the wheel at locations corresponding to the unbalance.

In particular with this method, since an air valve for supplying compressed air into the tire is attached to the rim of the wheel, the weight of this air valve is taken into account and the air valve attachment position is used as the heavy point of the wheel in many cases. Thus in this case, the light point of the static unbalance of the tire is phase matched with the air valve attachment position of the wheel.

As has been described above, with both methods, the setting of the heavy point of the static unbalance of the wheel to the air valve attachment position is effective in providing a guideline for assembly that can be judged readily. However, since the weight of an air valve is not so high, in the case where the scattering of the weight distribution is large among the respective products due to manufacturing errors of the wheel body, this scattering may override the weight of the air valve and the heavy point of the wheel as a whole may not necessarily coincide with the air valve attachment position. In relation to this problem, Japanese Unexamined Patent Publication No. 2000-170843 discloses an invention of a method for making the heavy point of the static unbalance of the wheel coincident with the air valve attachment position. With this invention, for each of the members, which comprise the air valve, for example, the air valve body, the cap that covers the air inlet of the air valve, etc., a plurality of types that differ in weight are prepared in advance and the weight of the air valve itself is adjusted by selectively attaching members with appropriate weights to forcibly make the heavy point coincide with the air valve attachment position.

The casing structure of an air valve and the attachment of an air valve to a wheel shall now be described with reference to FIG. 31. FIG. 31 is a diagram, which shows the rim of a wheel and the casing structure of an air valve. The structure of the air path, etc. inside the air valve are omitted. In FIG. 31, the casing of air-valve 201 is comprised of a substantially cylindrical stem part 201a and a grommet part 201b, which is formed across a fitting groove 201c provided along the circumferential direction at one end of stem part 201a. An air inlet 201d is formed at the other end of stem part 201a and a cap 201e is attached so as to cover this air inlet 201d. Also, the surface of air valve 201 is normally covered with a synthetic rubber material. Air valve 201 is attached to the rim 200a of a wheel 200 by insertion, by making use of the resilience force of rubber, of the stem part 201a into a circular air valve attachment hole 200b, formed in rim 200a, from the side at which the tire is fitted, fitting the fitting groove 201c to the circumferential surface of air valve attachment hole 200b, and stopping grommet part 201b onto rim 200a. The stem part 201a is thus pushed into air valve attachment hole 200b in the attachment of air valve 201, and in order to prevent cutting and flawing of the surface of air valve 201, which is comprised of synthetic rubber material, the outer and inner circumferential edge parts 200c of air valve attachment hole 200b is subject to burr removal and other forms of so-called "edge treatment" in advance, and normally, cutting of the edge is performed using a machine tool, etc. However, since wheel 200 is a large part, a wide occupied space had to be secured for the edge treatment process, and since as can be understood from FIG. 31, air valve attachment hole 200b is made within a narrow step formed on rim 200a, the cutting by a machine tool for edge treatment was difficult and required special tools and jigs.

The problems of the above-described two assembly methods shall now be described.

With the first of the above-described methods, though the RFV is lessened after assembly of the tire and wheel, since there is no correlation between the static unbalance and the RRO of the wheel, a large unbalance remains in the weight distribution of the tire/wheel assembly. Large balance weights must thus be attached to the wheel in order to lessen this unbalance. As a result the large balance weights cause the manufacturing cost to increase and the outer appearance of the tire/wheel assembly to become poor, thus causing the commercial value to drop, etc.

With the second of the above-described methods, though the unbalance is lessened after assembly of the tire and the wheel, since there is no correlation between the static unbalance and the RRO of the wheel, a large RFV remains and causes vibration during travel. This RFV must thus be lessened by use of a tire fitter, etc. Furthermore, though the balance weights to be attached will be smaller with this second method, since balance weights still have to be attached, the problem of outer appearance still remains. Especially in the case where the heavy point of the static unbalance of the wheel is set to the air valve attachment position, since the heavy point will not necessarily coincide with the air valve attachment position, an unbalance will remain in the weight distribution of the tire/wheel assembly.

A plurality of types that differ in weight must thus be prepared as mentioned above for the members that comprise the air valve in order to forcibly make the heavy point of static unbalance coincide with the air valve attachment position. In this case, there will be problems in terms of economy and control of parts, and due to the trouble of having to select members of appropriate weights for each tire/wheel assembly, there is also a problem in terms of efficiency of the balance adjustment work. It is therefore desirable to be able to make the heavy point of static unbalance coincide with the air valve attachment position using just standard specification items and without having to prepare a plurality of types of air valves according to weight. It is also preferable with regard to the air valve attachment hole to enable omission or simplification of the edge treatment process.

Moreover, with the above-described two assembly methods, the weight and position of unbalance of the tire/wheel assembly must be measured using a balancer in order to attach balance weights after assembly of the tire and wheel. The balance adjustment work thus becomes a troublesome work with many processes, requires extremely many manhours, and is poor in working efficiency. It is therefore desirable for the balance weights to be as small as possible and for balance weights not to be attached where possible, and in the case where balance weights must be attached, it is desirable to be able to specify the attachment locations without having to measure the balance.

In the case of aluminum wheels, since a balance weight is attached to the inner circumferential side of the rim of a wheel, there is also the problem that the clearance between the balance weight and the brake device becomes small.

An object of this invention is therefore to resolve the above problems by providing a tire/wheel assembly assembling method, a tire/wheel assembly assembling line, a wheel, and a wheel manufacturing method, which improve the working efficiency in the assembling of a tire and a wheel and improve the outer appearance of the wheel.

SUMMARY OF THE INVENTION (1) This invention provides a tire/wheel assembly assembling method, which is a method of assembling a tire/wheel assembly with which a tire and a wheel are assembled together, and is comprised of a balance weight determination step, in which the weight and attachment position of a balance weight to be attached to the abovementioned wheel are determined on the assumption that the minimum point of the RRO of the abovementioned wheel will be phase matched with the maximum point of the RFV of the abovementioned tire and based on the weight and position of the heavy point of the static unbalance of the abovementioned wheel and the weight and position of the light point of the static unbalance of the abovementioned tire, a balance weight attachment step, in which a balance weight of the weight determined in the abovementioned balance weight determination step is attached to the attachment position of the abovementioned wheel that was determined in the abovementioned balance weight determination step, and an assembling step, in which the abovementioned wheel and the abovementioned tire are assembled together upon phase matching the minimum point of the RRO of the abovementioned wheel with the maximum point of the RFV of the abovementioned tire.

With this tire/wheel assembly assembling method, by phase matching of the minimum point of the RRO of the wheel and the maximum point of the RFV of the tire, the large force in the radial direction of the tire is absorbed by dimensional variations in the radial direction of the wheel. Furthermore with this method, by attachment of a balance weight to the wheel in the balance weight attachment step, the unbalance of the tire/wheel assembly is lessened. Also with this method, a balance weight can be mounted, based on the weight and position of the balance weight determined in the balance weight determination step, to the outer circumferential surface of the rim of the wheel prior to assembling the wheel and the tire together, and when the balance weight is attached at such a position, the balance weight will be covered by the tire in the tire/wheel assembly.

This invention also provides a tire/wheel assembly assembling line, which is an assembling line for a tire/wheel assembly, with which a tire and wheel are assembled together, and is comprised of a wheel marking process, in which the minimum point of the RRO of the abovementioned wheel is marked, a tire marking process, in which the maximum point of the RFV of the abovementioned tire is marked, a balance weight determination process, in which the weight and attachment position of a balance weight to be attached to the abovementioned wheel are determined on the assumption that the minimum point of the RRO of the abovementioned wheel will be phase matched with the maximum point of the RFV of the abovementioned tire and based on the weight and position of the heavy point of the static unbalance of the abovementioned wheel and the weight and position of the light point of the static unbalance of the abovementioned tire, a balance weight attachment process, in which a balance weight of the weight determined in the abovementioned balance weight determination process is attached to the attachment position of the abovementioned wheel that was determined in the abovementioned balance weight determination process, and an assembling process, in which the abovementioned wheel and the abovementioned tire are assembled together upon phase matching the abovementioned marked position of the wheel with the abovementioned marked position of the tire.

With this tire/wheel assembly assembling line, by phase matching of the minimum point of the RRO of the wheel with the maximum point of the RFV of the tire in the assembling process, the RFV of the tire/wheel assembly is lessened. Furthermore with this assembling line, by attachment of a balance weight to the wheel in the balance-weight attachment process, the unbalance of the tire/wheel assembly is lessened, and the unbalance measurement process and balance weight attachment process subsequent assembly are eliminated. Also with this assembling line, since a balance weight can be mounted, based on the weight and position of the balance weight determined in the balance weight determination process, to the wheel in the balance weight attachment process prior to the assembling process, the balance weight can be mounted at the outer circumferential surface of the rim of the wheel, which becomes covered by the tire after the assembling process.

Phase matching refers to the matching of the direction of a predetermined point along the circumferential direction of the tire with the direction of a predetermined point in the circumferential direction of the wheel with the centers of the tire and the wheel being matched.

(2) This invention also provides a wheel, which is adjusted in balance in accordance to a tire, based on the three data of the unbalance amount −g of the light point of the abovementioned tire, the maximum RRO amount +δ of the abovementioned tire, and the phase θ from the abovementioned light point to the direction of the abovementioned RRO amount +δ, and which is characterized in that the phase from the heavy point of the abovementioned wheel to the direction of the minimum point of the RRO of the abovementioned wheel is θ, the minimum RRO amount of the abovementioned wheel is −δ, and the unbalance amount of the abovementioned heavy point is +g.

This invention also provides a tire/wheel assembly assembling method, which is a method of assembling the abovementioned balance-adjusted wheel and the abovementioned tire together and is characterized in that the assembly is performed to make the abovementioned light point and the abovementioned heavy point be of the same phase.

With such a wheel and tire/wheel assembly assembling method, by assembling so that the light point of the tire and the heavy point of the wheel are matched, the unbalance amount −g of the light point and the unbalance amount +g of the heavy point are canceled out so that the static unbalance will be substantially eliminated. Also, the RRO amount +δ of the tire at a position that is shifted in phase from the light point by the amount θ and the RRO amount −δ of the minimum point of the wheel at a position that is shifted in phase from the heavy point by the amount θ are made the same in phase and thus made to cancel each other out so that the vertical runout of the tire/wheel assembly as a whole will be made small. The static unbalance can thus be minimized while minimizing the vertical runout in the condition where the tire and wheel are assembled together even if the static balance is not adjusted afterwards by use of a balance weight.

That the unbalance amount of the heavy point of the wheel is +g shall mean that the unbalance amount of the heavy point is +g in the condition where an air valve has been attached.

Also, the amounts of +g and −g and +δ and −δ, etc. do not have to be matched strictly and may differ slightly within a range in which the tire/wheel assembly will be satisfactory as a product.

This invention also provides a wheel manufacturing method, which is a method of manufacturing a wheel that is adjusted in balance in accordance to a tire, based on the three data of the unbalance amount −g of the light point of the abovementioned tire, the maximum RRO amount +δ of the abovementioned tire, and the phase θ from the abovementioned light point to the direction of the abovementioned RRO amount +δ, and which is characterized in that after measurement of the minimum point of the RRO of the wheel, a trimming process is performed on the wheel so that the heavy point, with an unbalance amount of +g, is positioned in the direction that is shifted by −θ in phase with respect to the measured minimum point of RRO.

With a wheel obtained by this manufacturing method, by performing assembly upon matching the light point of a tire with the heavy point of the wheel, the unbalance amount −g of the light point and unbalance amount +g of the heavy point are made to cancel each other out, thereby substantially eliminating the static unbalance. Also, the maximum point of RRO of the tire at a position that is shifted in phase from the light point by the amount θ and the minimum point of RRO of the wheel at a position that is shifted in phase from the heavy point by the amount θ are made the same in phase and thus made to cancel each other out so that the vertical runout of the tire/wheel assembly as a whole will be made small. The static unbalance can thus be minimized while minimizing the vertical runout in the condition where the tire and wheel are assembled together even if the static balance is not adjusted afterwards by use of a balance weight.

This invention also provides a wheel manufacturing method, which is a method of manufacturing a wheel that is adjusted in balance in accordance to a tire, based on the three data of the unbalance amount −g of the light point of the abovementioned tire, the maximum RRO amount +δ of the abovementioned tire, and the phase θ from the abovementioned light point to the direction of the abovementioned RRO amount +d , and which is characterized in that after cutting of the outer circumference of the wheel in a decentering manner such that the minimum RRO amount of the wheel will be −δ, a trimming process is performed on the wheel so that the heavy point with an unbalance of +g, will be positioned in the direction that is shifted by −θ in phase with respect to the minimum point of RRO of the abovementioned wheel.

A wheel that is obtained by this manufacturing method can be made a wheel with which the minimum point of RRO, that is, the minimum point of the vertical runout amount, is matched with the vertical runout of the tire and the measurement of the minimum point of RRO of the wheel is unnecessary. Also, by performing assembly upon matching the light point of the tire with the heavy point of the wheel, the unbalance amount −g of the light point and the unbalance amount +g of the heavy point are made to cancel each other out, thereby substantially eliminating the static unbalance. Also, the RRO amount +δ of the tire at a position that is shifted in phase from the light point by the amount θ and the RRO amount −δ of the minimum point of the wheel at a position that is shifted in phase from the heavy point by the amount θ are made the same in phase and thus made to cancel each other out so that the vertical runout of the tire/wheel assembly as a whole will be made small. The static unbalance can thus be minimized while minimizing the vertical runout in the condition where the tire and wheel are assembled together even if the static balance is not adjusted afterwards by use of a balance weight.

Furthermore, in an above-described wheel manufacturing method, an air valve attachment hole may be bored in the direction that is shifted in phase by −θ from the abovementioned minimum point of RRO of the wheel.

With a wheel obtained by this manufacturing method, since the heavy point of the wheel will be in the direction of the air valve attachment hole, a worker who assembles a tire and a wheel together can eliminate the static unbalance in the condition where the tire and wheel are assembled simply by performing assembly upon matching the air valve and the light point of the tire by using the air valve as a guideline at the heavy point, and since the maximum point of RRO of the tire and the minimum point of RRO of the wheel are made the same in phase and thus made to cancel each other out, the static unbalance can be minimized while minimizing the vertical runout in the condition where the tire and wheel are assembled together.

Here, phase shall refer to the angle formed by two directions that are directed from the center of a tire or wheel to the positions of two predetermined points along the circumference, side surface, etc. of the tire or wheel.

Also with the above-described wheel manufacturing method, setting the unbalance amount equal to +g shall mean that the unbalance amount is set equal to +g in the condition where an air valve is attached to the wheel.

Also, since the phases of the primary peaks of the RRO and RFV of a tire are highly correlated, the manufacturing of a wheel using the maximum point of RRO of the tire as a guideline is equivalent to practicing the above-described manufacturing method using the position of the primary peak of RFV as a guideline.

(3) This invention also provides in a wheel, which is formed by joining a rim and a cup-like disk, which is fitted to the inner diameter of the abovementioned rim, a wheel with which the balance is adjusted by the provision of trimmed shape and/or augmented shapes at the fitting part of the abovementioned cup-like disk.

With this wheel, since the disk will be light in the direction in which the trimmed shapes are provided, a wheel of the desired balance can be made by providing trimmed shapes of the desired amount. Moreover, since a part of the disk that will be fitted to the inner surface of the rim and will be hidden from the exterior will be trimmed or augmented to adjust the balance, a wheel that is adjusted to the desired balance can be made without affecting the outer appearance of the wheel.

Since an air valve for putting air into a tire will be attached to the rim of a wheel, the rim will tend to be heavy in the direction of the air valve. The balance of the wheel and air valve as a whole must thus be adjusted in consideration of the contribution of the air valve and air valve attachment hole to the weight balance.

This invention also provides in a wheel, which is formed by joining a rim and a cup-like disk, which is fitted to the inner diameter of the abovementioned rim, a wheel with which the balance is adjusted by making the direction, as viewed from the center of the abovementioned disk, of the air valve attachment hole provided in the abovementioned rim be matched with the direction of trimmed shapes provided at the fitting part of the abovementioned disk or by making the abovementioned direction of the air valve attachment hole be shifted by 180 degrees with respect to the direction of augmented shapes provided at the fitting part of the abovementioned disk.

With this wheel, since the unbalance due to the weight of the air valve and the unbalance due to the trimmed shapes or augmented shapes cancel each other out, the unbalance of the wheel as a whole can be made to approach zero. As a result, a balance weight to be attached after assembly with the tire can be made small to thereby improve the outer appearance of the wheel.

This invention also provides in a wheel, which is formed by joining a rim and a cup-like disk, which is fitted to the inner diameter of the abovementioned rim, a wheel with which the balance is adjusted by making the direction, as viewed from the center of the abovementioned disk, of the air valve attachment hole provided in the abovementioned rim be shifted by 180 degrees with respect to the direction of trimmed shapes provided at the fitting part of the abovementioned disk or by making the abovementioned direction of the air valve attachment hole be matched with the direction of augmented shapes provided at the fitting part of the abovementioned disk.

With this wheel, since the air valve direction is made relatively heavy by the joint effect of the unbalance due to the air valve attached to the rim and the unbalance due to the trimmed shapes or augmented shapes, the heavy point of the wheel can always be set in the direction of the air valve. The direction of the air valve can thus be used as a guideline for the heavy point of the wheel, enabling the work of adding a balance weight to be made efficient.

Here, joining may be performed by any method by which the rim and disk can be joined without damaging the function of the wheel, and various known methods, for example, welding, brazing, bolting, adhesion by adhesive agent, etc., may be used.

(4) This invention also provides a wheel with which an annular air valve seat is fitted and fixed inside an air valve attachment hole, which has been bored in the rim, and an air valve is attached to the abovementioned air valve seat.

With this wheel, edge treatment can be performed according to each air valve seat and the occupied space required for the edge treatment process can be reduced. Simplification or omission of the edge treatment is also enabled.

Furthermore, the abovementioned air valve seat of the above-described wheel may be arranged from a material that is greater in specific gravity than the material of the main body of the wheel.

With such a wheel, the heavy point of the static unbalance of the wheel can be matched with the air valve attachment position, and since the air valve can be arranged from just standard specification items, the wheel will be more economical and excellent in the efficiency of adjustment work in comparison to the case where the weight of the air valve itself is adjusted as in the prior art.

(5) This invention also provides a wheel characterized in that augmented shapes or trimmed shapes, corresponding to a predetermined weight, are provided in a localized manner when the wheel is in the condition of a net-shape part in the manufacturing process and the adjustment of the weight balance is enabled by these augmented shapes or trimmed shapes.

With this wheel, a wheel that has the desired weight balance can be made, without damaging the outer appearance, simply by partial design changes of the mold that is used to manufacture the wheel. In particular, it becomes possible to match the heavy point of the static unbalance with the air valve attachment position without fail even in the case where the scattering of the weight distribution is large among the respective products due to manufacturing errors, etc. of the wheel. The weight balance adjustment process of the tire/wheel assembly can thus be simplified.

(6) This invention also provides in a wheel, comprised of a circular disk, which can be fixed to the hub of the shaft of a vehicle, and a rim, which is fixed to the peripheral part of the disk and onto which a tire is assembled, a wheel having an arrangement wherein the balance is adjusted by providing the disk with openings for setting the heavy point position of the abovementioned wheel at a position away from the center of the abovementioned disk.

With this wheel, openings are formed in the disk to enable the setting of the heavy point position of the wheel at a predetermined position by adjustment of the sizes, positioning intervals, etc. of the openings. Since the checking work, etc. of the heavy point of the wheel in the assembling of the tire/wheel assembly can thus be simplified, the working efficiency of the balance adjustment work can be improved. Also, though when openings are formed, the weight of the disk will be reduced by the amount corresponding to the sizes of the openings, in the case where the openings are made at equal intervals in the circumferential direction of the disk, the weight balance of the disk will not change since the weight reductions due to the respective openings will cancel each other out. However, when the sizes, positioning intervals, etc. of the openings are varied, the weight balance of the disk is disrupted, forming regions that are lighter in weight than other parts and regions that are heavier in weight than other parts. Thus by selection of the sizes and positioning intervals of the openings, a heavy point, which is a portion that is relatively heavy in weight, can be formed at the desired position. Also, by attaching an air valve for inflating the tire at a position corresponding to the position of the heavy point thus formed, the checking of the heavy point position of the wheel is facilitated.

Furthermore with the abovementioned wheel, a plurality of openings may be formed at equal intervals in the circumferential direction of the disk and the opening areas of a part of the openings may be made smaller than the opening areas of other openings.

With this wheel, since a region in which openings that are smaller in diameter than other openings will be heavier by the amount corresponding to the differences in opening area, the heavy point of the wheel can be formed in the region in which the small-diameter openings were formed. Here, in the case where the difference in the sizes of the openings is small, the heavy point of the wheel can be adjusted without damaging the outer appearance.

Or with the above-described wheel, a plurality of openings may be formed at equal intervals in the circumferential direction of the disk and the distance between centers of a part of the adjacent openings may be made shorter than the distance between centers of other adjacent openings.

With this wheel, since a region in which openings with the longer distance between centers are formed will be heavier than other regions, the heavy point of the wheel can be positioned in the region in which openings with the longer distance between centers are formed.

Also with the above-described wheel, the openings may be formed at equal intervals along the circumference of a circle that is centered at a position that is decentered from the center of the disk.

With this wheel, since a region in which many openings are formed and a region in which few openings are formed can be formed in the disk by forming the openings along the circumference of a circle having the center at a position that is deviated from the center of the disk, the heavy point can be positioned in a region in which the number of openings formed is small.

BRIEF DESCRIPTION OF THE DRAWINGS

FIG. 23 shows the case where augmented shapes are provided at the decorative holes of a wheel of Embodiment 5 of this invention, with FIG. 23A being a side view of the wheel as viewed from the rear side and FIG. 23B being a sectional view along line A—A of FIG. 23A.

FIG. 24 shows the case where augmented shapes are provided at the indented parts of the rear surface of the spokes of a wheel of Embodiment 5 of this invention, with FIG. 24A being a side view of the wheel as viewed from the rear side and FIG. 24B being a sectional view along line B—B of FIG. 24A.

DETAILED DESCRIPTION OF THE PREFFERED EMBODIMENTS

Embodiments of the tire/wheel assembly assembling method, tire/wheel assembly assembling line, wheel, and wheel manufacturing method according to this invention shall now be described with reference to the drawings of embodiments.

(Embodiment 1)

First, as Embodiment 1, an embodiment of a tire/wheel assembly assembling method and a tire/wheel assembly assembling line shall be described with reference to FIG. 1 through FIG. 6.

Figure 1A:
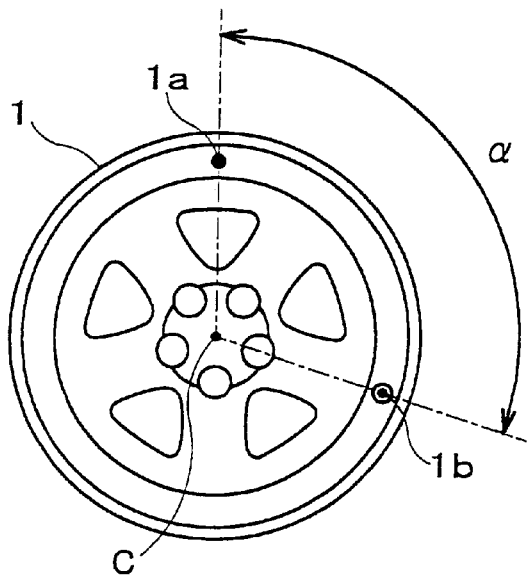
FIG. 1 shows a wheel and a tire, related to Embodiment 1 of this invention, in the condition prior to assembly, with FIG. 1A being a front view of the wheel and FIG. 1B being a front view of the tire.
Figure 1B:
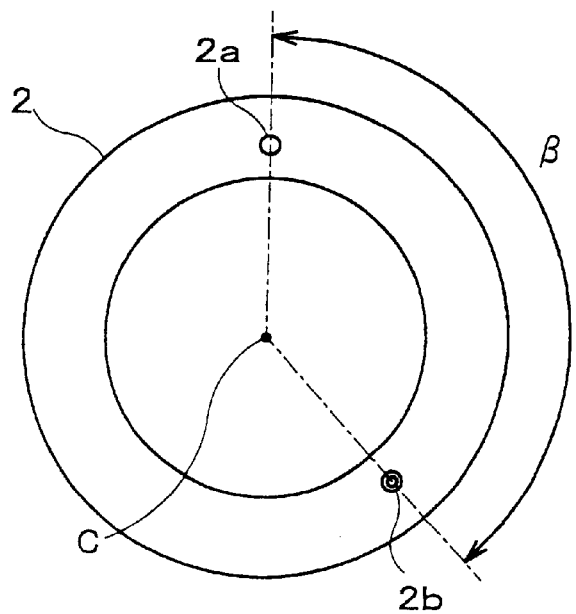
Figure 3:
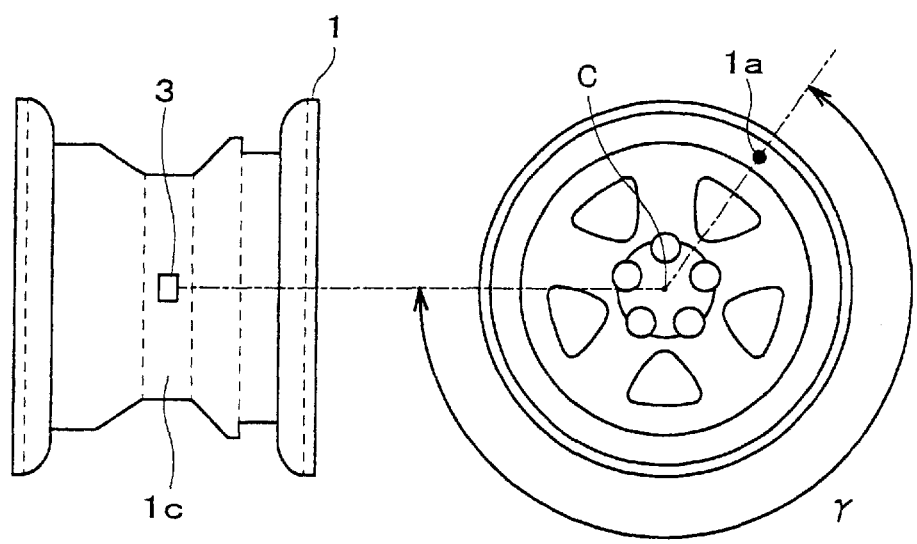
FIG. 3 shows a side view and a front view of the wheel to which a balance weight has been attached prior to assembly according to Embodiment 1 of this invention.
Figure 4:
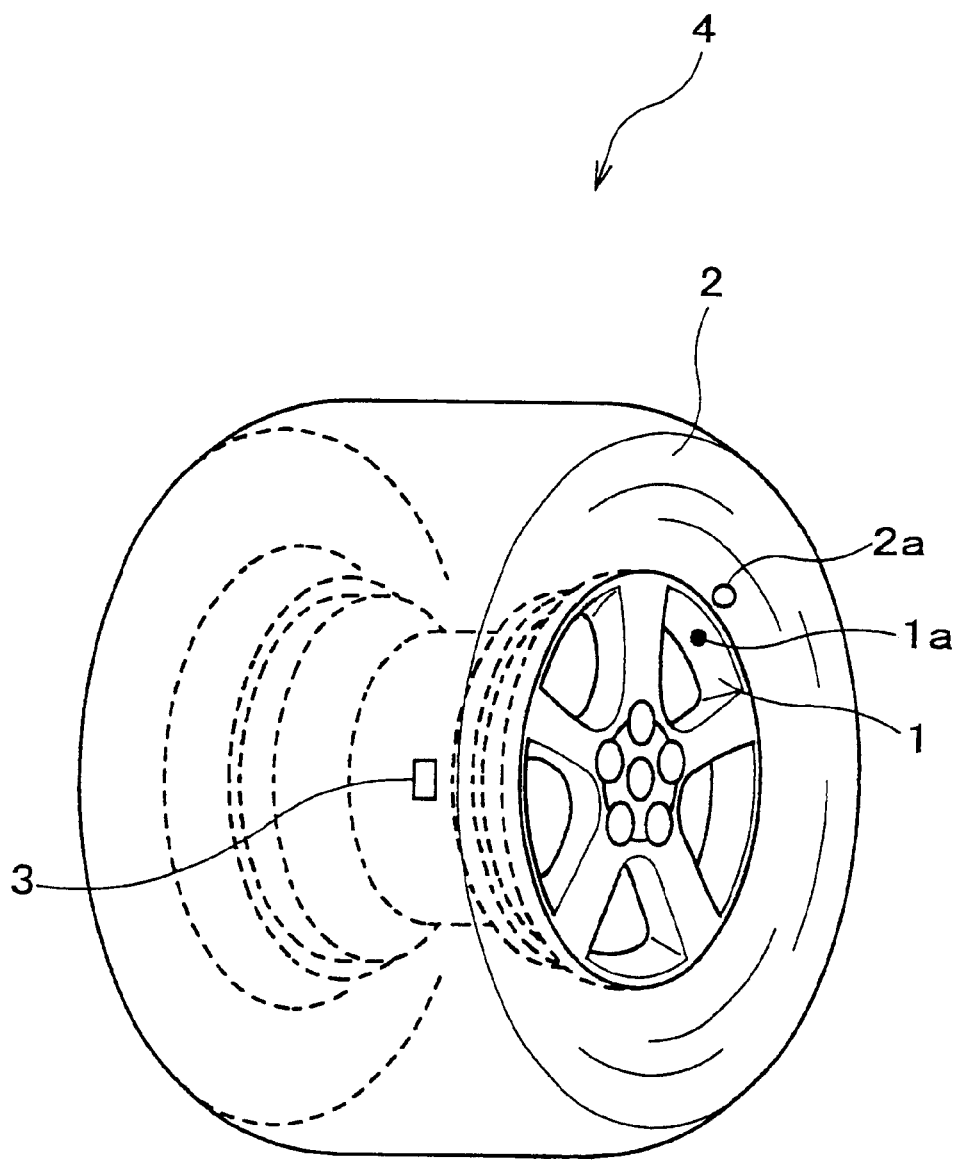
FIG. 4 is a perspective view of the tire/wheel assembly related to Embodiment 1 of this invention.
Figure 5:
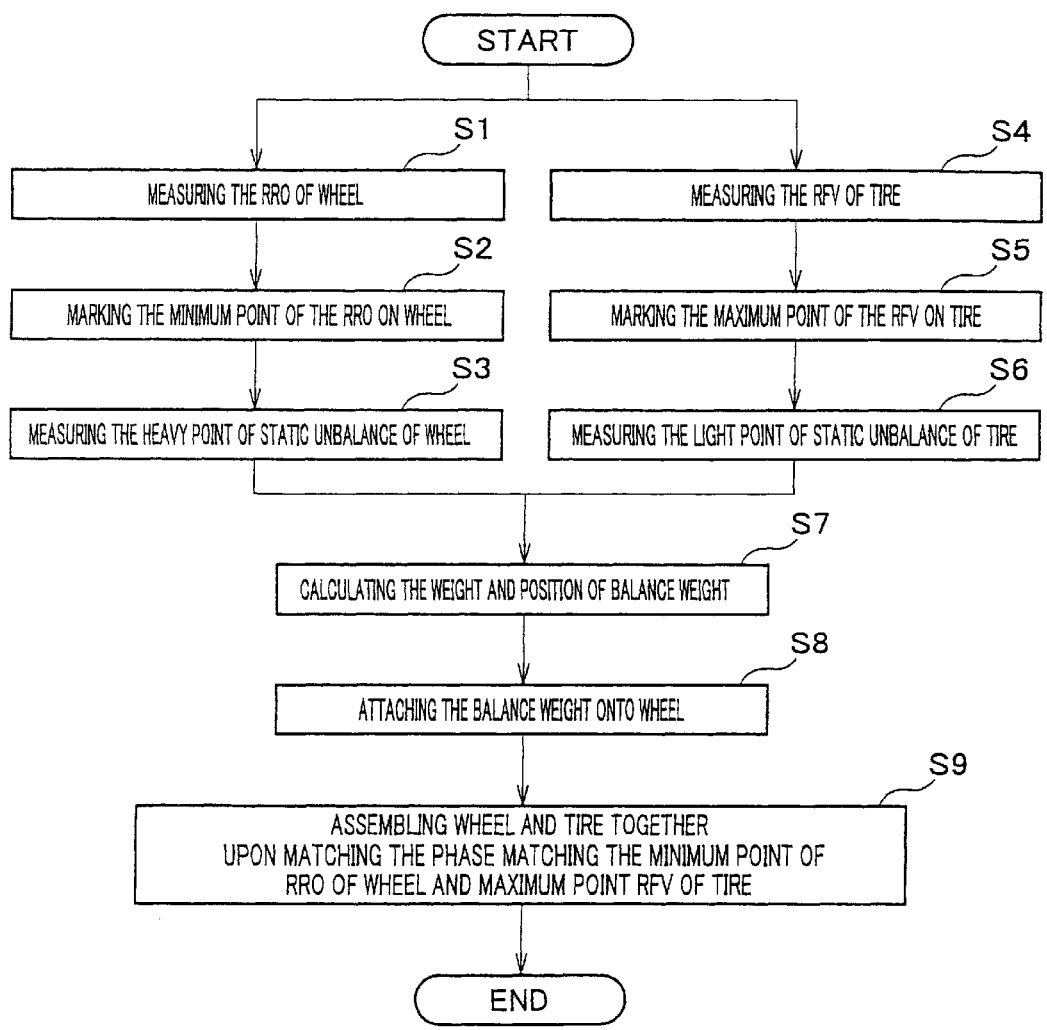
FIG. 5 is a flowchart of the tire/wheel assembly assembling method of Embodiment 1 of this invention.
Figure 6:
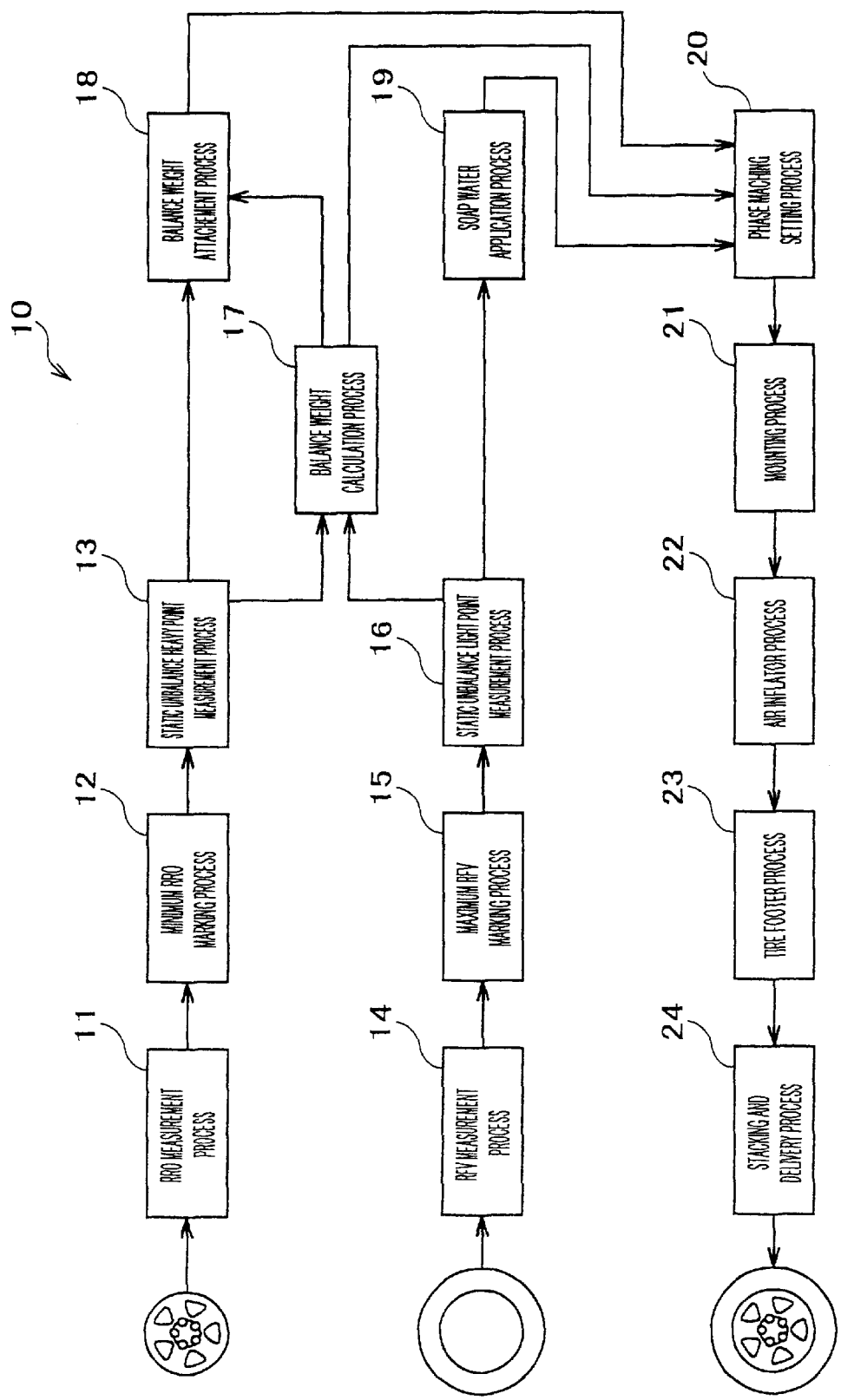
FIG. 6 is a block diagram of the tire/wheel assembly assembling line of Embodiment 1 of this invention.

FIG. 1 shows a wheel and a tire prior to assembly, with FIG. 1A being a front view of the wheel and FIG. 1B being a front view of the tire. FIGS. 2A, 2B, 2C and 2D show a front view, and respectively show steps in the condition where the wheel and tire have been phase matched in the balance weight determination. FIG. 3 shows a side view and a front view of the wheel to which a balance weight has been attached prior to assembly. FIG. 4 is a perspective view of the tire/wheel assembly. FIG. 5 is a flowchart of the tire/wheel assembly assembling method. FIG. 6 is a block diagram of the tire/wheel assembly assembling line.

With the tire/wheel assembly assembling method of this Embodiment 1, the weight and attachment position of a balance weight are determined prior to assembling the wheel and tire together and the balance weight is attached to the wheel prior to assembly in order to lessen the unbalance of the tire/wheel assembly. Furthermore with this assembly method, the wheel and tire are assembled together upon performing phase matching of the minimum point of the RRO of the wheel and the maximum point of the RFV of the tire in order to lessen the RFV of the tire/wheel assembly. With this assembly method, since the balance weight can be attached to the outer circumferential surface of the rim of the wheel prior to assembling the wheel and tire together, the appearance quality of the tire/wheel assembly will be improved. The tire/wheel assembly assembling line of Embodiment 1 is an assembling line that has been arranged based on the assembling method of Embodiment 1.

The heavy point of the static unbalance of a wheel is the point that is indicated as being a heavy part in the weight distribution of the wheel when the wheel is measured by a wheel balancer in the still condition. The light point of the static unbalance of a wheel is the point that is indicated as being a light part in the weight distribution of the wheel when the wheel is measured by a wheel balancer in the-still condition.

With Embodiment 1, the inner sides of the wheel and the tire are the sides, in the direction of the widths of the wheel and tire, of attachment to a vehicle The outer sides of the wheel and tire are the sides, in the direction of the widths of the wheel and tire, at which the tire and wheel are not attached to a vehicle.

The method assembling a tire/wheel assembly shall now be described in line with the flowchart of FIG. 5 and with reference to FIG. 1 and FIGS. 2A–2D.

Prior to assembling the wheel 1 and tire 2, wheel 1 is subject alone to pretreatment. That is, a wheel is manufactured by a die cast device using steel, aluminum, etc. as raw materials. The wheel 1 that is manufactured by this method will have non-uniformity of weight, dimensions, etc. even when manufactured at high precision.

With wheel 1, the position of the minimum point of the RRO is marked in order to perform phase matching with the maximum point of the RFV of tire 2. The radial direction (vertical direction) runout along the outer circumferential surface of the rim of wheel 1 are thus measured using an RRO measuring device (not shown) (S1). The point (minimum point) at which the radial direction runout is the smallest within a single rotation of wheel 1 is thus specified. In other words, the minimum point of the RRO of wheel 1 is the point of wheel 1 at which the radius is the shortest. A phase matching seal 1a is then adhered onto this specified minimum point of wheel 1 (S2). The color of phase matching seal 1a may be the same as or may differ from the color of a phase matching seal 2a to be adhered onto tire 2.

Furthermore, in order to calculate the weight and attachment position (angle) of a balance weight 3, wheel 1 is subject to the measurement of the weight and position (angle) of the heavy point of static unbalance. The weight of the static unbalance is thus measured across a single rotation of wheel 1 using a wheel balancer (not shown), and the greatest weight and the point 1b at which this weight is indicated are specified (S3). The position of the heavy point of static unbalance of wheel 1 is defined by a clockwise angle $\alpha$ from the minimum point of RRO of wheel 1.

Meanwhile, tire 2 is also subject to pretreatment prior to the assembling together of wheel 1 and tire 2. This pretreatment performed on tire 2 is performed in parallel to the pretreatment performed on wheel 1. Though a tire has a simple, donut-like shape, it is a composite material product comprised of textile, steel wire, rubber, etc., and a large portion is formed by hand. A tire thus has non-uniformity of weight, dimensions, rigidity, etc.

In order to perform phase matching with the minimum point of the RRO of wheel 1, the position of the maximum point of the RFV of tire 2 is marked. The radial direction force is thus measured along the outer circumferential surface of tire 2 using an RFV measuring device (not shown) (S4). The point (maximum point) at which the radial direction force is the greatest within a single rotation of tire 2 is thus specified. In other words, the maximum point of the RFV of tire 2 is the point of tire 2 at which the radial direction force is the greatest. A phase matching seal 2a is then adhered onto this specified maximum point of tire 2 (S5).

Furthermore, in order to calculate the weight and attachment position (angle) of balance weight 3, tire 2 is subject to the measurement of the weight and position (angle) of the light point of static unbalance. The weight of the static unbalance is thus measured across a single rotation of tire 2 using a tire balancer (not shown), and the lightest weight and the point 2b at which this weight is indicated are specified (S6). The position of the light point of static unbalance of tire 2 is defined by a clockwise angle $\beta$ from the maximum point of RFV of tire 2.

The weight and position (angle) of attachment to wheel 1 of the balance weight 3 to be attached to wheel 1 is then calculated (S7). This calculation method shall now be described with reference to FIGS. 2A–2D. With the assembling method of Embodiment 1, wheel 1 and tire 2 are assembled together upon phase matching the minimum point of RRO of wheel 1 with the maximum point of RFV of tire 2. Thus the calculation of the weight and attachment position of balance weight 3 is premised on the attachment of balance weight 3 onto a tire/wheel assembly 4, with which the minimum point of RRO of wheel 1 and the maximum point of RFV of tire 2 are phase matched. That is, calculation is performed on the assumption of the condition where the positions of phase matching seal 1a and phase matching seal 2a have been matched and by setting the fundamental axis AX (0°) to the straight line that joins the center C of tire/wheel assembly 4, the minimum point of RRO of wheel 1, and the maximum point of RFV of tire 2.

Figure 2A:
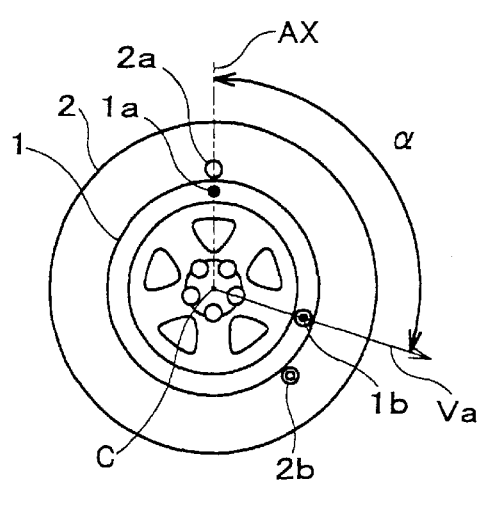
FIGS. 2A, 2B, 2C and 2D show a front view and respective steps for phase matching the wheel and tire in the balance weight determination of Embodiment 1 of this invention.

First a vector Va of a direction, corresponding to the position of the heavy point of wheel 1, and a length, corresponding to the weight of the heavy point of wheel 1, is drawn with center C as the origin (see FIG. 2A). Since the position of the heavy point of wheel 1 is defined by the clockwise angle $\alpha$ from the minimum point of RRO of wheel 1, the direction of a vector Va will be the direction of clockwise angle $\alpha$ from the fundamental axis AX.

Figure 2C:
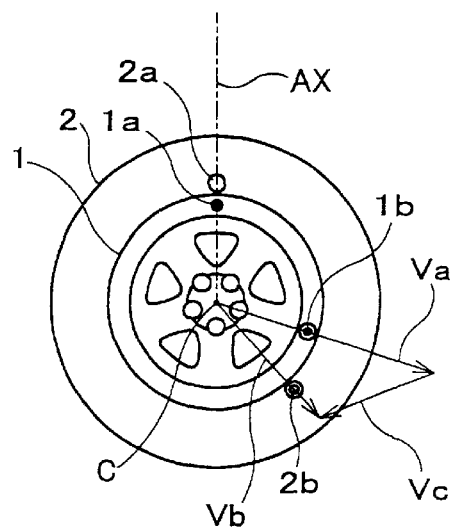
Figure 2B:
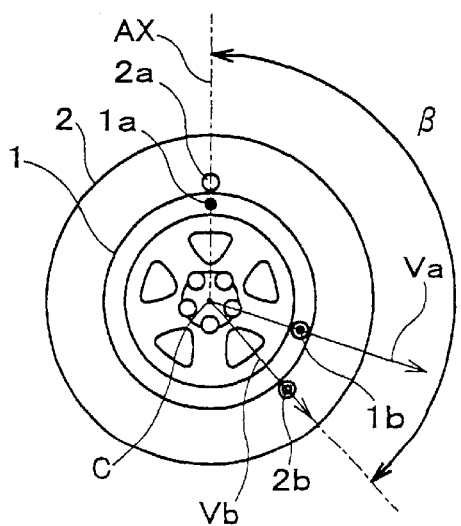

Next, a vector Vb of a direction, corresponding to the position of the light point of tire 2, and a length, corresponding to the weight of the light point of tire 2, is drawn with center C as the origin (see FIG. 2B). Since the position of the light point of tire 2 is defined by the clockwise angle $\beta$ from the maximum point of RFV of tire 2, the direction of a vector Vb will be the direction of the clockwise angle $\beta$ from the fundamental axis AX.

A vector Vc is then drawn from the endpoint of a vector Va to the endpoint of a vector Vb (see FIG. 2C).

Figure 2D:
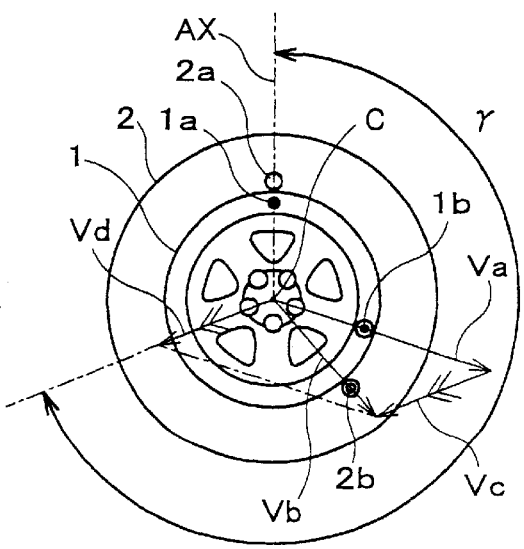

Lastly, a vector Vd of a direction and length that are the same as those of a vector Vc is drawn with center C as the origin (see FIG. 2D). That is, the vector Vd, which is parallel to a vector Vc, is drawn with center C as the origin. The weight corresponding to the length of this vector Vd is then calculated and this weight is set as the weight of balance weight 3 to be attached to wheel 1. Also, the clockwise angle $\gamma$ from fundamental axis AX, which corresponds to the direction of a vector Vd, is used to define the attachment position of balance weight 3 to be attached to wheel 1. With wheel 1, balance weight 3 is attached to the outer circumferential surface 1c of the rim at a position of clockwise angle $\gamma$ from the minimum point of RRO of wheel 1 (see FIG. 3).

Balance weight 3 is then attached to wheel 1 in order to lessen the unbalance of tire/wheel assembly 4 (S8). Balance weight 3 is attached, based on the weight and attachment position of balance weight 3 determined by calculation, to the outer circumferential surface 1c of the rim of wheel 1 prior to assembling wheel 1 and tire 2 together. That is, in the attachment of balance weight 3, balance weight 3 of the weight determined by calculation is attached to the center in the width direction of outer circumferential surface 1c of the rim of wheel 1 at the position of clockwise angle $\gamma$ from the minimum point of RRO of wheel 1 (see FIG. 3).

Since the outer circumferential surface 1c of the rim of wheel 1 will be covered by tire 2 when tire 2 is assembled onto wheel 1, outer circumferential surface 1c is a surface that cannot be-seen from the exterior of tire/wheel assembly 4. Thus when tire 2 is assembled onto wheel 1 to which balance weight 3 is attached, balance weight 3 cannot be viewed from the exterior of tire/wheel assembly 4. Furthermore, since balance weight 3 can be attached to the center in the width direction of outer circumferential surface 1c of the rim of wheel 1, there is no need to attach balance weights at two locations at the inner side and outer side of the wheel as in the prior art. That is, the unbalance of tire/wheel assembly 4 can be lessened by attaching balance weight 3, which has been averaged for the inner and outer sides, just at one location at the center in the width direction of outer circumferential surface 1c of the rim of wheel 1. Also, even in the case where wheel 1 is an aluminum wheel, since balance weight 3 is attached to the outer circumferential surface 1c of the rim of wheel 1, there is no need to attach a balance weight onto the inner circumferential surface of the rim of the wheel as in the prior art. Thus with tire/wheel assembly 4, the clearance between the brake device will not be made small by balance weight 3.

Next, in order to lessen the RFV of tire/wheel assembly 4, wheel 1 and tire 2 are assembled together upon matching the positions of phase matching seal 1a of wheel 1 and phase matching seal 2a of tire 2 (S9). The assembled tire/wheel assembly 4 will thus be in the condition where the phases of the minimum point of the radial direction runout of wheel 1 and the maximum point of the variation of the radial direction force of tire 2 are matched. Since the large radial direction force of tire 2 alone will thus be absorbed by the indented portion in the radial direction of wheel 1 alone, the RFV of tire/wheel assembly 4 will be lessened.

When wheel 1 and tire 2 are assembled together, the static unbalance of tire/wheel assembly as a whole will be lessened by balance weight 3. This is because the weight and attachment position of balance weight 3 were determined, based on the heavy point of wheel 1 and the light point of tire 2, as the optimal weight and attachment position for canceling out the static unbalance of wheel 1 alone and the static unbalance of tire 2 alone. Thus when wheel 1 and tire 2 are assembled together, the non-uniformity of the weight distribution of tire/wheel assembly 4 is lessened by the relationship of the weight and position of the heavy point of wheel 1, the weight and position of the light point of tire 2, and the weight and position of balance weight 3.

With this method of assembling tire/wheel assembly 4, the RFV of tire/wheel assembly 4 is lessened by assembling wheel 1 and tire 2 upon phase matching the minimum point of RRO of wheel 1 with the maximum point of RFV of tire 2. Furthermore with this assembling method, by attaching balance weight 3 to the outer circumferential surface 1c of the rim of wheel 1 prior to assembly, the static unbalance of tire/wheel assembly 4 is lessened and the outer appearance of tire/wheel assembly 4 is improved. Furthermore, since the static unbalance, which is a cause of dynamic unbalance, is lessened, the dynamic unbalance of tire/wheel assembly 4 is also lessened.

The tire/wheel assembly assembling line shall now be described with reference to FIG. 6. FIG. 1 through FIG. 5 shall also be referenced where necessary. The tire/wheel assembly assembling line (shall be referred to hereinafter as "assembling line") 10 is an assembling line that has been organized based on the above-described tire/wheel assembly assembling method. With this description of assembling line 10, detailed description concerning the items described in the above description of the assembling method shall be omitted.

Assembling line 10 is comprised of a process to be performed on wheel 1 alone, a process to be performed on tire 2 alone, a process to be performed on wheel 1 and tire 2 (or tire/wheel assembly 4), and a calculation process. The process to be performed on wheel 1 alone and the process to be performed on tire 2 alone are processes that are carried out separately and are processes that are carried out prior to the process to be performed on wheel 1 and tire 2 (or tire/wheel assembly 4). The calculation process is a process that is carried out based on the data obtained in each of the process performed on wheel 1 alone and the process performed on tire 2 alone.

The process to be performed on wheel 1 alone is comprised of an RRO measurement process 11, a minimum RRO marking process 12, a static unbalance heavy point measurement process 13, and a balance weight attachment process 18.

First in RRO measurement process 11, the RRO of wheel 1 is measured using an RRO measuring device (not shown) and the position of the minimum point of RRO of wheel 1 is specified.

Then in minimum RRO marking process 12, phase matching seal 1a is adhered onto the position of the minimum point of RRO of wheel 1 that was specified in RRO measurement process 11.

Subsequently in static unbalance heavy point measurement process 13, the static unbalance of wheel 1 is measured using a wheel balancer (not shown) and the weight and the position (clockwise angle α from the minimum point of RRO) of the heavy point of static unbalance of wheel 1 are specified. Then in static unbalance heavy point measurement process 13, the specified weight and position data of the heavy point of static unbalance of wheel 1 are sent, along with an identification number (for example, the serial number, etc.) provided uniquely to wheel 1, to balance weight calculation process 17.

Then in balance weight attachment process 18, a balance weight 3 is attached to the center in the width direction of the outer circumferential surface 1c of the rim of wheel 1 based on the data on the weight and attachment position (clockwise angle γ from the minimum point of RRO) of balance weight 3, which were determined in balance weight calculation process 17. The wheel 1 to which balance weight 3 is attached is distinguished by the identification number that is unique to wheel 1. The weight and attachment position data of balance weight 3 are sent, along with the identification number unique to wheel 1, from balance weight calculation process 17.

The process to be performed on tire 2 alone is comprised of an RFV measurement process 14, a maximum RFV marking process 15, a static unbalance light point measurement process 16, and a soap water application process 19.

First in RFV measurement process 14, the RFV of tire 2 is measured using an RFV measuring device (not shown) and the position of the maximum point of RFV of tire 2 is specified.

Then in maximum RFV marking process 15, phase matching seal 2a is adhered onto the position of the maximum point of RFV of tire 2 that was specified in RFV measurement process 14.

Subsequently in static unbalance light point measurement process 16, the static unbalance of tire 2 is measured using a tire balancer (not shown) and the weight and the position (clockwise angle β from the maximum point of RFV) of the light point of static unbalance of tire 2 are specified. Then in static unbalance light point measurement process 16, the specified weight and position data of the light point of static unbalance of tire 2 are sent, along with an identification number (for example, the serial number, etc.) provided uniquely to tire 2, to balance weight calculation process 17.

Furthermore, in soap water application process 19, a soap water is applied to the periphery of tire 2 which is fitted onto wheel 1 to make tire 2 slippery for fitting onto the rim of wheel 1.

The calculation process is comprised of the balance weight calculation process 17. In balance weight calculation process 17, a personal computer or other electronic calculator (not shown) is used. A program for calculating the weight and attachment position (angle) of balance weight 3 by the above-described calculation method is incorporated in this electronic calculator. This program is a program that calculates the weight and attachment position (clockwise angle γ with respect to the minimum point of RRO) of balance weight 3 based on the weight and position (clockwise angle α with respect to the minimum point of RRO) of the heavy point of static unbalance of wheel 1 and the weight and position (clockwise angle β with respect to the maximum point of RFV) of the light point of static unbalance of tire 2.

In balance weight calculation process 17, the program is started up on the electronic calculator, and the weight and attachment position of balance weight 3 are calculated upon input of the weight and position data of the heavy point of static unbalance of wheel 1 and the weight and position data of the light point of static unbalance of tire 2 into the electronic calculator. Then in balance weight calculation process 17, the unique identification number of wheel 1 and the unique identification number of tire 2 are controlled in a corresponded manner in order to assemble together, in a subsequent process, the wheel 1 and tire 2 on which the calculation of the weight and attachment position of balance weight 3 is based. Furthermore in balance weight calculation process 17, the calculated weight and attachment position data of balance weight 3 are sent, along with the identification number unique to wheel 1, to balance weight attachment process 18. Also in balance weight calculation process 17, the data that are put in a corresponding relationship to the identification number unique to wheel 1 and the identification number unique to tire 2 are sent to a phase matching setting process 20.

The process to be performed on wheel 1 and tire 2 (or tire/wheel assembly 4) is comprised of phase matching setting process 20, mounting process 21, air inflator process 22, tire fitter process 23, and stacking and delivery process 24.

First, in phase matching setting process 20, wheel 1 and tire 2 are respectively selected based on the data that are put in a corresponding relationship to the identification number unique to wheel 1 and the identification number unique to tire 2. Then in phase matching setting process 20, the positions of the phase matching seal 1a of wheel 1 and the phase matching seal 2a of tire 2 are matched and then wheel 1 and tire 2 are set in a mounting device (not shown).

Then in mounting process 21, tire 2 is fitted onto the rim of wheel 1 by means of the mounting device.

Subsequently in air inflator process 22, air is injected into tire/wheel assembly 4 by means of an air inflator (not shown).

Then in tire fitter process 23, the side face of tire 2 is hit by a tire fitter (not shown) to release the air that is trapped between the flange of the rim of wheel 1 and the outer side surface of tire 2. By thus improving the sealing property of the fitted parts of wheel 1 and tire 2, the RFV of tire/wheel assembly 4 is lessened further. Lastly in stacking and delivery process 24, tire/wheel assembly 4 is stacked and delivered.

With this assembling line 10, since balance weight 3 is attached priorly to the outer circumferential surface 1c of the rim of wheel 1 in the balance weight attachment process 18, the outer appearance of tire/wheel assembly 4 is improved and the need for performing an unbalance measurement process and a balance weight attachment process after assembly of wheel 1 and tire 2 together is eliminated. Also with assembling line 10, the RFV of tire/wheel assembly 4 is lessened by the phase matching setting process 20, etc. and the unbalance of tire/wheel assembly 4 is also lessened by balance weight attachment process 18, etc.

Though a description of Embodiment 1 of this invention has been given above, the tire/wheel assembly assembling method and assembling line of this invention are not limited to Embodiment 1 and may be put into practice in various forms. For example, though a seal was adhered as a means of marking, the application of ink or other means may be performed instead.

Embodiment 2

Figure 7:
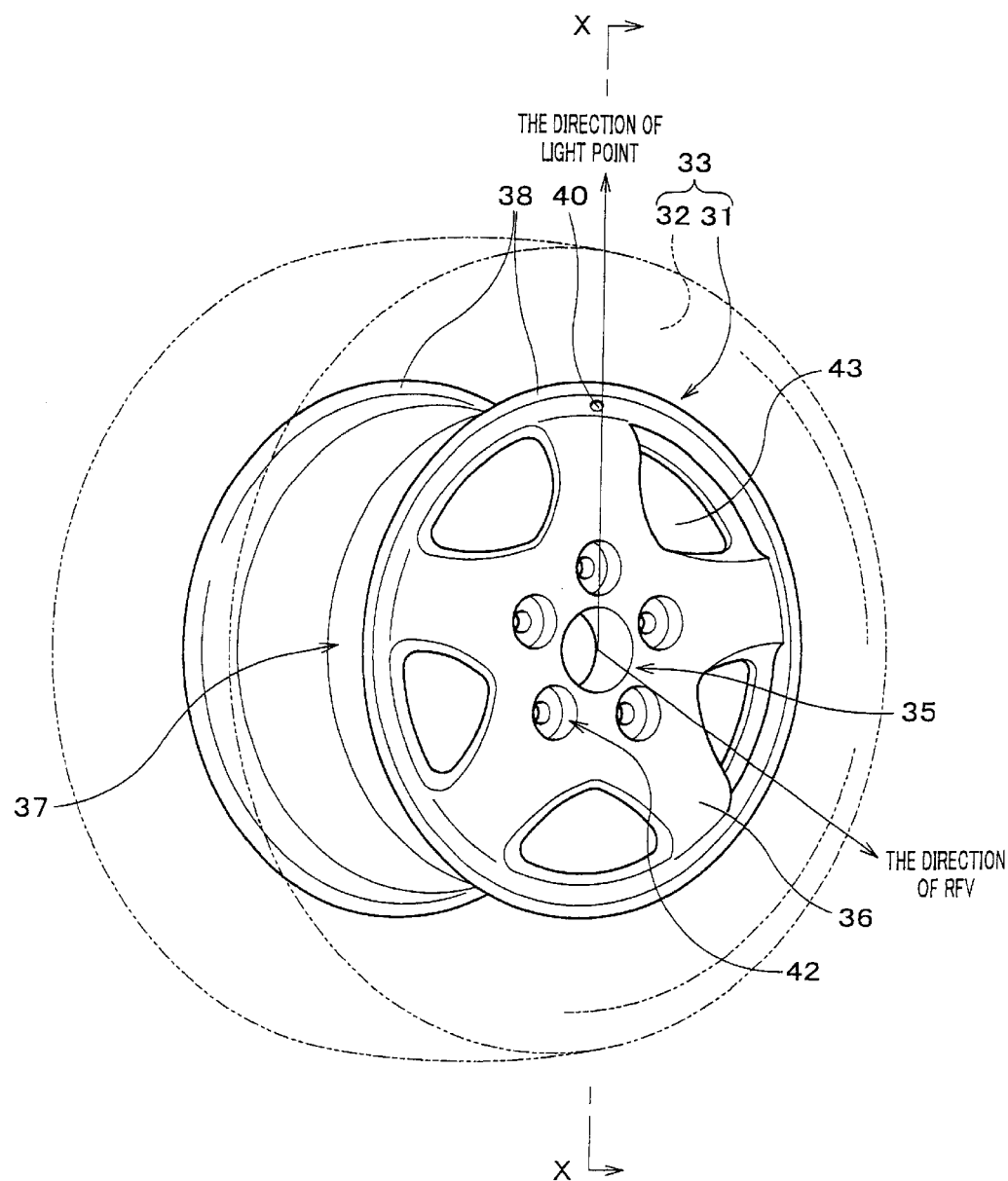
FIG. 7 is a perspective view of a wheel that has been adjusted in balance according to Embodiment 2 of this invention.
Figure 8:
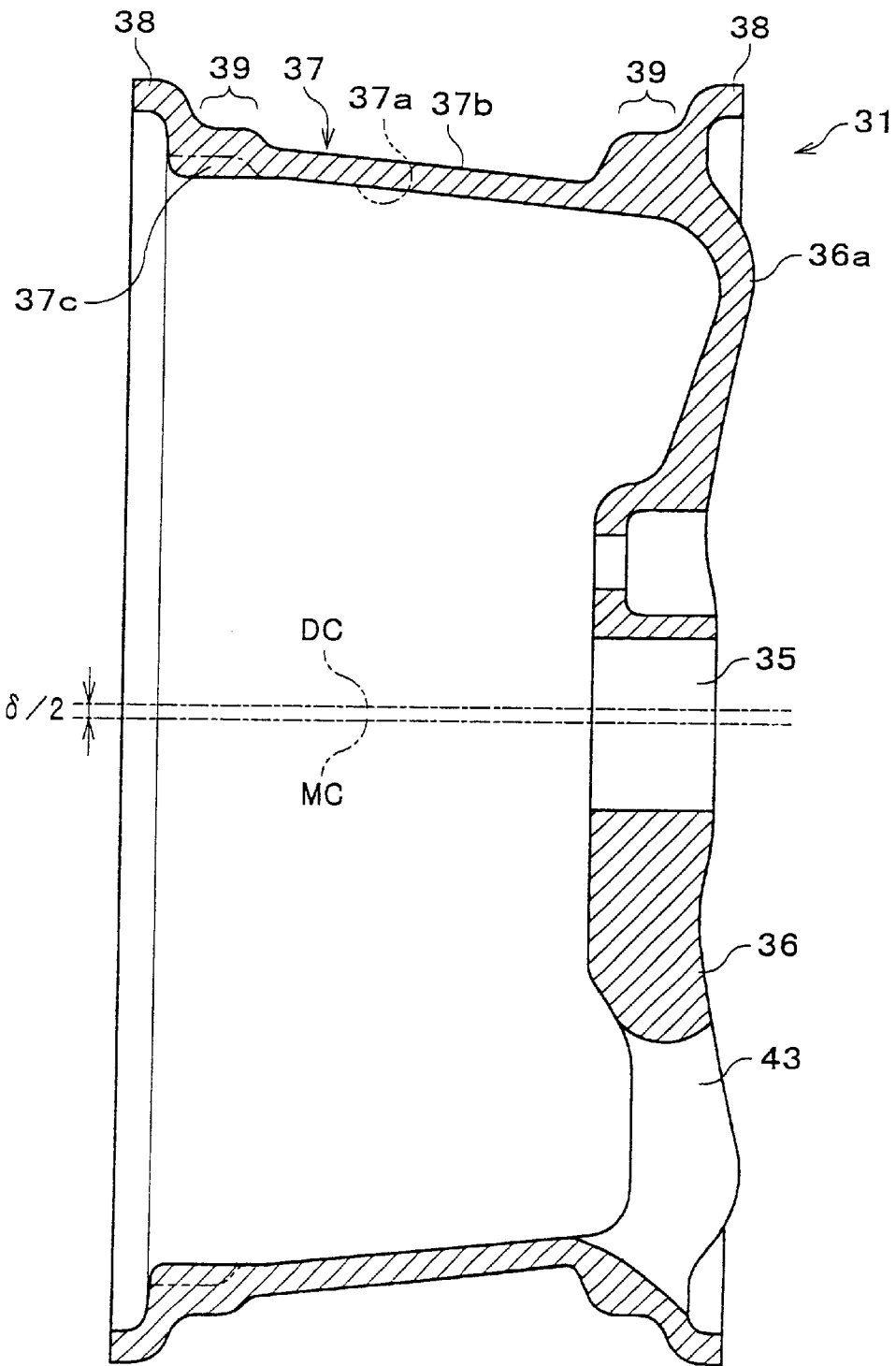
FIG. 8 is a sectional view along line X—X of FIG. 7.
Figure 9:
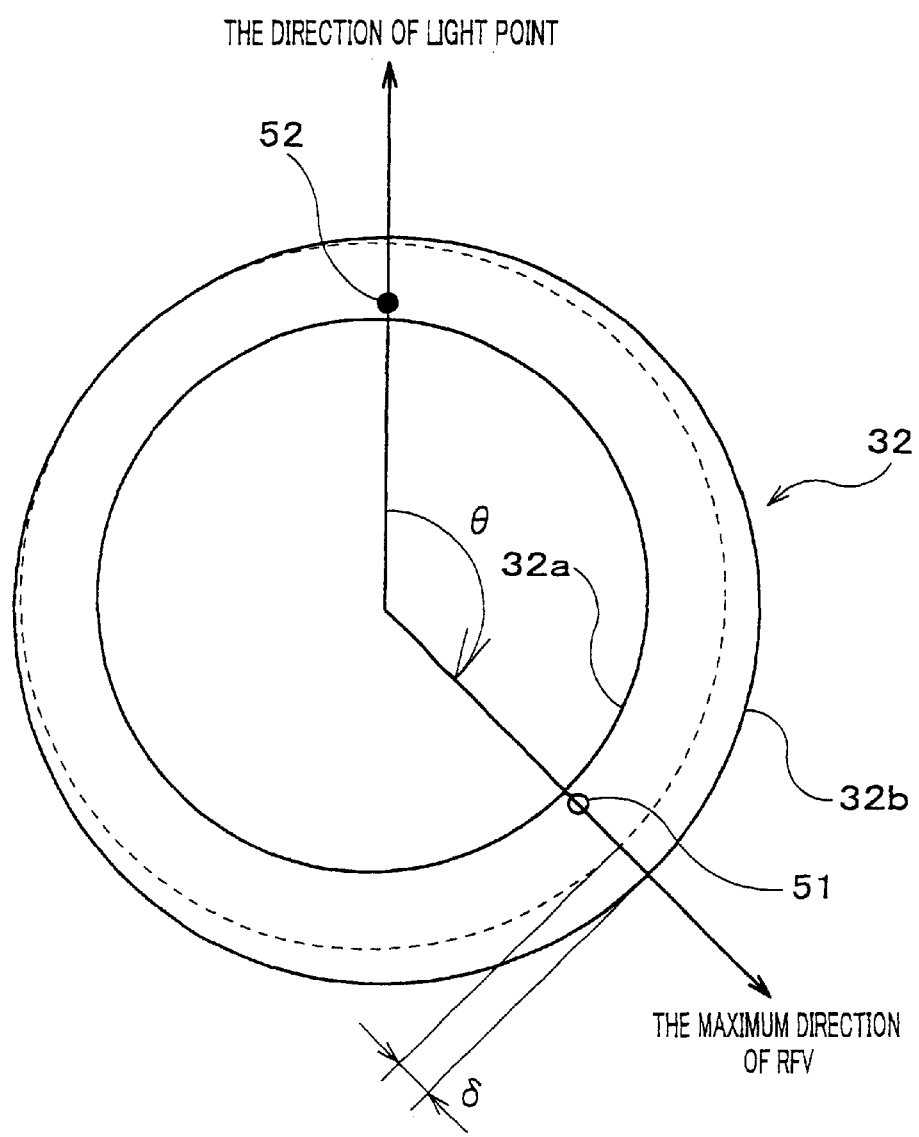
FIG. 9 is a side view of a tire related to Embodiment 2 of this invention.
Figure 10A:
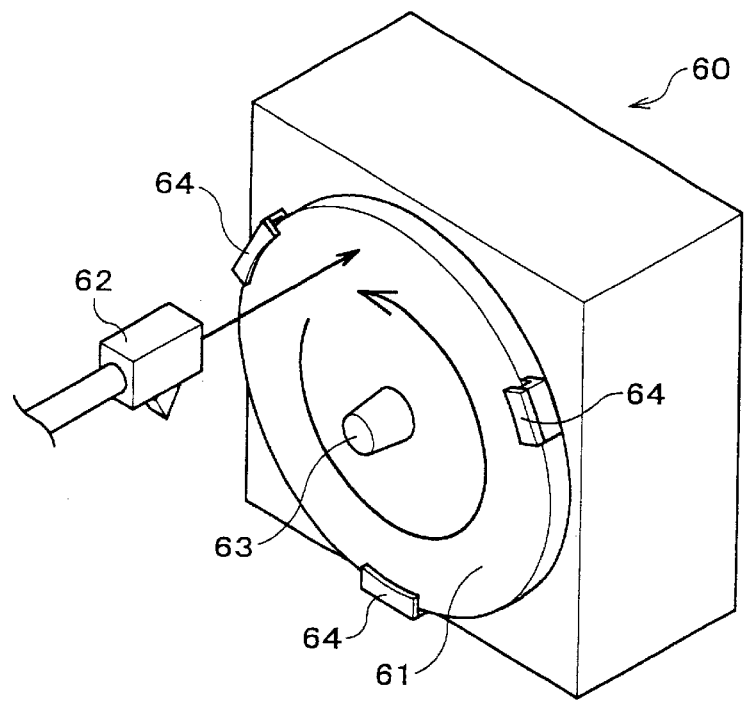
FIG. 10A is a perspective view of a machine tool for machining a net-shape part and FIG. 10B is a partially enlarged sectional side view of the machine tool.
Figure 10B:
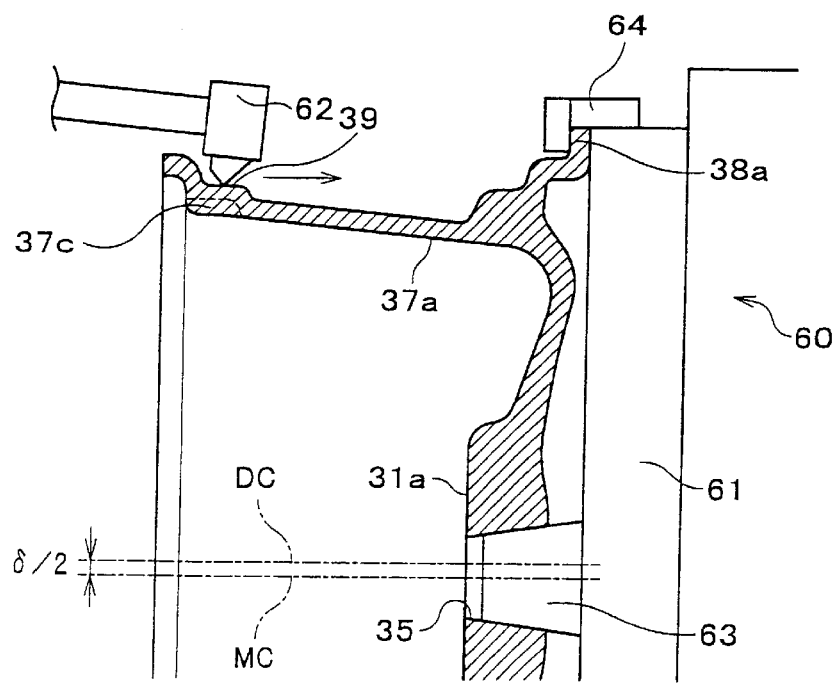
Figure 11:
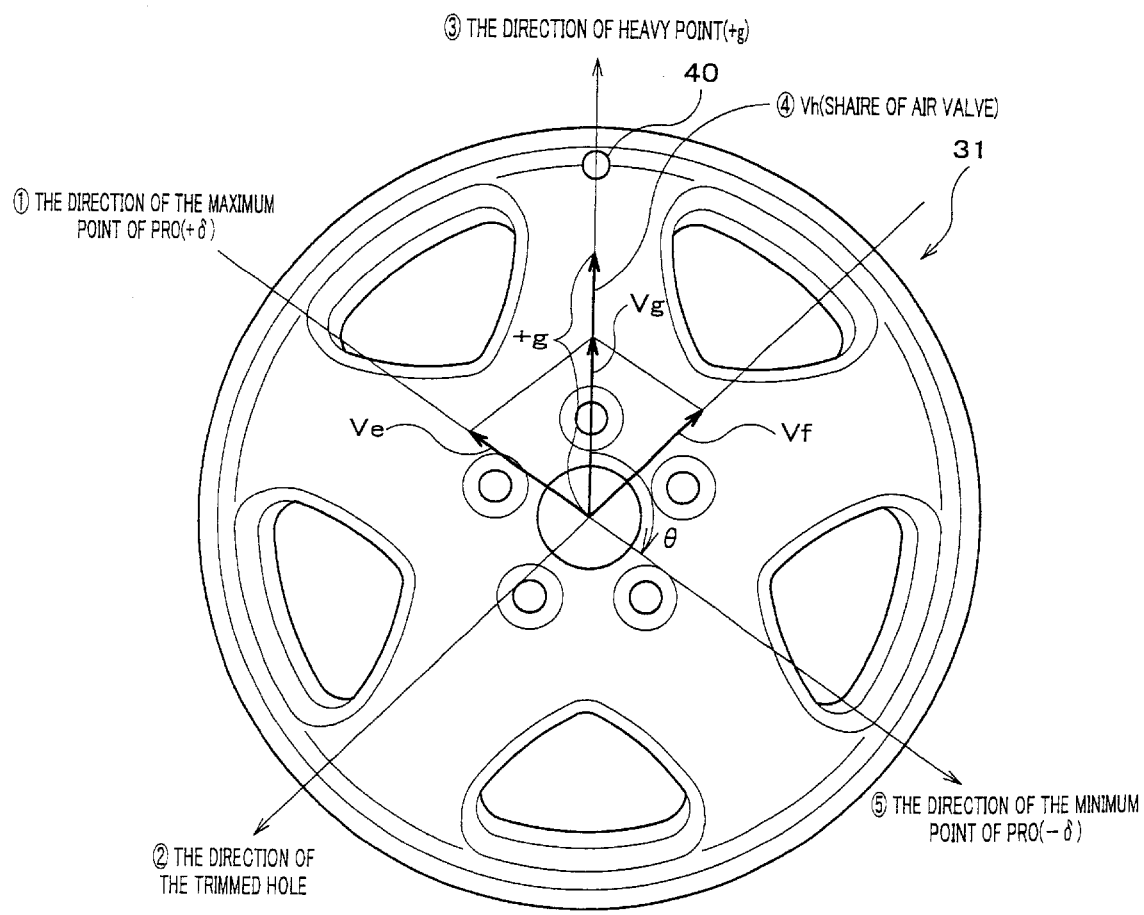
FIG. 11 is a side view of the wheel of Embodiment 2 of this invention.

Next, as Embodiment 2, an embodiment of a wheel, wheel manufacturing method, and tire/wheel assembly assembling method according to this invention shall be described with reference to FIG. 7 through FIG. 11. FIG. 7 is a perspective view of a wheel that has been adjusted in balance. FIG. 8 is a sectional view along line X—X of FIG. 7. FIG. 9 is a side view of a tire. FIG. 10A is a perspective view of a machine tool for machining a net-shape part and FIG. 10B is a partially enlarged sectional side view of the machine tool. FIG. 11 is a side view of the wheel.

As shown in FIG. 7, wheel 31 is made of aluminum alloy or other light alloy and has a saucer-like disk 36, having a center hole 35, which is the center part for fixing onto the hub, at its central part, and a substantially cylindrical rim 37, onto which a tire 32 is assembled. Though with Embodiment 2, wheel 31 is described as being manufactured integrally from a light alloy, the embodiment may be applied to the case where disk 36 and rim 37 are separate parts (two pieces) and the case where the wheel is comprised of three pieces. Wheel 31 may also be manufactured from stainless steel or other material.

Disk 36 has formed near center hole 35, bolt insertion holes 42 for insertion of the bolts of the hub and tightening by nuts. Also, a plurality of cooling holes 43 are formed so as to surround center hole 35 at the peripheral part 36a (see FIG. 8) of disk 36. Cooling holes 43 are holes for releasing the friction heat that is generated by a disk brake that is provided adjacent the hub and taking in external air for cooling and these holes are opened as suitable for decoration as well.

Rim 37 has a substantially cylindrical shape with an inner circumferential surface 37a and an outer circumferential surface 37b, and the end parts of outer circumferential surface 37b are erected to form rim flanges 38. The beads of tire 32 are set along the rim flanges 38 and bead seats 39 at the inner sides of rim flanges 38 to assemble tire 32 onto wheel 31 and thereby form tire/wheel assembly 33. Furthermore, an air valve attachment hole 40, for attachment of an air valve for introducing compressed air that inflates tire 32 is opened at the disk 36 side of rim 37.

Bead seats 39 are slightly decentered in the upward direction of FIG. 8 with respect to center hole 35 at which the hub and center are aligned, and the thickness of the bead seats 39 at the lower side of FIG. 8 are thus thinner by the corresponding amounts.

When tire 32 is rotated, vibration occurs due to the dimensional variations that arise from manufacturing errors. Causes of this vibration include differences among parts in the height between the inner diameter part 32a and the tread surface 32b of tire 32, differences among parts in the thickness of the treads, etc. As shown in FIG. 9, in the case where the distance (tire height) from the inner diameter part 32a of tire 32, which is fitted onto rim 37, to the tread surface 32b, which is the outer circumference of tire 32, varies, the dimension of the difference with respect to the part at which the abovementioned distance is the smallest is the RRO amount.

With this RRO as the principal cause, tire 32 undergoes vibration in the vertical direction during rolling. As has been mentioned above, the reaction force, which tire 32 generates in the radial direction with respect to the ground upon assembling together of a standard wheel that has been manufactured with a high degree of circularity and tire 32 is called RFV, and the peak of this RFV is indicated on tire 32 by the RFV peak mark 51. As has been mentioned above, since RRO is the principal cause of RFV, the peak position of RFV normally coincides with the peak position of RRO.

Tire 32 also has variations in the weight distribution due to manufacturing errors, and a light point mark 52 is indicated at the position of the light point, which is found to be in the lightest direction of tire 32 as a result of measurement of the balance according to each tire.

Thus with tire 32, the light point position, the light point unbalance amount −g, the RFV position (maximum point of RRO), the RRO amount +δ, and the phase θ from the light point to the RFV are known as a result of measurements.

The method of manufacturing wheel 31 shall now be described.

In manufacturing a balance-adjusted wheel 31, manufacturing is performed by adjusting the balance using the three data of the light point unbalance amount −g, RRO amount +δ, and phase θ in the following manner.

In manufacturing wheel 31, a net-shape part, which has been made close in shape to the final shapes of disk 36 and rim 37 by casting, forging, drawing, etc., is subject to machining, etc. to bring the net-shape part to the final dimensions.

The machining performed to bring the respective parts of wheel 31 to the final dimensions is performed by fixing a net-shape part 31a to the chuck 61 of a machine tool 60 as shown in FIG. 10A and FIG. 10B, and bringing a processing tool 62, equipped with a cutting tool of predetermined form, into contact with net-shape part 31a while rotating net-shape part 31a together with chuck 61 and thereby tracing out the desired shape. Chuck 61 has attached to the central part, a tapered cone 63, which fits with center hole 35, and has disposed at the circumferential parts, three fixing parts 64 for fixing the fixing stub 38a that extends from rim flange 38 of net-shape part 31a. Chuck 61 is not limited to that of the form shown in FIG. 10A, and a stroke-type chuck, collet chuck, or any other suitable chuck may be used. Also, machine tool 60 may be a horizontal type machine tool.

As shown in FIG. 10B, with Embodiment 2, the position of tapered cone 63 is shifted so that the central axis MC of net-shape part 31a will be positioned below the rotation center axis DC of chuck 61 by just the distance δ/2. In this condition, center hole 35 of net-shape part 31a is fitted onto tapered cone 63 and the fixing stub 38a, which extends from rim flange 38 of net-shape part 31a, is fixed by means of the three fixing parts 64. Chuck 61 is then rotated with the central axis DC in FIG. 10B as the axis of rotation to cut the bead seats 39. Bead seats 39 are thus decentered with respect to the center of tapered cone 63 of net-shape part 31a, and a maximum RRO of +δ and a minimum RRO (i.e. the low point) of −δ are thereby formed.

Next, with net-shape part 31a being fixed to chuck 61, air valve attachment hole 40 is bored from the outer circumferential side of rim 37 at a part that is shifted in phase by just −θ from the direction of the minimum point of RRO. Trimming is then performed so that the unbalance amount in the direction of air valve attachment hole 40, which is shifted in phase by just −θ with respect to the direction of the minimum point of RRO, will be +g.

The unbalance of wheel 31 shall now be described with reference to FIG. 11. The position at which trimming is performed and the amount of trimming are determined by calculation using the respective values of δ, g, and θ as follows. Calculation is performed with θ taking on a positive value when it is directed in the clockwise direction First, the cutting out of bead seats 39 of the rim in a manner whereby they will be decentered by just δ/2 from the center of wheel 31 results in an unbalance of a vector Ve in the direction opposite the direction of the minimum point of RRO. In the present description, the vector expresses the direction and amount of unbalance.

Then due to the provision of air valve attachment hole 40, an unbalance corresponding to just the vector Vh will occur in the direction of air valve attachment hole 40 when an air valve is attached. Then based on the fact that when an unbalance of +g arises in a direction shifted by just the phase −θ from the direction of the minimum point of RRO, the unbalance can be canceled out upon assembly with tire 32, the vector Vg that corresponds to the shortage of unbalance in this direction is calculated. The vector Vf that will give rise to a vector Vg upon synthesis with a vector Vf is then determined and trimming is performed in the direction opposite the direction of a vector Vf so that an unbalance corresponding to the magnitude of a vector Vf will arise.

When the phase and amount of trimming has thus been determined, chuck 61 is rotated and is matched in phase with the processing tool. By then cutting out the excess material 37c (see FIG. 10B) remaining on the inner circumference of rim 37 by means of a drill or other processing tool, an unbalance corresponding to a vector Vf is made to arise to thereby adjust the unbalance.

With a wheel 31 obtained thus, a heavy point of +g arises in the upward direction of FIG. 11 and the minimum point (low point) of RRO of an RRO amount of −δ arises in the direction of just the phase θ from the heavy point. Also, since trimming is performed so that the direction of the heavy point will be matched with the air valve position, the air valve position will necessarily be the heavy point.

In assembling wheel 31 and tire 32 together, the assembly is performed upon matching the air valve of wheel 31 with the light point mark 52 of tire 32. The positions of the minimum point of RRO of wheel 31, the maximum point of RRO of tire 32, and the maximum point of RFV will then be matched. The heavy point +g of wheel 31 and the light point −g of tire 32 will thus cancel each other out and the minimum RRO amount −δ of wheel 31 and the maximum RRO amount +δ of tire 32 will also cancel each other out.

Thus if a worker or an assembling device performs assembly upon matching the air valve position of wheel 31 with the light point mark 52 of tire 32, a tire/wheel assembly, which is statically balanced and with which the vertical runout of the entire car wheel is minimized, can be made even without subsequent modification of the balance using a balance weight.

Though with Embodiment 2, the minimum RRO amount −δ of wheel 31 was formed intentionally by decentering bead seats 39 in the finishing of bead seats 39, in the case where an already finished wheel 31 is to be used, the vertical runout of bead seats 39 of wheel 31 can be measured to determine the minimum point of RRO of wheel 31 and an air valve attachment hole and trimmed hole can be formed in the same manner as the manufacturing method described above so that a heavy point +g will be formed at a position of −θ from the direction of the minimum point of RRO.

By thus assembling a tire/wheel assembly upon matching the air valve of the wheel 31, manufactured in the above-described manner, and the light point mark 52 of tire 32, a tire/wheel assembly, which is statically balanced, can be obtained while minimizing the vertical runout of the tire/wheel assembly as a whole even using an already finished wheel.

Though Embodiment 2 of this invention has been described above, the wheel, wheel manufacturing method, and tire/wheel assembly assembling method according to this invention are not limited to Embodiment 2 but can be put into practice in various forms. For example, the trimming is not limited to that by drilling but can be performed by various methods of processing, such as processing by laser, water, discharge, etc., as long as the method is one with which the position and amount of trimming can be controlled. Also, the air valve position does not have to be made the heavy point necessarily, and as long as marking is performed so that the heavy point position can be distinguished, a position that has no relationship to the air valve can be made the heavy point.

Embodiment 3

Figure 12:
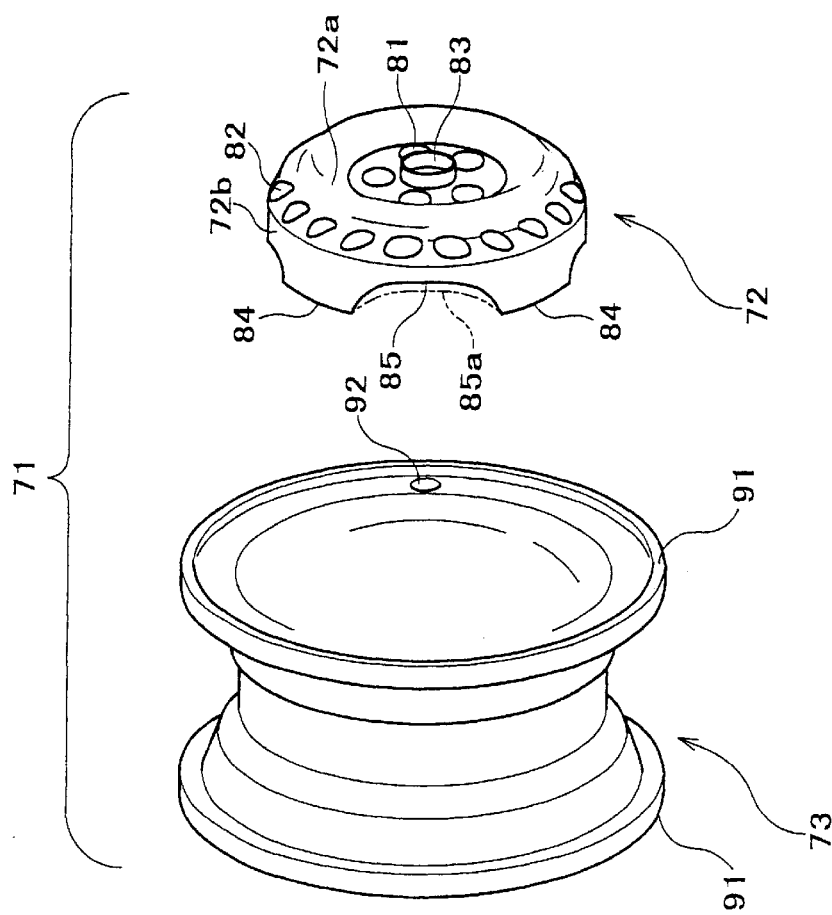
FIG. 12 is an exploded perspective view of a wheel of Embodiment 3 of this invention.
Figure 13:
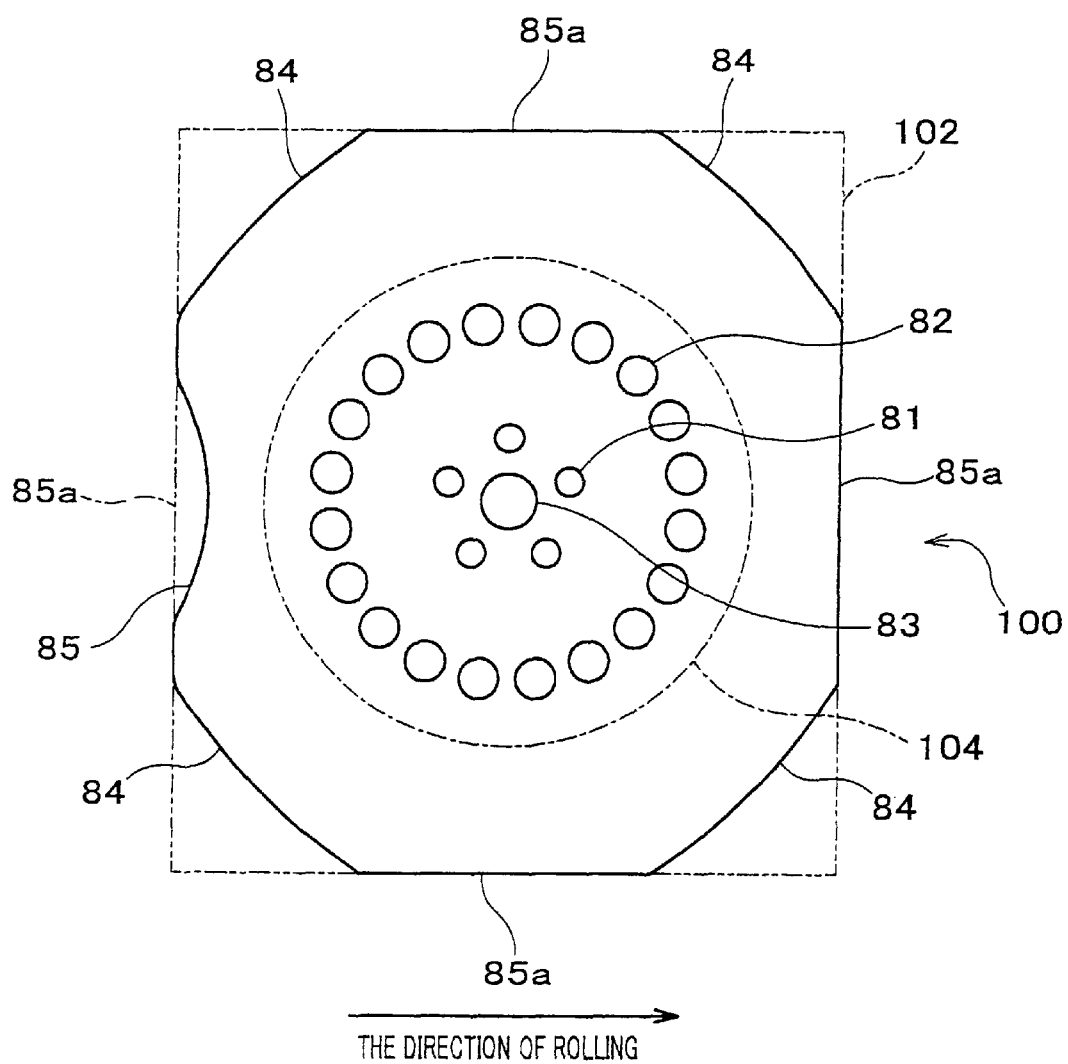
FIG. 13 is a plan view of the disk material of the wheel of FIG. 12.
Figure 14A:
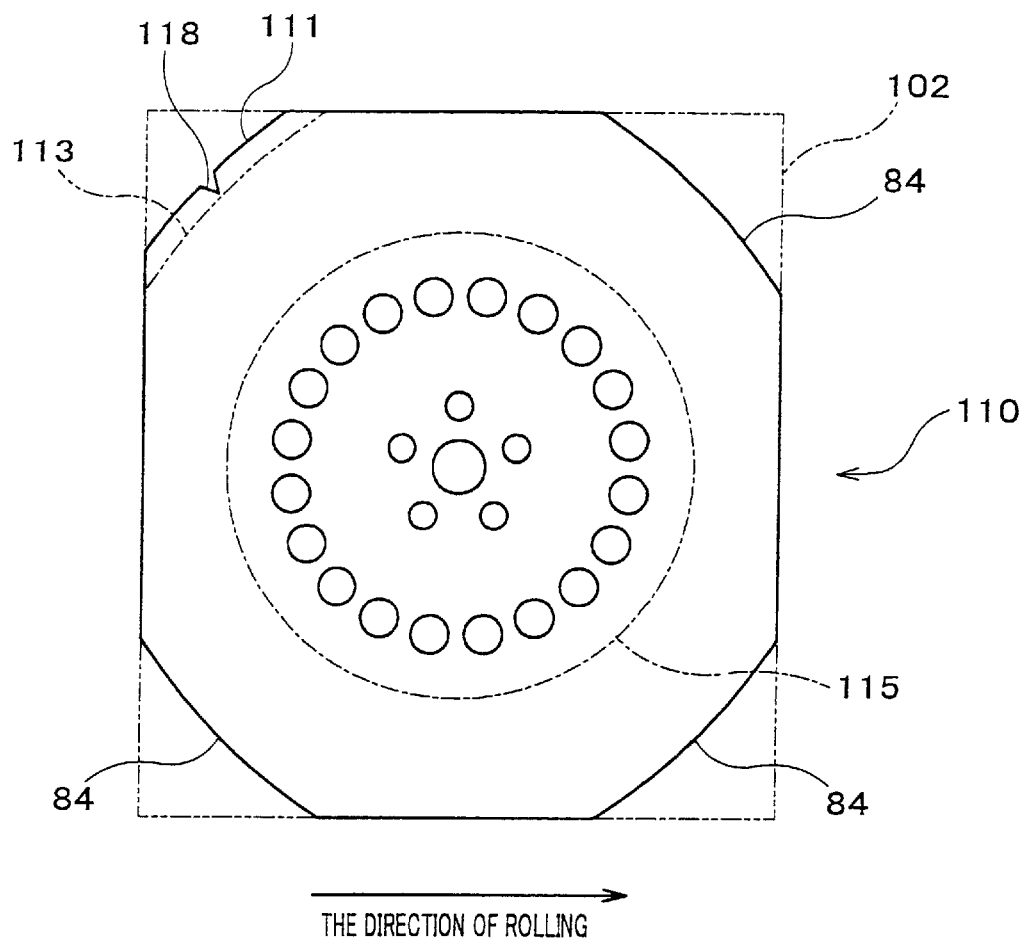
FIG. 14 shows another form of Embodiment 3 of this invention, with FIG. 14A being a plan view of the disk material of a wheel and FIG. 14B being a perspective view of the disk of the wheel.
Figure 14B:
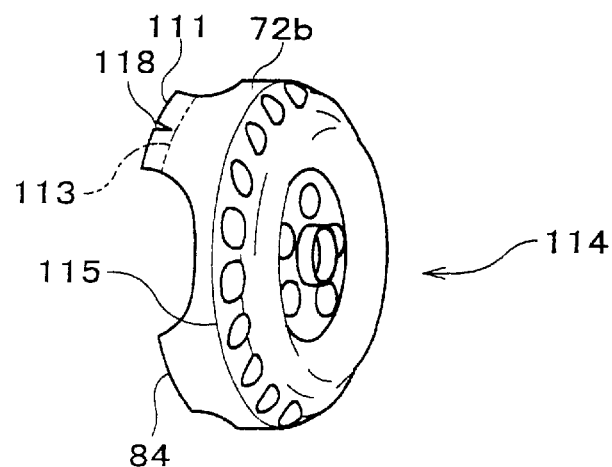
Figure 15A:
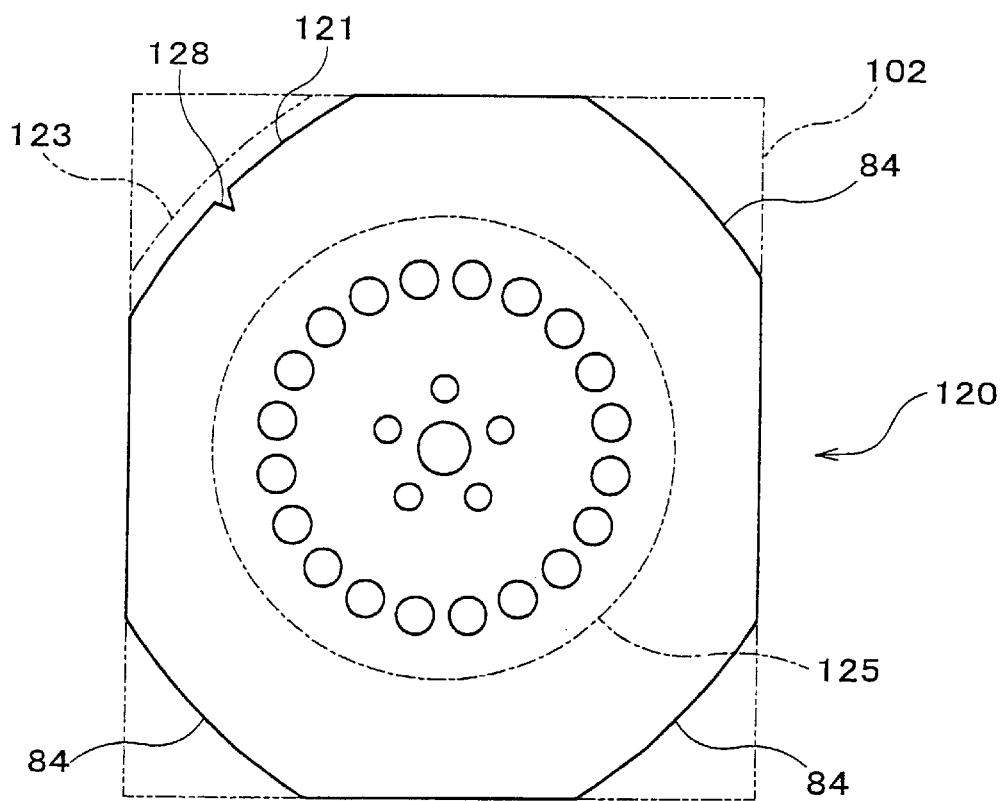
FIG. 15 shows another form of Embodiment 3 of this invention, with FIG. 15A being a plan view of the disk material of a wheel and FIG. 15B being a perspective view of the disk of the wheel.
Figure 15B:
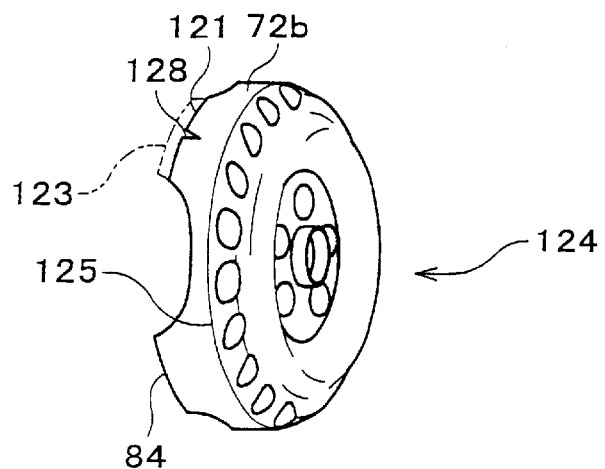
Figure 16:
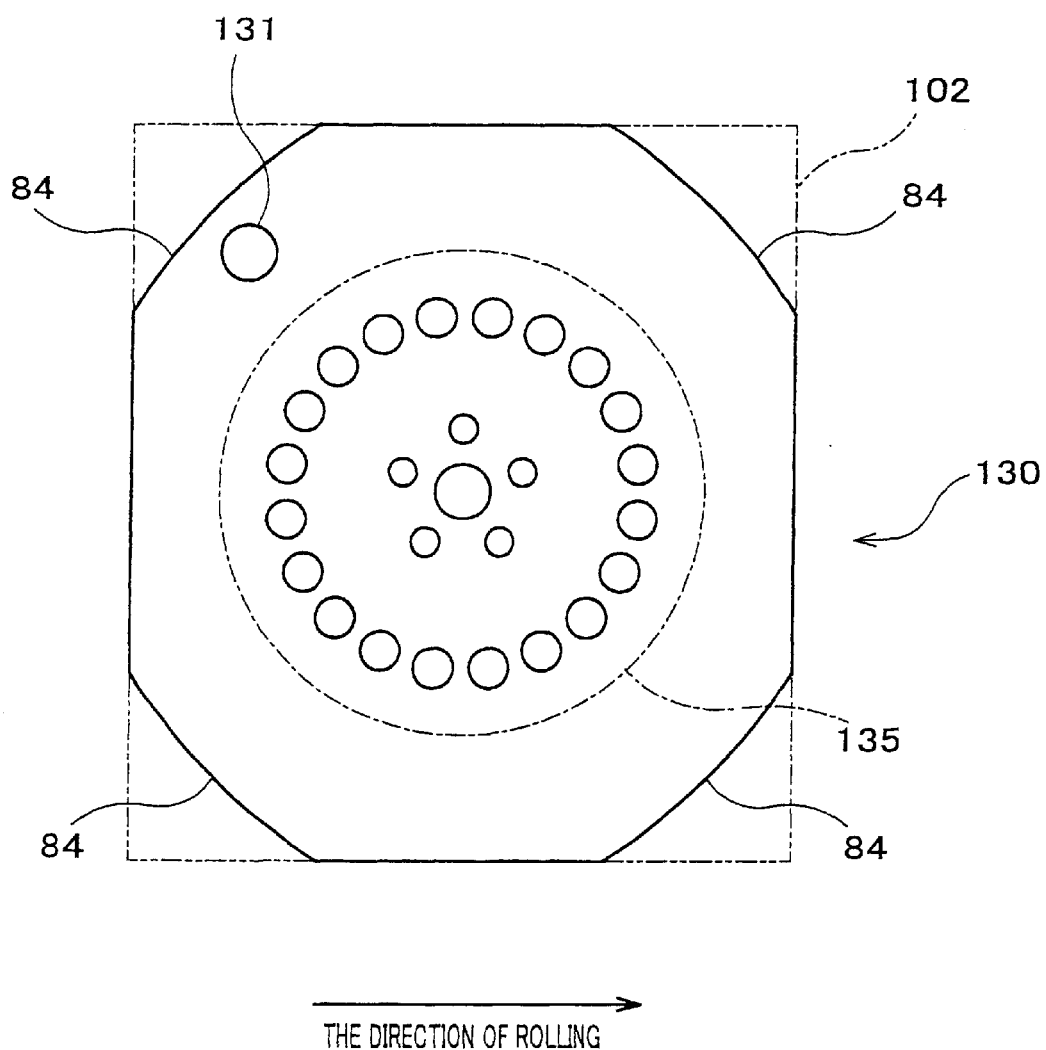
FIG. 16 is a plan view of the disk material of a wheel of another form of Embodiment 3.
Figure 17:
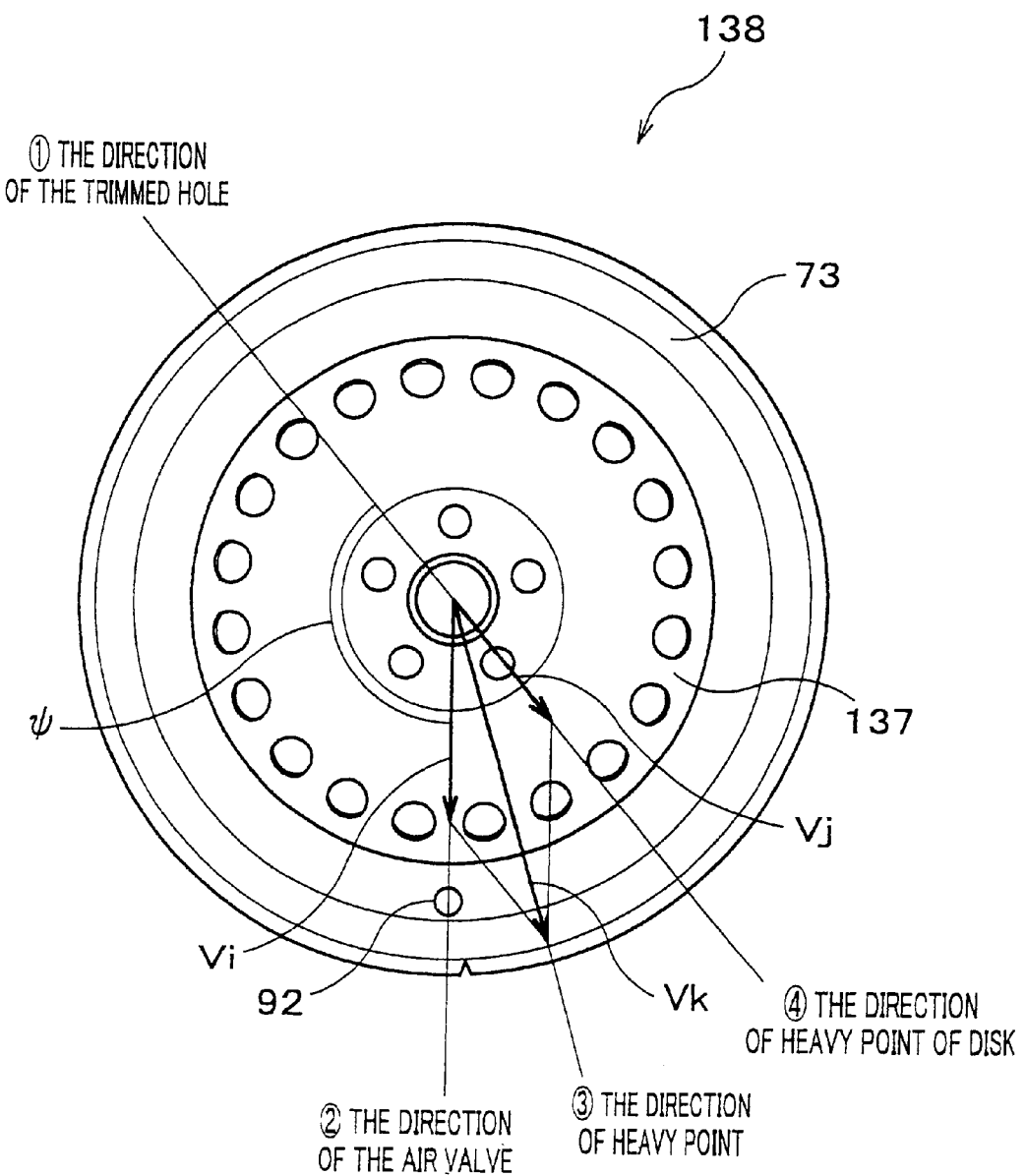
FIG. 17 is a front view of a wheel made using the disk material of FIG. 16.

Next as Embodiment 3, an embodiment of a wheel according to this invention shall be described with reference to FIG. 12 through FIG. 17. FIG. 12 is an exploded perspective view of a wheel. FIG. 13 is a plan view of the disk material of the wheel of FIG. 12. FIG. 14 shows another form of Embodiment 3, with FIG. 14A being a plan view of the disk material of a wheel and FIG. 14B being a perspective view of the disk of the wheel. FIG. 15 shows another form, with FIG. 15A being a plan view of the disk material of a wheel and FIG. 15B being a perspective view of the disk of the wheel. FIG. 16 is a plan view of the disk material of a wheel of another form. FIG. 17 is a front view of a wheel made using the disk material of FIG. 16.

As shown in FIG. 12, wheel 71 is comprised of a disk 72, which is bolted onto an unillustrated axle shaft and receives the driving force of the axle shaft, and a rim 73, onto the outer circumference of which a tire is fitted and the inner diameter part of which is welded and bonded to disk 72.

Disk 72 is made by drawing a rolled steel plate into a cup-like shape, and on the cup-like disk surface 72a are provided bolt insertion holes 81, through which bolts are inserted when fixing the disk to an axle shaft, ventilation holes 82, for cooling the brake that is positioned inside the wheel, and a center hole 83, for setting the center of wheel 71. At the wall surface part 72b of the cup-like shape, the shape of the material punched out from a rolled steel plate is left as it is so that the edge parts are protruded or recessed. Of the edge parts of wall surface part 72b, the protruding parts are the welded parts 84 that are welded to rim 73. Furthermore, of the edge parts of wall surface part 72b, one of the plurality of parts that are recessed (Embodiment 3 has four such parts) is gouged more deeply than the other recessed parts. Wall surface part 72b is the fitting part that is fitted into the inner diameter part of rim 73.

In FIG. 12, the imaginary line 85a, drawn as an alternate long and two short dashes line, indicates the shape of the abovementioned other recessed parts and the trimmed-shape line 85, drawn as a solid line, indicates the abovementioned gouged shape. That is, disk 72 has a shape with which a part of the non-welded edge parts is trimmed.

The disk material 100 shown in FIG. 13 shall now be described. As shown in FIG. 13, disk material 100 has a shape with which the four corners of a blank 102, made by cutting a rolled steel plate into substantially square shape, are cut off in arcuate shapes. Also with disk material 100, the left side as shown in FIG. 13 has a slightly gouged shape in comparison to the other sides. Of the parts of disk material 100, the part outside the outer circumferential line 104, which becomes the outline of the outer circumference of disk 72, is the part that becomes the wall surface part 72b when disk material 100 is drawn into a cup-like shape. When disk material 100 is drawn into a cup-like shape and becomes disk 72, the abovementioned arcuate parts become the welded parts 84 and the gouged part becomes the trimmed-shape line 85.

In FIG. 13, the horizontal direction is the direction of rolling in the process of manufacturing the rolled steel plate. Since a rolled steel plate is extended slightly more readily in the rolled direction than in the direction perpendicular to the rolled direction, blank 102 is cut to be slightly shorter in the rolled direction than in the direction perpendicular to the rolled direction.

Rim 73 has a substantially cylindrical shape and the outer circumferential surface thereof is arranged so that a tire can be mounted thereto. At the edge parts at both sides of rim 73 are provided rim flanges 91 for preventing the mounted tire from falling off. Of the parts of rim flange 91, an air valve attachment hole 92, for attachment of an air valve for putting air into the tire, is provided at a part that will be positioned at the outer surface side of an automobile. Though rim 73 has a large weight, the scattering among products is small and the static unbalance amount is low. However, due to an air valve becoming attached to air valve attachment hole 92, the air valve attachment hole 92 side tends to become heavy after assembly. Embodiment 3 may be applied to a wheel with which a rim and disk are combined, and particularly to a wheel with which the side face parts of a cup-like disk are fitted into the inner diameter part of a rim. Thus as the rim, any known type of rim may be used as long as it is one with which an above-described disk can be fitted and bonded.

Wheel 71 is formed by fitting disk 72 into the inner diameter part of rim 73 and welding welded parts 84 to the inner diameter parts of rim 73. As shown in FIG. 12, disk 72 is fitted and welded so that air valve attachment hole 92 and trimmed-shape line 85 will be at positions that are shifted by 180 degrees with respect to each other as viewed from the center of disk 72. Since assembly is thus performed so that wheel 71 will be made heavier in the air valve direction by both the weight of the air valve and the trimmed shape of trimmed-shape line 85, the heavy point will always be in the direction of air valve attachment hole 92 with wheel 71.

With wheel 71, since the direction of the heavy point can thus be known using the air valve as a guideline, the work of attaching a balance weight in the process of assembling wheel 71 and a tire together can be performed efficiently.

Next, a disk material 110 and a disk 114 of another form shown in FIG. 14 shall be described. In the following description, parts that are practically the same as those of the above-described disk 72 and disk material 100 are provided with the same symbols and detailed descriptions thereof shall be omitted. Also with the embodiments to be described below, since other examples of shapes of the rim of the disk and fitted parts shall be given, the description shall be given mainly using a disk material that substantially takes on a developed shape with respect to the disk.

As shown in FIG. 14A, disk material 110 has a shape with which the four corners of a blank 102, made by cutting a rolled steel plate into substantially square shape, are cut off in arcuate shapes. Of the abovementioned arcuate shapes, the welded part 111, which is the arcuate shape at the upper left in FIG. 14A, is positioned further to the outer side than the imaginary arc 113 that corresponds to the welded parts 84, which are the other arcuate shapes. Thus when disk material 110 is drawn into a cup-shaped disk 114 as shown in FIG. 14B, the disk becomes heavier in the direction of welded part 111 than in the other directions by the weight of the plate between welded part 111 and the arc 113. That is, disk 114, made from disk material 110, has the form where an augmented shape is provided at welded part 84. A small notch 118 formed in welded part 111 can be used as a mark that indicates where the augmented shape part is in the process of bonding with the rim. The part outside the outer circumferential line 115, which becomes the outline of the outer circumference of disk 114, becomes the wall surface part 72b and the part that is fitted to rim 73 when disk material 110 is drawn and made into the cup-shaped disk 114 (see FIG. 12).

When disk material 110 with such an augmented shape is then drawn and formed into a disk and then disk 114 and rim 73 are joined (see FIG. 12) upon matching the direction of the abovementioned augmented shape with the direction of air valve attachment hole 92 of rim 73, since the unbalance due to the air valve and the unbalance due to the abovementioned augmented shape combine to make the direction of the air valve heavy, the wheel can be made one with which the heavy point is positioned in the direction of the air valve at all times.

On the other hand, if disk 114 and rim 73 are joined (see FIG. 12) upon setting the direction of the abovementioned augmented shape and the direction of air valve attachment hole 92 180 degrees opposite each other, the unbalance due to the abovementioned augmented shape and the unbalance due to the air valve will cancel each other out to provide a wheel with a low amount of unbalance.

A disk material 120 and disk 124 of another form shown in FIG. 15 shall now be described. In the following description, parts that are practically the same as those of the above-described disks 72 and 114 and disk materials 100 and 110 shall be provided with the same symbols and detailed descriptions thereof shall be omitted.

Disk material 120 has a shape with which the four corners of a blank 102, made by cutting a rolled steel plate into substantially square shape, are cut off in arcuate shapes. Of the abovementioned arcuate shapes, the welded part 121, which is the arcuate shape at the upper left in FIG. 15A, is positioned further to the inner side than the arc 123, which corresponds to the welded parts 84 that are the other arcuate shapes. Thus when disk material 120 is drawn into a cup-shaped disk 124 as shown in FIG. 15B, the disk will be lighter in the direction of welded part 121 than in the other directions by the weight of the plate between welded part 121 and the arc 123. That is, disk 124, made from disk material 120, has the form where a trimmed shape is provided at a part of a welded part 84. A small notch 128 formed in welded part 121 can be used as a mark that indicates where the trimmed shape part is in the process of joining with the rim. The part outside the outer circumferential line 125, which becomes the outline of the outer circumference of disk 124, becomes the wall surface part 72b and the part that is fitted to rim 73 when disk material 120 is drawn and made into the cup-shaped-disk 124 (see FIG. 12).

When disk material 120 with such a trimmed shape is then drawn and formed into a disk and then disk 124 and rim 73 are joined (see FIG. 12) upon matching the direction of the abovementioned trimmed shape with the direction of air valve attachment hole 92 of rim 73, the unbalance due to the abovementioned trimmed shape and the unbalance due to the air valve cancel each other out to provide a wheel with a low amount of unbalance.

On the other hand, if disk 124 and rim 73 are joined (see FIG. 12) upon setting the direction of the abovementioned trimmed shape and the direction of air valve attachment hole 92 180 degrees opposite each other, the unbalance due to the air valve and the unbalance due to the abovementioned trimmed shape combine to make the direction of the air valve heavy, and the wheel can thus be made one with which the heavy point is positioned in the direction of the air valve at all times.

A disk material 130 and wheel 138 of another form shown in FIG. 16 and FIG. 17 shall now be described. In the following description, parts that are practically the same as those of the above-described wheel 71, disks 72, 114, and 124, and disk materials 100, 110, and 120 shall be provided with the same symbols and detailed descriptions thereof shall be omitted.

Disk material 130 has a shape with which the four corners of a blank 102, made by cutting a rolled steel plate into substantially square shape, are cut off in arcuate shapes that become welded parts 84. In FIG. 16, the part outside the outer circumferential line 135, which becomes the outline of the outer circumference of disk 137, shown in FIG. 17, becomes the wall surface part 72b of disk 137 and the part that is fitted into rim 73 (see FIG. 12).

Of the abovementioned fitted part of disk material 130, a trimmed hole 131 is provided at the part at the upper left in FIG. 16.

Disk material 130 with such a trimmed shape is drawn and formed into disk 137 and then, as shown in FIG. 17, disk 137 and rim 73 are joined by welding with the direction of trimmed hole 131 being shifted by an angle φ with respect to the direction of the air valve.

When an air valve is attached to rim 73, the total unbalance of wheel 138 will be comprised of the unbalance due to the air valve and the unbalance of wheel 138 itself. Thus with wheel 138 of Embodiment 3, when the unbalance amount due to the air valve is expressed as a vector Vi and the unbalance amount of disk 137 due to trimmed hole 131 is expressed as a vector Vj, the unbalance amount of wheel 138 as a whole will have the direction and magnitude of the vector Vk, resulting from the synthesis of a vector Vi and a vector Vj.

Thus by suitably selecting the magnitudes of angle φ and trimmed hole 131, a wheel 138 of a desired amount of unbalance can be provided.

Though a description of Embodiment 3 of this invention has been given above, the wheel according to this invention is not limited to Embodiment 3 and may be put into practice in various forms. For example, the augmented shape or trimmed shape may be provided in plurality or the shape of the outer circumference of the disk material may be decentered to make it relatively heavier in a certain direction than in other directions. In this case, the direction in which the disk is heavy will correspond to an augmented shape and the direction in which the disk is light will correspond to a trimmed shape.

Embodiment 4

Figure 18A:
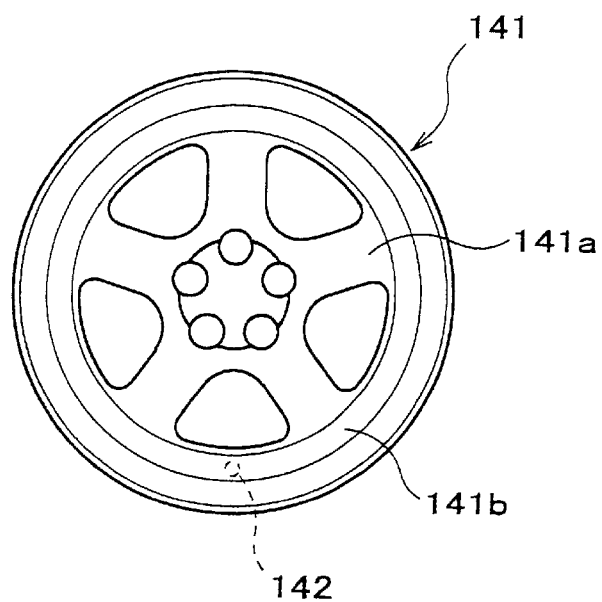
FIG. 18 shows a wheel and a tire related to Embodiment 4 of this invention, with FIG. 18A being a side view of the wheel and FIG. 18B being a side view of the tire.
Figure 18B:
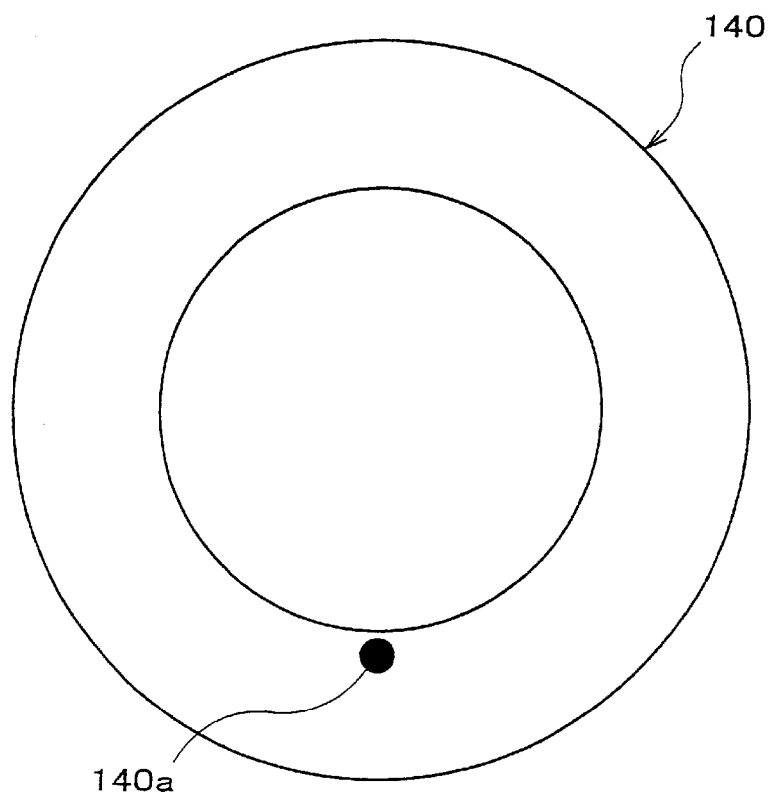
Figure 19:
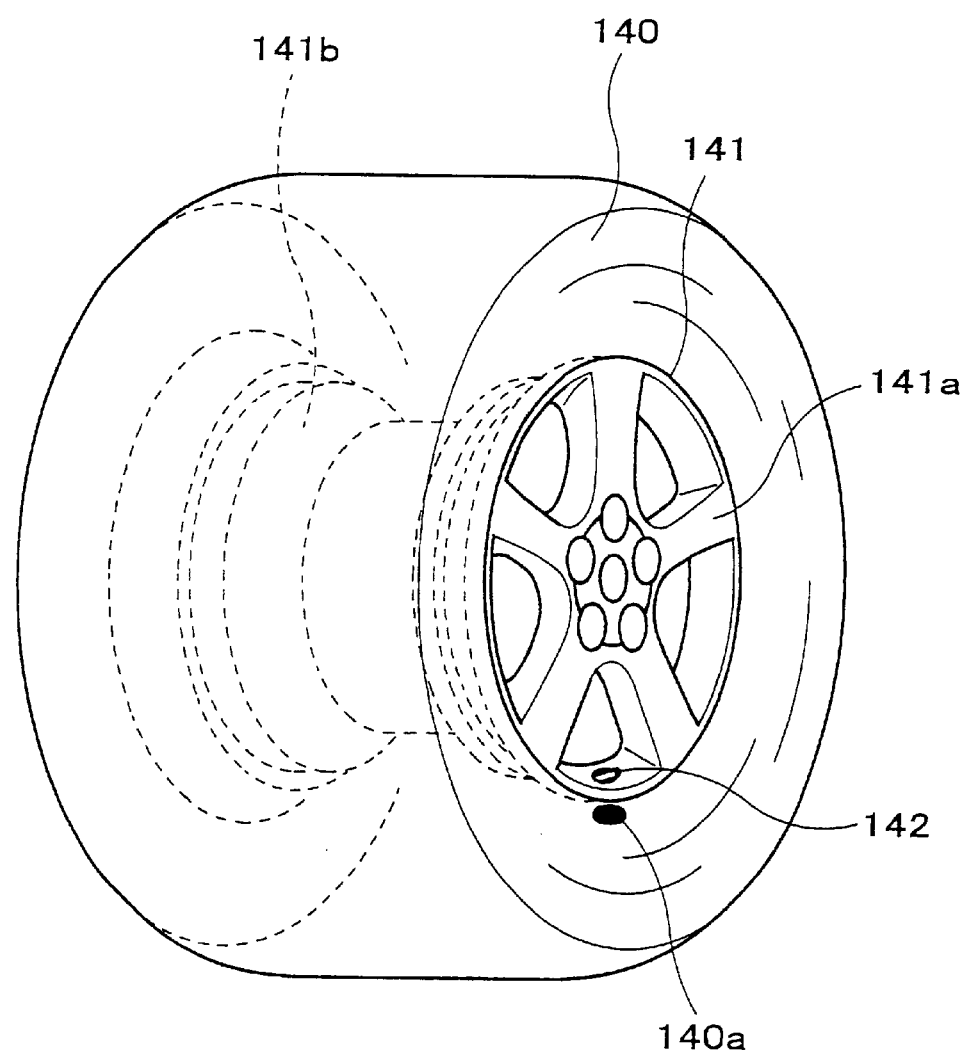
FIG. 19 is an external perspective view of a tire/wheel assembly related to Embodiment 4 of this invention.
Figure 20A:
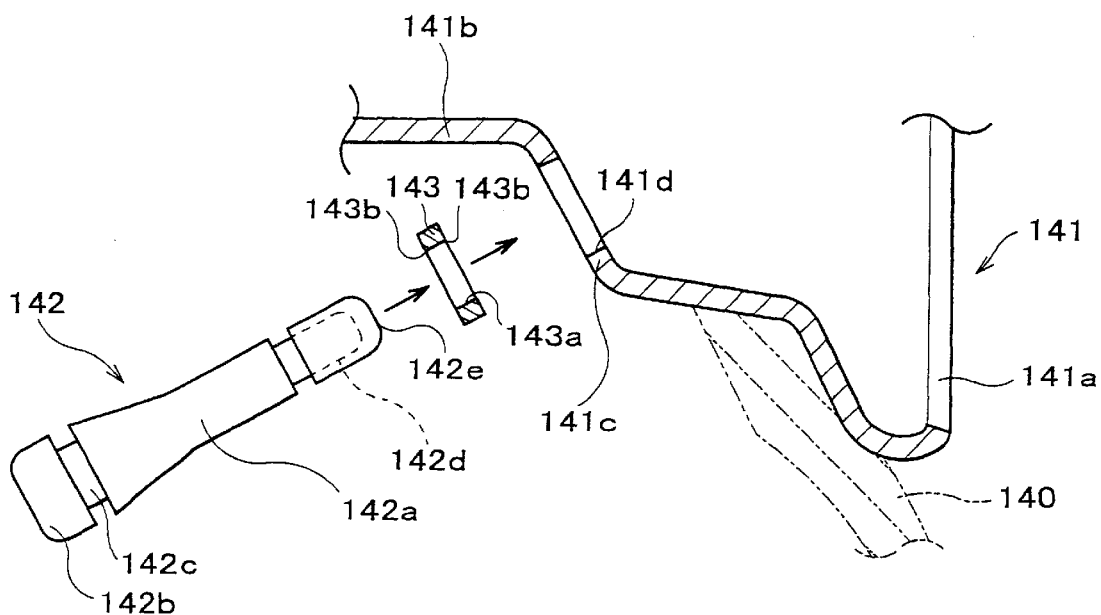
FIG. 20 shows partial sectional views of a rim of Embodiment 4 of this invention with FIG. 20A showing the condition prior to attachment of an air valve seat and an air valve and FIG. 20B showing the condition after attachment.
Figure 20B:
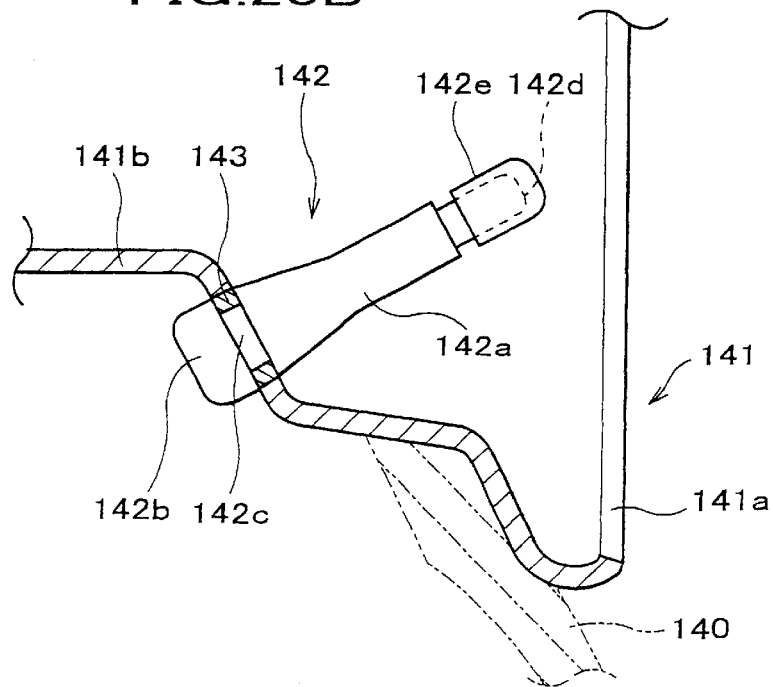
Figure 21:
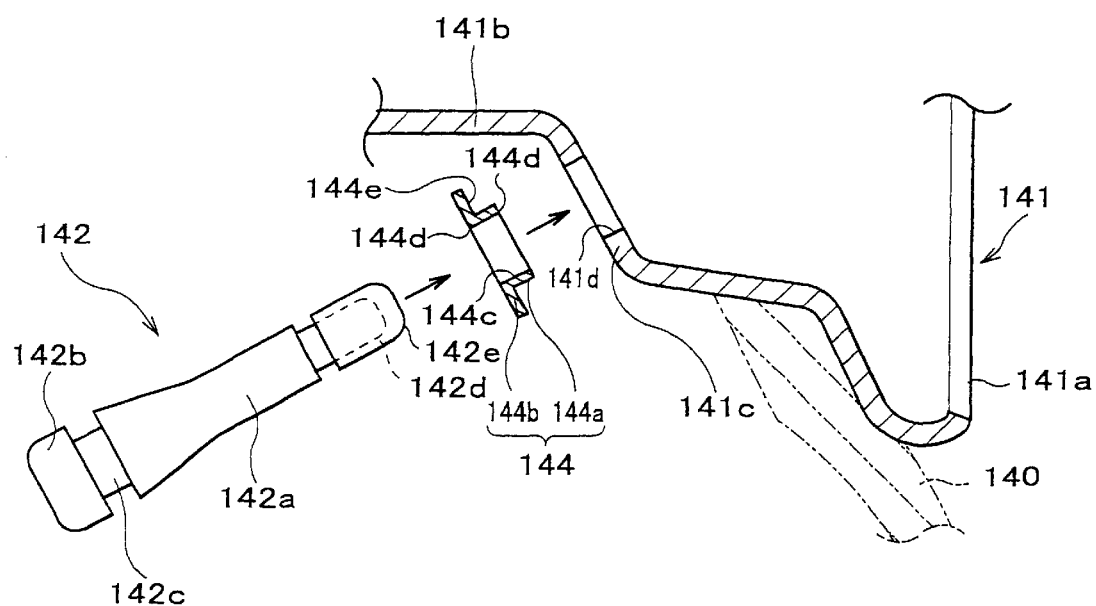
FIG. 21 is a partial sectional view of a rim of another form of Embodiment 4 of this invention.
Figure 22:
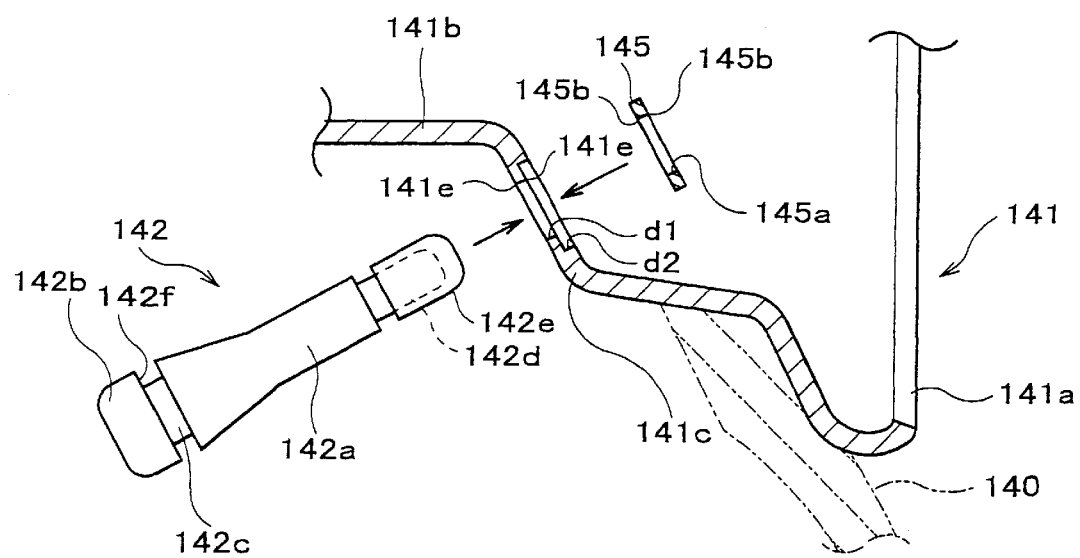
FIG. 22 is a partial sectional view of a rim of another form of Embodiment 4 of this invention.

As Embodiment 4, an embodiment of a wheel according to this invention shall be described with reference to FIG. 18 through FIG. 22. FIG. 18A is a side view of a wheel and FIG. 18B is a side view of a tire. FIG. 19 is an external perspective view of a tire/wheel assembly. FIG. 20 shows partial sectional views of a rim, with FIG. 20A showing the condition prior to attachment of an air valve seat and an air valve and FIG. 20B showing the condition after attachment. FIG. 21 is a partial sectional view of a rim of another form. FIG. 22 is a partial sectional view of a rim of another form.

In FIG. 18A, the main body 141a of a wheel 141 is manufactured using an aluminum alloy or magnesium alloy, etc. as the material and by means a die cast device, etc. An air valve 142, for supplying compressed air to tire 140, is attached to the rim 141b, which forms the circumferential surface of main body 141a.

Air valve 142 has a casing structure of the same form as that is described in the section on the prior art and is comprised of stem part 142a, with a substantially cylindrical shape, and a grommet part 142b, which is formed across a fitting groove 142c provided along the circumferential direction at one end of stem part 142a. An air inlet 142d is formed at the other end of stem part 142a, and a cap 142e is attached so as to cover this air inlet 142d. The surfaces of stem part 142a, grommet part 142b, and fitting groove 142c are covered with a synthetic rubber material.

As shown in FIG. 20, rim part 141b has a single step part or a plurality of step parts formed in the radial direction, and an air valve hole 141d, which is a circular hole, is bored in a side wall part 141c, which comprises a certain step. The principal characteristic of the present embodiment is that an annular air valve seat (indicated by symbol 143 in FIG. 20, symbol 144 in FIG. 21, and symbol 145 in FIG. 22) is fitted and fixed in this air valve hole 142d and air valve 142 is attached to this air valve seat.

The material of the air valve seat is preferably a material that is greater in specific gravity than the material of the main body 141a of wheel 141, and for example, in the case where the material of main body 141a is iron, lead and the like are favorable as the material of the air valve seat. Also, in the case where the material of main body 141a is a light metal aluminum alloy, etc., iron, chromium and the like may be used besides lead as the material of the air valve seat. In any case, an appropriate material is selected in consideration of rustproof properties, corrosion resistance, etc. as well. Needless to say, the material of the air valve seat is not limited to a metal material and the seat may be arranged from a synthetic resin material, etc. as well.

Three forms, based on differences in the shape of the air valve seat, shall now be described.

First, the air valve seat 143, shown in FIG. 20, shall be described. FIG. 20 shows the case where air valve seat 143 is member with a simple, ring-like shape with a height dimension that is substantially the same as the thickness dimension of side wall part 141c of rim 141b and an outer diameter dimension equal to the diameter dimension of air valve hole 141d. An air valve attachment hole 143a is formed in the center of air valve seat 143 so as to pass through from the front to the rear of the seat. The front and rear peripheral parts 143b are subject to edge treatment in advance in the stage prior to attachment to main body 141a, and this edge-treated air valve seat 143 is fitted and fixed in air valve hole 141d by press fitting or use of an adhesive agent. Air valve 142 is attached to the air valve seat 143 that has been fitted and fixed in air valve hole 141d, and stem part 142a is inserted from the tire attachment side into air valve attachment hole 143a using the resilience of rubber and fitting groove 142c is fitted to the circumferential surface of air valve attachment hole 143a to stop grommet part 142b onto the rear surface of air valve seat 143 (the condition of FIG. 20B). Needless to say, the front and rear peripheral parts of air valve hole 141d do not need to be subject to edge treatment since these parts do not come in contact with air valve 142.

This arrangement, wherein ring-shaped air valve seat 143, which is fitted and fixed in air valve hole 141d bored in rim 141b, is provided and air valve 142 is attached to this air valve seat 143, provides the following effects. That is, whereas with regard to the problem of edge treatment of the peripheral parts of the hole for attachment of air valve 142, treatment had to be performed on each wheel, which is a large-shaped part, with Embodiment 4, treatment can be performed on each air valve seat, in other words, on each part with an extremely small shape. The occupied space required for the edge treatment process can thus be reduced, the labor burden placed on a worker can be lightened, and since cutting can be performed readily using a general tool machine and without requiring special tools or jigs, etc., the simplification of the edge treatment can be realized. Also, in the case where air valve seat 143 is manufactured with air valve attachment hole 143a being formed already by casting, resin forming, etc., the use of a mold that forms, for example, cut surfaces (C-surfaces) or round surfaces (R-surfaces) at the abovementioned peripheral parts 143b enables elimination of the process of edge treatment by cutting.

Also by making air valve seat 143 from a material with a specific gravity that is greater than the material of the main body 141a of wheel 141, the heavy point of static unbalance of wheel 141 can be matched with the position of attachment of air valve 142, and in comparison to the prior art case where the weight of the air valve itself is adjusted, excellent economy and efficiency of the adjustment work can be realized since just a standard specification item can be used as the air valve. Obviously, strictly speaking, in the case where the scattering of the weight distribution is extremely large among the respective products due to manufacturing errors of main body 141a, this scattering may override the total weight of air valve seat 143 and air valve 142 and an assembly may be produced where the heavy point is not matched with the position of attachment of air valve 142. However, by taking such means as making air valve seat 143 large in shape and heavy, etc., the degree to which the heavy point is matched with the position of attachment of air valve 142 can be increased.

The wheel 141, with which the position of attachment of air valve 142 is matched with the heavy point of static unbalance by the above arrangement, is subject to a recheck regarding the heavy point using, for example, a wheel balancer, and then phase matched with the light point of static unbalance of the tire 140 side at the air valve 142 part and assembled as a tire/wheel assembly. Actually with tire 140, a seal or other mark 140a is attached to the side part as a mark for indicating the light point of static unbalance as shown in FIG. 18B, and the tire/wheel assembly is assembled so that mark 140a and air valve 142 will be closest to each other. The respective static unbalances of the wheel 141 side and tire 140 side thereby cancel each other out, thus lessening the static unbalance of the tire/wheel assembly. Also, as another example of assembly, assembly may be performed upon matching the direction of the RFV with the direction of the minimum point (low point) of RRO of the wheel as has been described above. Since the abovementioned mark 140a at the tire side and the attachment position of air valve 142, which will be the heavy point of the tire side, will normally be at positions that are mutually shifted with respect to each other in this case, the static unbalance of the tire/wheel assembly as a whole is lessened by separately attaching a balance weight. The attachment of the balance weight is performed using the attachment position of air valve 142, which is the heavy point, as a guideline in this case as well, and the efficiency of the balance weight attachment work will thus be improved.

The air valve seat 144 shown in FIG. 21 shall now be described.

In the case of the above-described air valve seat 143, compressed air may leak from the so-called press-fit surface, which is the surface at which the inner peripheral part of air valve hole 141d and the outer peripheral part of air valve seat 143 contact each other (see FIG. 20). The air valve seat 144 of the present form has a shape that resolves this problem of leakage of compressed air, and as shown in FIG. 21, is provided with a small-diameter part 144a at a portion that fits into air valve hole 141d and a stopping part (in Embodiment 4, the large-diameter part 144b, which is larger in diameter than the outer diameter of small-diameter part 144a) which comes in surface contact with and is made stoppable by the wall surface of side wall part 141c along the circumferential direction of air valve hole 141d. The height dimension of small-diameter part 144a is substantially the same as the thickness dimension of side wall part 141c and the outer diameter is equal in dimension to the diameter dimension of air valve hole 141d. An air valve attachment hole 144c, which passes through from the front to rear, is formed at the center of air valve seat 144. As in the case of air valve seat 143, the front and rear peripheral parts 144d are subject to edge treatment in advance in the stage prior to attachment to the main body 141a of wheel 141, and this edge-treated air valve seat 144 is fitted and fixed, at the portion of small-diameter part 144a, in air valve hole 141d by press fitting or use of an adhesive agent. Air valve 142 is attached in basically the same manner as air valve seat 143. However, since the height dimension of air valve seat 144 is greater than air valve seat 143 due to the forming of large-diameter part 144b, the width dimension of fitting groove 142c at the air valve 142 side is made larger accordingly.

Since in the case of air valve seat 144, an annular contacting surface 144e can thus be secured between air valve seat 144 and the wall surface of side wall part 141c in addition to the press-fit surface, the leakage of compressed air can be reduced by the interposition of contacting surface 144e. As in the case of air valve seat 143, air valve seat 144 also enables reduction of the occupied space required for the edge treatment process, lightening of the labor burden placed on a worker, and simplification or elimination of edge treatment. Also, since the weight of the air valve seat itself is increased in comparison to the case of air valve seat 143 due to the existence of the stopping part (large-diameter part 144b) in the case of air valve seat 144, air valve seat 144 is effective as a means for matching the heavy point of wheel 141 with the attachment position of air valve 142. Needless to say, the degree by which the heavy point is matched with the attachment position of air valve 142 can be increased further with air valve seat 144 by making the seat from a material of higher specific gravity than the material of the main body 141a of wheel 141.

The air valve seat 145 shown in FIG. 22 shall now be described.

Air valve seat 145 is also an example with which the abovementioned problem of leakage of compressed air is resolved. First as an air valve hole at the side wall part 141c side of rim 141b, a small-diameter hole part d1, within the thickness of which the fitting groove 142c of air valve 142 can be fitted, and a large-diameter part d2, which is larger in diameter than the small-diameter part d1, are formed in a step-like and concentric manner. The ring-shaped air valve seat 145, having an air valve attachment hole 145a of substantially the same dimension as the inner diameter of small-diameter hole part d1 is then fitted and fixed in large-diameter hole part d2 by press fitting or use of an adhesive agent. As in the case of air valve seats 143 and 144, the front and rear peripheral parts 145b of air valve attachment hole 145a of air valve seat 145 are also subject to edge treatment in advance. With the present form, edge treatment must be applied to the peripheral parts 141e of small-diameter hole part d1.

With the present form, since so-called sealing surfaces are formed between an annular stopping surface 142f of grommet part 142b and the wall surface of side wall part 141c and between the inner circumferential surface of small-diameter hole part d1 and the outer circumferential surface of fitting groove 142c, the reliability concerning the leakage of compressed air is improved further. Also, with the present form, the degree by which the heavy point of the static unbalance is matched with the attachment position of air valve 142 can be increased further by making air valve seat 145 from a material of higher specific gravity than the material of the main body 141a of wheel 141.

Though Embodiment 4 of this invention has been described above, the wheel according to this invention is not limited to Embodiment 4 and may be put into practice in various forms. For example, this invention may be applied not only to the case where the structure of the main body of the wheel is a single-piece structure but also to the case where the wheel has a two-piece structure, three-piece structure, etc. This invention is also not limited to these forms and design changes can be made as suitable within a range that does not fall outside the gist of the invention.

Embodiment 5

Figure 25A:
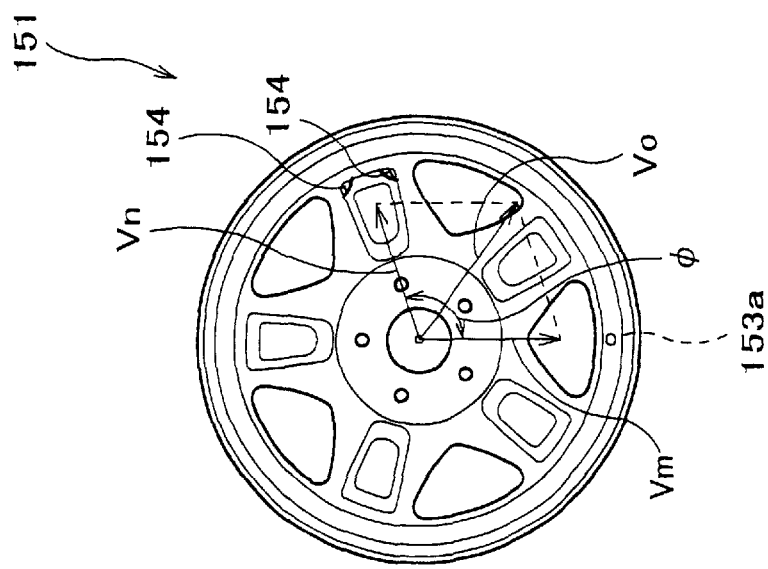
FIG. 25 shows explanatory drawings of patterns of positions at which augmented shapes are added along the circumference of a wheel of Embodiment 5 of this invention, with FIG. 25A showing the case where the augmented shapes are set at positions that match the position of an air valve attachment hole, FIG. 25B showing the case where the augmented shapes are set at positions at the side opposite the air valve attachment hole, and FIG. 25C showing the case where the augmented shapes are provided at positions shifted by an angle $\phi$ ($0°<\theta<180°$) with respect to the direction of the position of the air valve attachment hole.
Figure 25B:
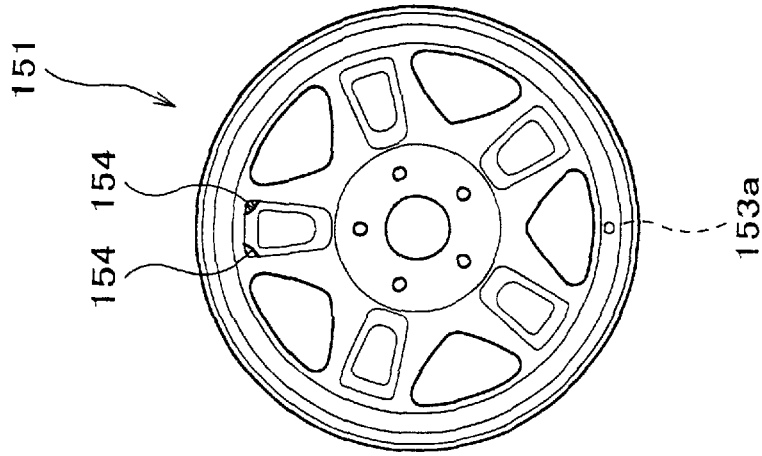
Figure 25C:
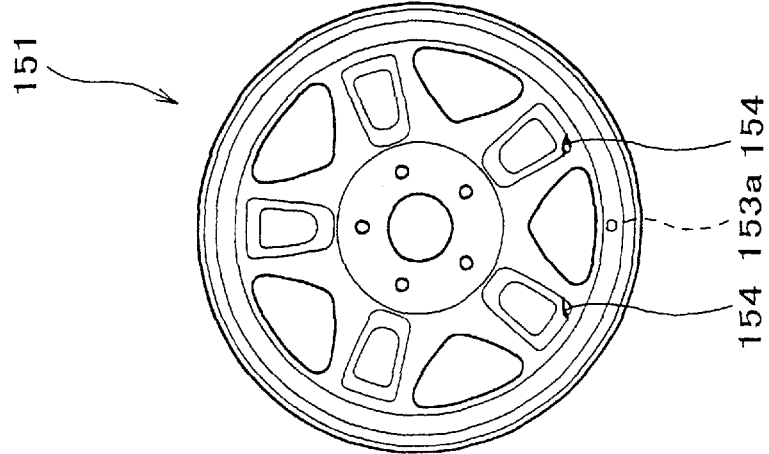

As Embodiment 5, an embodiment of a wheel according to this invention shall be described with reference to FIG. 23 through FIG. 25. FIG. 23 shows the case where augmented shapes are provided at the decorative holes of a wheel, with FIG. 23A being a side view of the wheel as viewed from the rear side and FIG. 23B being a sectional view along line A—A of FIG. 23A. FIG. 24 shows the case where augmented shapes are provided at the indented parts of the rear surface of the spokes of a wheel, with FIG. 24A being a side view of the wheel as viewed from the rear side and FIG. 24B being a sectional view along line B—B of FIG. 24A. FIG. 25 shows explanatory drawings of patterns of positions at which augmented shapes are added along the circumference of a wheel, with FIG. 25A showing the case where the augmented shapes are set at positions that match the position of an air valve attachment hole, FIG. 25B showing the case where the augmented shapes are set at positions at the side opposite the air valve attachment hole, and FIG. 25C showing the case where the augmented shapes are provided at positions shifted by an angle $\phi$ (0°<$\theta$<180°) with respect to the direction of the position of the air valve attachment hole.

In FIG. 23, wheel 151 is comprised of a disk 152, which is fixed by bolts to an unillustrated axle shaft and receives the driving force of the axle shaft, and a rim 153, which is erected cylindrically from the edge part of disk 152 and is the portion to the outer circumferential side of which a tire is mounted. An air valve attachment hole 153a, for attachment of an air valve (not shown) for supplying compressed air into the tire, is formed on rim 153. The material of wheel 151 is comprised for example of a light alloy (aluminum alloy, etc.). The illustrated wheel 151 is of a type that is manufactured by monobloc casting (or forging) of the disk 152 and rim 152 by a mold. Generally, wheel 151 is not assembled together with the tire in the form of a net-shape part immediately after manufacture by a mold but is in many cases subject to a cutting process and polishing process of at least the outer circumferential side of rim 153, to which the tire is mounted, and the inner circumferential side of the center hole, to which the axle shaft is fitted, in order to improve the mounting precision or to a cutting process and polishing process of the front surface side (and in some cases, the rear surface side as well) of disk 152 for the purpose of burr removal, hairline imprinting, etc. for improving the aesthetic appearance, and wheel 151 is assembled together with the tire after being subject to such finishing processes.

With Embodiment 5, augmented shapes 154 or trimmed shapes 155 (see FIG. 24A) are provided in a localized manner in the condition of the net-shape part immediately after manufacture of wheel 151 by a mold, and this Embodiment is mainly characterized in being arranged so that the weight balance (static balance) of wheel 151 is adjusted by means of these augmented shapes 154 or trimmed shapes 155. That is, in the design of the mold side, recessed parts corresponding to augmented shapes 154 or protruding parts corresponding to trimmed shapes 155 are formed in a localized manner.

First, two forms, with which wheel 151 is provided with augmented shapes 154 and which differ in the shapes of the locations at which the augmented shapes are added, shall be described. With both forms, augmented shapes 154 are provided at locations that are not subject to the abovementioned finishing processes so that augmented shapes 154 will not be cut off.

A form, wherein augmented shapes 154 are provided at a decorative hole, shall now be described with reference to FIG. 23.

In FIG. 23, disk 152 has a plurality of decorative holes 156 (five in the case of the type illustrated), which serve both a decorative function and the function of releasing the brake heat, formed at equal intervals in the circumferential direction. With the present form, augmented shapes 154 are provided at the inner peripheral surface of such a decorative hole 156. To be specific, augmented shapes 154 are provided at the inner circumferential surface of one decorative hole (with the present form, the decorative hole, at which air valve attachment hole 153a is positioned and is provisionally indicated by the symbol 156a) among the plurality of decorative holes 156. With this form, each decorative hole 156 has a substantially triangular shape with the apex at the side closer to the center of disk 152, and augmented shapes 154 are provided as a left and right pair at the other two corner parts of decorative hole 156a (though obviously the augmented shapes may be provided at the apex corner part or at the side portions, the augmented shapes are preferably provided close to rim 153 for the purpose of effective balance adjustment). The imaginary lines shown in decorative hole 156a in FIG. 23A illustrate the case where augmented shapes 154 are not provided, that is, illustrate the case where decorative hole 156a has the same shape as the other decorative holes 156.

In consideration of the scattering of the weight balance due to manufacturing errors of the mold, the weight of augmented shapes 154 is set to a value that exceeds this scattering, for example, 20 to 50 g. The heavy point of wheel 151 in the net-shape part condition will thus be positioned in the direction in which augmented shapes 154 are provided, in other words, in the direction that passes through the central part of decorative hole 156a (with the present form, the direction in which air valve attachment hole 153a is positioned). As has been mentioned above, the weight of augmented shapes 154 is a minute weight of approximately 20 to 50 g and the volume required therefor is extremely small. Decorative hole 156a can thus be made to have a shape with which the differences between the other decorative holes 156 are unrecognizable, and the outer appearance will therefore not be damaged.

A form, with which augmented shapes 154 are provided at the recessed parts of the rear surfaces of spokes, shall now be described with reference to FIG. 24.

There are many cases where a recessed part 158, for the purpose of lightening of the axial weight and securing of strength, is formed on the rear surface side of a so-called spoke 157, which is extended in the radial direction between adjacent decorative holes 156. With the present form, an augmented shape 154 is provided at the inner wall surface of this recessed part 158. In the case where a recessed part 158 is not formed or finishing of the rear surface is not performed, an augmented shape 154 can be provided on the rear surface part of spoke 157 as it is. However, in this case, caution is required in design so as to avoid interference with the brake caliper, and if a recessed part is provided in such a case, it is effective to form an augmented shape 154 on the inner wall surface of a recessed part 158, which does not require finishing and which will not interfere with the brake caliper. As with the form described above, the form illustrated in the present Figure has an arrangement where the heavy point is matched with air valve attachment hole 153a, and augmented shapes 154 are provided at symmetric positions of the left and right recessed parts 158 (indicated provisionally by the symbol 158a) that sandwich the air valve attachment hole 153a.

The weight of augmented shapes 154 is determined in consideration of the scattering of the weight balance due to manufacturing errors of the mold in the case of the present form as well. The heavy point of wheel 151 in the condition of the net-shape part is thus put in the direction in which augmented shapes 154 are provided, and in the case of the present form, the heavy point is positioned in the direction in which air valve attachment hole 153a is formed. With the present form, since augmented shapes 154 are provided at the rear surface side of disk 152 that will not be visible, the outer appearance does not have to be considered as in the above-described form and the merit of greater degree of freedom of design is thus provided.

A form, with which a trimmed shapes 155 are provided on a wheel 151 shall now be described with reference to FIG. 24.

Though in the case of the abovementioned augmented shapes 154, the heavy point will obviously be positioned at the side at which the augmented shapes are provided, in the case where trimmed shapes 155 are provided, the heavy point will be positioned at a location that is 180 degrees opposite about the center of disk 152. As shown in FIG. 24 for example, at a recessed part 158 (provisionally indicated by the symbol 158a) at the position that opposes air valve attachment hole 153a across the center of disk 152, a recess (indicated by imaginary lines), which is greater than the other recessed parts 158, is formed as trimmed shapes 155.

The weight of the air valve attachment hole 153a side will thus be increased relatively and the heavy point of wheel 151 will be positioned at the air valve attachment-hole 153a side. However, in the case where trimmed shapes 155 are formed, since a considerable volume is required in order to realize a balance adjustment effect that is equivalent to the forming of augmented shapes 154, caution is needed in design.

In the case where the above-described augmented shapes 154 are provided, there will be, in general, the following three patterns concerning the positions at which augmented shapes 154 are added with regard to the circumferential direction as shown in FIG. 25 (the case of trimmed shape 155 shall be omitted). These three patterns shall now be described.

The case of Pattern 1, wherein the positions at which the augmented shapes are added are matched with the position of air valve attachment hole 153a shall now be described with reference to FIG. 25A.

Pattern 1 is the pattern that was illustrated in FIG. 23 and FIG. 24. In this case, the weight of the air valve that is attached to air valve attachment hole 153a and the weight of augmented shapes 154 act in a combined manner to adjust the weight balance (static balance) of wheel 151 so that the heavy point will be positioned in the direction in which air valve adjustment hole 153a is formed. That is, even in the case where the scattering of weight distribution is large among the respective products due to manufacturing errors, etc. of wheel 151, the heavy point is positioned without fail in the direction in which air valve adjustment hole 153a is formed by the appropriate weight of augmented shapes 154 being added to the weight of the air valve. The direction of the heavy point of the wheel 151 can thus be recognized with the air valve attachment position as a guideline, and the work of adding a balance weight in the process of assembling wheel 151 and a tire together can be performed efficiently.

The case of Pattern 2, wherein the augmented shapes are provided at positions 180 degrees opposite the position of air valve attachment hole 153a across the center of the wheel, shall now be described with reference to FIG. 25B.

With Pattern 2, the position of the heavy point can be adjusted as suited by setting the weight of augmented shapes 154 appropriately. For example, by making the weight of the augmented shapes smaller than the weight of the air valve, the heavy point can be positioned closer to air valve attachment hole 153a and oppositely, by making the weight of the augmented shapes greater than the air valve, the heavy point can be positioned closer to the augmented shapes 154. In any case, the static unbalance due to the weight of augmented shapes 154 and the static unbalance due to the weight of the air valve cancel each other out to make wheel 151 low in the amount of static unbalance as a whole.

The case of Pattern 3, wherein the augmented shapes are provided at positions shifted by an angle φ (0°<θ<180°) with respect to the direction of the position of air valve attachment hole 153, shall now be described with reference to FIG. 25C.

With pattern 3, if for example the static unbalance amount due to the weight of the air valve is expressed by a vector Vm and the static unbalance amount due to the weight of augmented shapes 154, which are provided at positions corresponding to a position shifted by just an angle φ with respect to the direction of the position of air valve attachment hole 153a, is expressed by a vector Vn, the static unbalance amount of wheel 151 will have the direction and magnitude of the vector Vo, resulting from the synthesis of a vector Vm and a vector Vn. By thus setting the angle φ and the weight of augmented shapes 154 to appropriate values, wheel 151 can be made to have a heavy point comprised of a desired vector Vo.

Though Embodiment 5 of this invention has been described above, a wheel according to this invention is not limited to Embodiment 5 and can be put into practice in various forms. For example, though the embodiment has an arrangement wherein a pair of left and right augmented shapes are provided, an augmented shape may obviously be provided at a single location or augmented shapes may be provided at three or more locations. The same applies to the case of trimmed shapes. Also with regard to the structure of the wheel, this invention may be applied not only to the case of a single-piece structure but also to the case where the wheel has a two-piece structure, three-piece structure, etc. This invention is also not limited to these forms and design changes can be made as suitable within a range that does not fall outside the gist of the invention.

Embodiment 6

Figure 26:
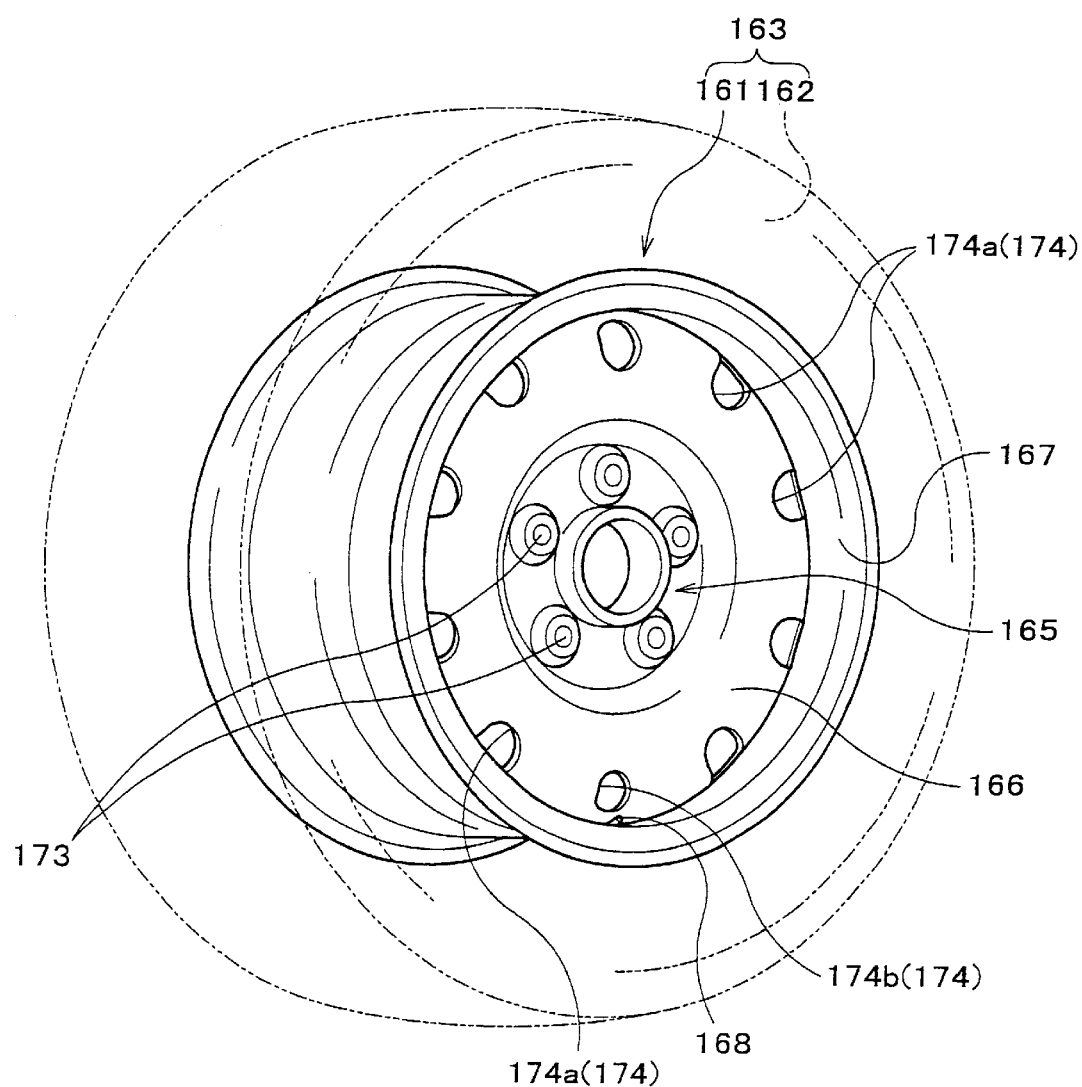
FIG. 26 is a perspective view of a balance-adjusted wheel of Embodiment 6 of this invention.
Figure 27:
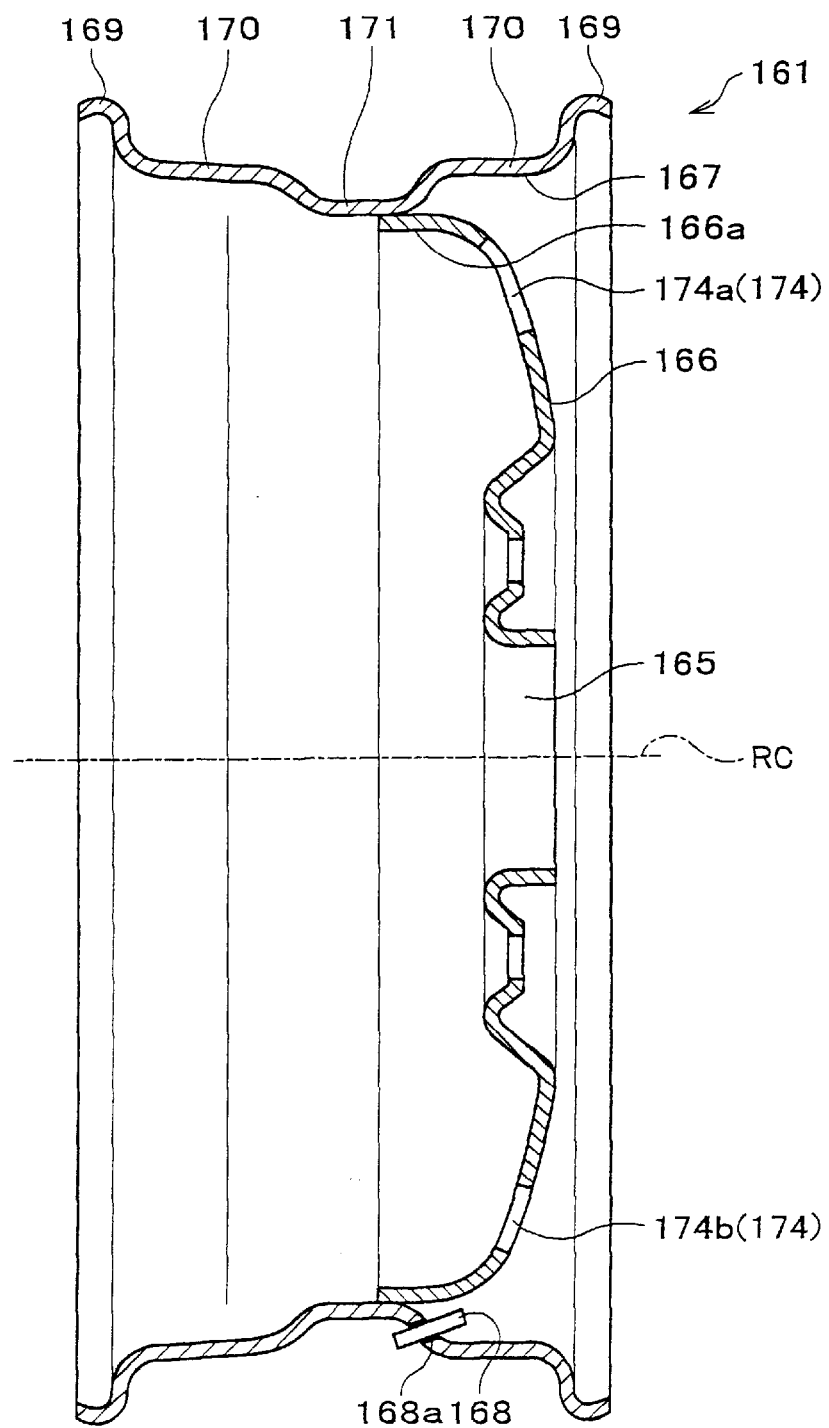
FIG. 27 is a sectional view of the wheel of FIG. 26.
Figure 28:
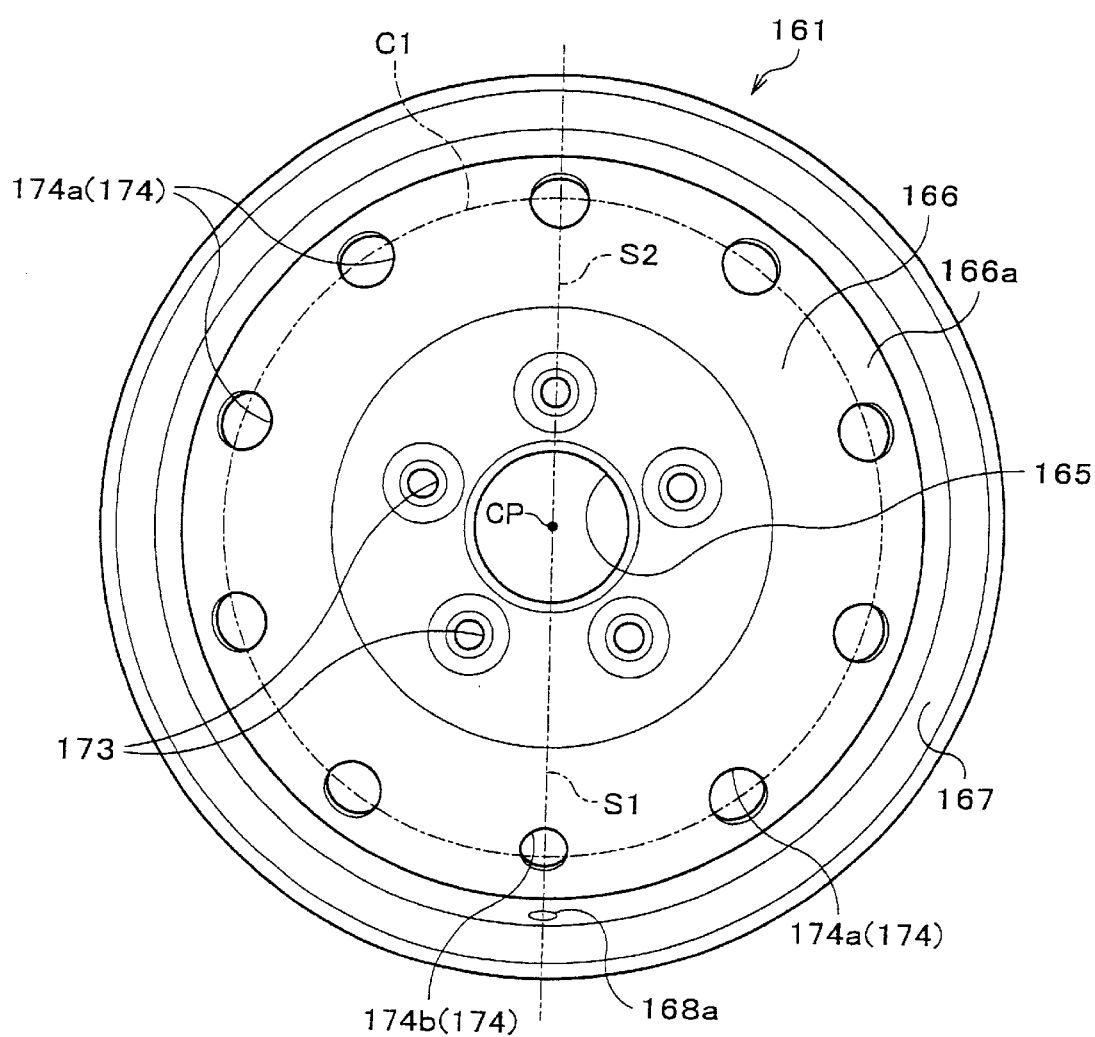
FIG. 28 is a front view of the wheel of FIG. 26.
Figure 29:
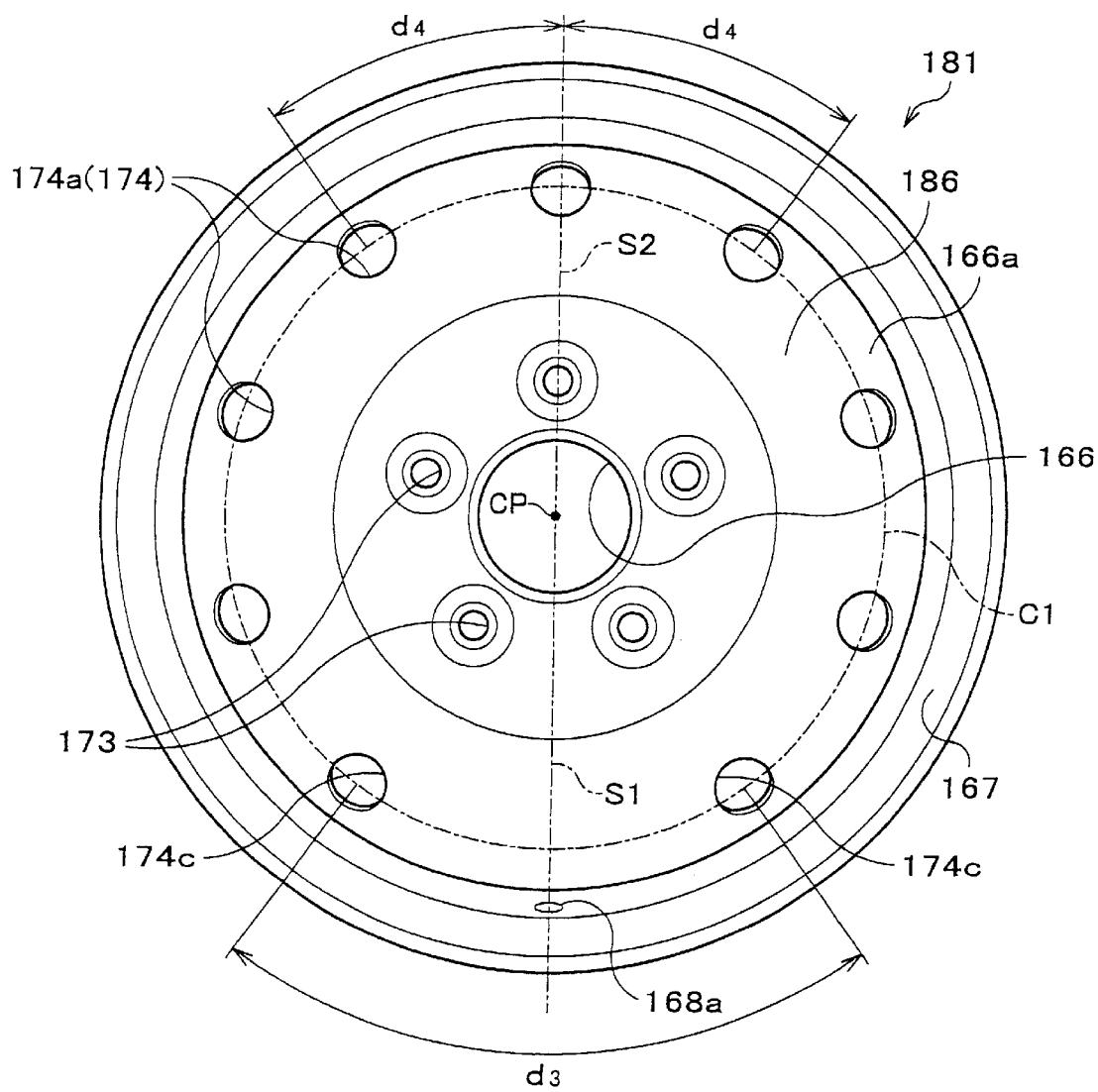
FIG. 29 is a front view of a balance-adjusted wheel of another form of Embodiment 6 of this invention.
Figure 30:
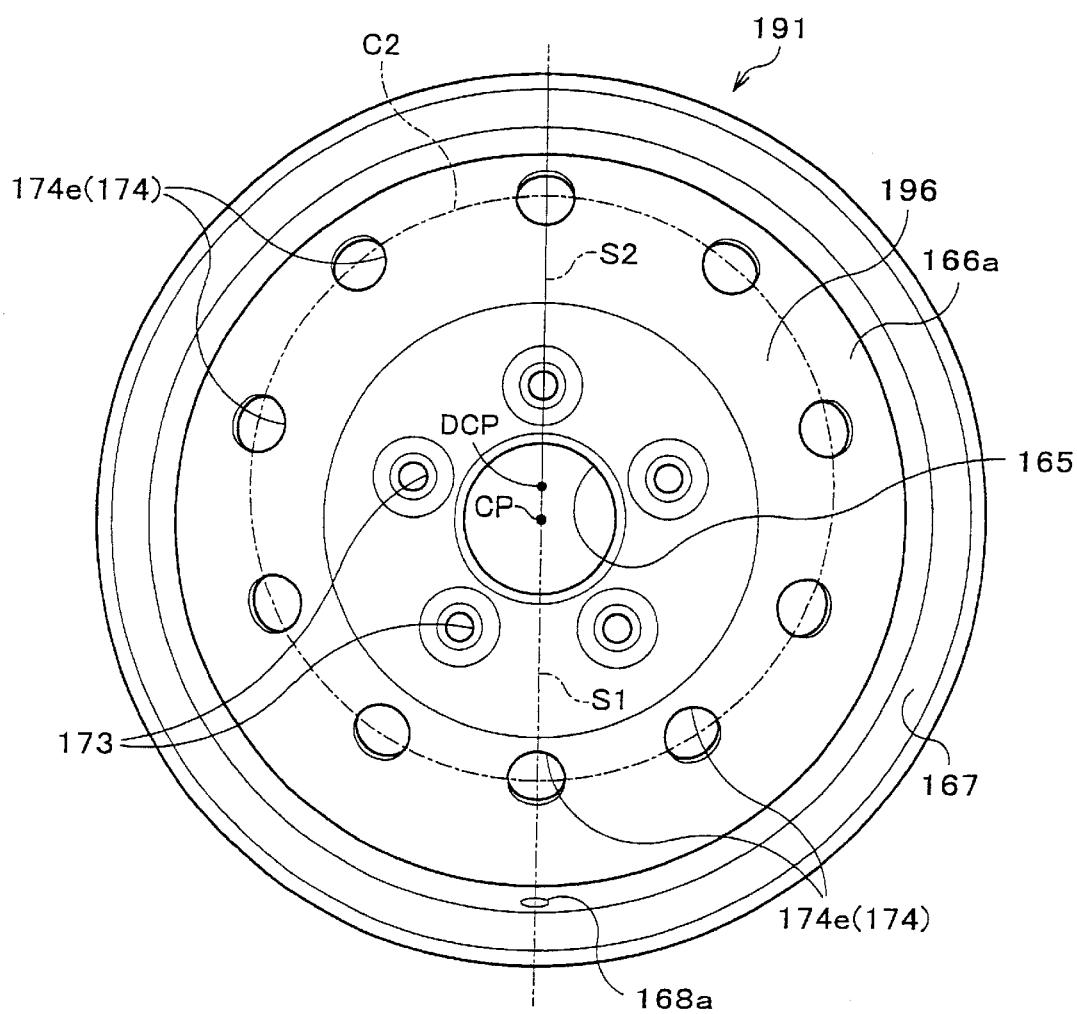
FIG. 30 is a front view of a balance-adjusted wheel of another form of Embodiment 6 of this invention.
Figure 31:
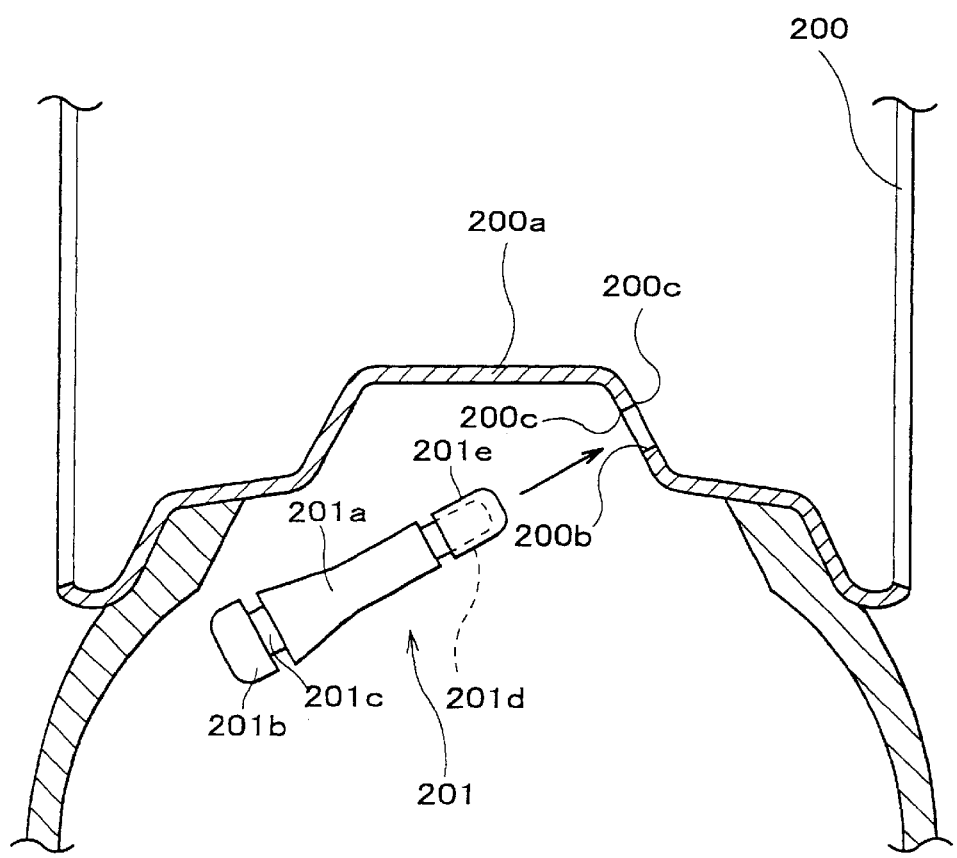
FIG. 31 is a partial sectional view of a rim for explaining the air valve attachment structure of the prior art.

As Embodiment 6, an embodiment of a wheel according to this invention shall now be described with reference to FIG. 26 through FIG. 30. FIG. 26 is a perspective view of a balance-adjusted wheel. FIG. 27 is a sectional view of the wheel of FIG. 26. FIG. 28 is a front view of the wheel of FIG. 26. FIG. 29 is a front view of a balance-adjusted wheel of another form. FIG. 30 is a front view of a balance-adjusted wheel of another form.

As shown in FIG. 26, wheel 161 of this Embodiment is assembled together with a tire 162 to form a tire/wheel assembly 163 and is used upon being fixed onto the hub of an axle shaft of a vehicle.

Here, as shown in FIG. 26 and FIG. 27, wheel 161 has a saucer-like disk 166, which has a center hole 165 at its central part for fixing onto the hub, and a cylindrical rim 167, which is fixed to the circumferential edge part 166a of disk 166 by welding, etc. Also, an air valve 168, for introduction of compressed air into the interior of tire 162, can be inserted into rim 167. Though with Embodiment 6, disk 166 and rim 167 shall be described as separate members, these may be manufactured in an integral manner by casting, etc.

As shown in FIG. 27, the end parts of rim 167 are erected to form rim flanges 169 and tire 162 is assembled onto wheel 161 by fitting the beads of tire 162 onto these rim flanges 169 and the bead seats 170 at the inner sides of rim flanges 169.

Furthermore, a well 171, which is recessed towards the rotation center axis RC, is formed on rim 167, and an air valve 168 is attached to a side part of this well 171.

As shown in FIG. 26 and FIG. 28, insertion holes 173, for fixing the hub to the vicinity of center hole 165 by means of nuts, are formed in disk 166. Also, a plurality of openings 174 are opened at the circumferential part 166a side of disk 166.

With Embodiment 6, openings 174 are round holes that pass through disk 166 and are formed so that the centers of the openings will be disposed at equal intervals along the circumference of a circle C1 centered about the center point CP of disk 166. Here, "equal intervals" signify that the distances between centers of adjacent openings 174 along the circumference of circle C1 are equal.

Openings 174 may be used as cooling holes, for releasing the friction heat generated by a disk brake provided adjacent the hub, or as decorative holes. The shape of each opening 174 is not limited to a circular hole, and the openings may be of an arbitrary shape, such as triangular, trapezoidal, etc., and the size of each opening 174 may be an arbitrary size as well.

Here, the openings shown in FIG. 28 can be classified into large-diameter openings 174a, with a large opening diameter, and a small-diameter opening 174b, which is smaller-in opening diameter than large-diameter openings 174a. In FIG. 28, small-diameter opening 174b is positioned along an imaginary segment S1 that joins the center point CP and air valve attachment hole 168a, and the rest of the openings 174 are large-diameter openings 174a. By making the opening 174 along the imaginary segment S1 a small-diameter opening 174b, the weight of this region can be made heavier than the weights of other regions by an amount corresponding to the smaller opening area. That is, when the vicinity of a large-diameter opening 174a along an imaginary segment S2, obtained by extending the imaginary segment S1 upwards from center point CP of FIG. 28, is compared with a region in the vicinity of small-diameter opening 174b along imaginary segment S1, the region at the small-diameter opening 174b side will be heavier by an amount corresponding to just the difference in opening areas. Meanwhile, the weight balance is not disrupted in other regions since the opposing pairs of openings 174 in these regions have the same opening area. Since the weight balance of disk 166 as a whole is thus shifted towards the lower side of FIG. 28, that is, towards the air valve attachment hole 168a side, the heavy point of disk 166 will be formed along imaginary segment S1. With regard to the difference in the respective opening areas of large-diameter opening 174a and small diameter opening 174b, the respective opening diameters are preferably determined so that the difference in areas will give rise to a weight difference (unbalance amount) of 20 to 50 g.

Here, though wheel 161 is formed by welding rim 167 to this disk 166 and then fixing air valve 168, since the weight balance of rim 167 is generally good, the heavy point of disk 166 will not be shifted by the welding of rim 167. Furthermore, air valve 168 is attached in the same direction as the heavy point as viewed from center point CP of wheel 161 and thus serves the role of making the heavy point position even clearer. By matching the position of formation of the heavy point position as viewed from center point CP with the position of formation of air valve attachment hole 168a of disk 166, the heavy point position can be confirmed readily in the process of the assembly work of wheel 161 and the assembly work of tire/wheel assembly 163.

When such a wheel 161 is used, since the position of the heavy point and the unbalance amount can be specified in advance and since the scattering of the heavy point position according to each wheel 161 can be reduced, the balance adjustment work in the assembly work of tire/wheel assembly 163 can be simplified. For example, it becomes possible to cancel out the unbalance amounts of wheel 161 and tire 162 by simply matching the attachment position of air valve 168 of wheel 161 with the light point of tire 162. Also, in the case where wheel 161 has a location at which the runout in the radial direction is small (minimum point of RRO) and tire 2 has a location at which the strength in the radial direction is large (maximum point of RFV), even if the static balance of tire/wheel assembly 163 is disrupted as a whole by the combination of the minimum point of RRO and the maximum point of RFV, since the heavy point position and the unbalance amount of the wheel are known, the necessary amount and attachment position of a balance weight needed to adjust the balance can be determined readily and rapidly, thus enabling the balance adjustment work in the assembly work of tire/wheel assembly 163 to be performed efficiently.

The heavy point position of wheel 161 may be made even clearer and the unbalance amount may be increased by making the small-diameter opening 174b along imaginary segment S1 have the smallest opening area, the large-diameter opening 174a along imaginary segment S2 have the greatest opening area, and the rest of the openings 174 have an intermediate area or by arranging openings 174 to have opening areas that increase in stepwise manner from the small-diameter opening 174b along imaginary segment S1 to the large-diameter opening 174a along the imaginary segment S2.

In the case where the position of formation of air valve attachment hole 168a of FIG. 28 is not matched with the position of formation of an opening 174, effects that are equivalent to the above-described effects can be obtained by making at least one opening 174, which is positioned in the vicinity of imaginary segment S1, be a small-diameter opening 174b. In this case, since the heavy point position will be modified by the weight of air valve 168 itself when air valve 168 is attached subsequently, the heavy point position may be formed at a position that is shifted in the direction centered about center point CP by approximately ±20° from imaginary segment S1.

Heavy point adjustment may also be performed by a wheel 181 as shown in FIG. 29. With this wheel 181, the distance between centers d3 of openings 174c that are adjacent each other across an imaginary segment Si is made longer than the distance between centers d4 of the other openings 174a. Here, the distances between centers d3 and d4 correspond to being the distances between centers of adjacent openings 174a and 174c as measured along the circumference of circle C1.

With the wheel 181 shown in FIG. 29, since an opening 174 is not formed in the region in the vicinity of imaginary segment Si, this region is heavier in comparison to the region in the vicinity of imaginary segment S2 that has an opening 174a. Meanwhile, in the other regions, the weight balance is not disrupted since the setting openings 174a of the same opening area are formed at positions that oppose each other across center point CP in the other regions. The weight balance of disk 186 as a whole is thus shifted towards the lower side of FIG. 29, that is, towards the air valve attachment hole 168a side and the heavy point of disk 186 is thus positioned along the imaginary segment S1.

The distance between centers d4 may be set to distances between centers that differ according to adjacent openings 174a or the opening areas of the respective openings 174a and 174c, may be varied. However, even in these cases, it is preferable to set different distances between centers as mentioned above or to set the respective opening areas of openings 174a and 174c so that an unbalance amount of 20 to 50 g will arise in the region of imaginary segment S1.

Furthermore as shown in FIG. 30, a wheel 191 may be made with which openings 174e are formed at equal intervals along the circumference of a circle C2 that is centered about a decentered point DCP at a position that lies above the center point CP of disk 196 by just a predetermined distance. The openings 174e are aligned at equal intervals along the circumference of circle C2 and the opening areas of these openings are the same With the disk 196 of such a wheel 191, the heavy point is formed in the direction in which air valve attachment hole 168a is provided. This is because decentered point DCP is positioned above center point CP of disk 196 in FIG. 30 and thus more openings 174e are formed at the upper side of disk 196. In this case, though unbalances of weight distribution occurs in directions besides the vertical direction, since the weight of the lower side becomes heavier as a whole, the heavy point will be positioned in the direction in which air valve attachment hole 168*a* is provided.

As in the above-described cases, as long as the unbalance amount of the heavy point that is formed is within the range of 20 to 50 g, the opening areas of the respective-openings 174*e* and the distances between centers of adjacent openings 174*e* may be set arbitrarily.

Though Embodiment 6 of this invention has been described above, the wheel according to this invention is not limited to Embodiment 6 and may be put into practice in various forms. For example, a recessed part, which does not pass through but is of the same diameter as opening 174, may be formed along imaginary segment S1 of wheel 181 of FIG. 29 By doing so a heavy point can be formed along imaginary segment while providing the impression that, in appearance, openings 174 are formed at equal intervals. Also, just the shape of opening 174*b*, positioned along the imaginary segment S1, may be changed. In this case, the shape of opening 174*b* must be made a shape with which the opening area will be practically reduced in comparison to the shapes of openings 174*a* of other regions. Furthermore, a spoke or plate-like member may be provided so as to cross opening 174*b* horizontally or vertically, a wire net may be provided on the open part of opening 174*b*, or a punching metal may be inserted to practically increase the weight of the region along imaginary segment S1 in comparison to the other regions. Furthermore, in the process of welding disk 166 and rim 167 together, the heavy point position of disk 166 may be shifted with respect to the position of air valve attachment hole 168*a* of rim 167 to adjust the heavy point position and unbalance amount of wheel 161 or the heavy point of disk 166 and the air valve attachment hole 168*a* of the rim 167 may be set at opposite positions so that the unbalance amounts will cancel each other out.

Industrial Applicability (1) With a tire/wheel assembly assembling method according to this invention, the RFV of a tire/wheel assembly is lessened in an assembling step and the unbalance of the tire/wheel assembly is lessened in a balance weight determination step and in a balance weight attachment step. Also with this assembling method, a balance weight can be attached to the outer peripheral surface of the rim of a wheel, based on the weight and position of the balance weight that were determined in the balance weight determination step prior to assembling the wheel and the tire together. A tire/wheel assembly that has been assembled by this assembling method will not be damaged in outer appearance due to the balance weight when the balance weight is attached to the outer peripheral surface of the rim.

Also, with a tire/wheel assembly assembling line according to this invention, the RFV of a tire/wheel assembly is lessened by an assembling process. Furthermore with this assembling line, the unbalance of the tire/wheel assembly is lessened and the unbalance measurement process and balance weight attachment process subsequent assembling are eliminated by a balance weight determination process and a balance weight attachment process. Also with this assembling line, since a balance weight can be attached to a wheel, based on the weight and position of the balance weight that were determined in the balance weight determination process, prior to the assembling process, the balance weight can be attached to the outer peripheral surface of the wheel, which becomes covered by the tire. As a result, a tire/wheel assembly that has been assembled by this assembling line will not be damaged in outer appearance due to the balance weight when the balance weight is attached to the outer peripheral surface of the rim.

(2) With a wheel and a tire/wheel assembly assembling method according to this invention, the static unbalance of the tire/wheel assembly as a whole can be minimized while minimizing the vertical runout and the generation of vibration during rotation of the tire/wheel assembly can be restrained by the simple work of assembling a tire and a wheel together upon matching the light point of the tire with the heavy point of the wheel. Since modification by a balance weight is thus made unnecessary, parts and assembly costs can be reduced and the commercial value in terms of outer appearance can be improved.

Also, with a wheel manufacturing method according to this invention, a wheel, with which the vertical runout and the static unbalance are canceled out in accordance to the manufacturing errors of each tire, can be manufactured. Furthermore, with a wheel manufacturing method according to this invention, since a wheel, having a minimum RRO amount of $-\delta$ in correspondence to the maximum RRO amount of $+\delta$ of each tire, can be made, a wheel that can cancel out the vertical runout further can be manufactured. Also, with a wheel manufacturing method of this invention, a wheel, with which the heavy point will always be in the direction of the air valve, can be manufactured to provide a guideline for phase matching for an assembly worker or assembling device that assembles a tire and a wheel together.

(3) With a wheel according to this invention, since the weights in various directions of the wheel can be adjusted by the provision of trimmed shapes and/or augmented shapes at the fitting part of a disk, the wheel can be made one with the desired balance. Moreover, since trimming or augmentation is performed on parts of the disk that is fitted with the inner surface of becomes hidden to the exterior upon being fitted to the inner surface of a rim, the wheel can be made one that is adjusted to the desired balance without affecting the outer appearance of the wheel.

Also with a wheel according to this invention, since the unbalance due to the weight of an air valve and the unbalance due to trimmed shapes or augmented shapes cancel each other out, the unbalance of the wheel as a whole can be made close to 0. As a result, a balance weight to be added after assembly with the tire can be made small and the outer appearance of the wheel can be improved.

Also with a wheel according to this invention, the unbalance due to an air valve that is attached to the rim and the unbalance due to trimmed shapes or augmented shapes combine to make the air valve direction heavy relatively, the heavy point of the wheel can be set in the air valve direction at all times. The air valve direction can thus be used as a guideline for the heavy point of the wheel and the efficiency of the work of adding a balance weight can be improved.

(4) With a wheel according to this invention, by an arrangement, wherein an annular air valve seat, which is fitted and fixed in an air valve hole bored in the rim, is provided and an air valve is attached to this air valve seat, edge treatment can be performed according to each air valve seat to enable reduction of the occupied space required for the edge treatment process and lightening of the labor burden placed on a worker. Simplification or elimination of edge treatment is also made possible.

Furthermore, with a wheel according to this invention, by arranging the air valve seat from a material with a specific gravity that is greater than that of the material of the main body of the wheel, the heavy point of static unbalance of the wheel can be matched with the air valve attachment position to enable the air valve to be made of just standard specification items to thereby make the adjustment economical and efficient in comparison to the prior-art case where the weight of the air valve itself is adjusted.

(5) With a wheel according to this invention, the wheel can economically be made to have the desired weight balance by just a partial design change of the mold for manufacturing the wheel and without damaging the outer appearance. In particular, even in the case where the scattering of the weight distribution among the respective products is large due to manufacturing errors of the wheel etc. , the heavy point of static unbalance can be matched without fail with the air valve attachment position to provide the advantage of economy and the advantage of doing away with the need for controlling a plurality of parts in comparison to the prior art method of matching the heavy point with the air valve attachment position by adjusting the weight of the air valve itself.

(6) With a wheel according to this invention, since a balance-adjusted wheel is provided by adjustment of the heavy point position of the wheel by forming of openings in the disk, the scattering of the heavy point position according to wheel is reduced significantly, and since the heavy point position and unbalance amount of the wheel are made known in advance, the efficiency of the balance adjustment work in the tire/wheel assembly assembling work can be improved. In particular, the heavy point position and unbalance amount of the wheel can be adjusted readily and without fail by making the opening area of a specific opening smaller than those of other openings, by varying the distance between centers of adjacent openings, or by shifting the center of the circle along with the openings are formed with respect to the center of the disk.

What is claimed is:

1. A tire/wheel assembly assembling method in which a tire and a wheel are assembled together, said tire/wheel assembly assembling method being comprised of a balance weight determination step, in which the weight and attachment position of a balance weight to be attached to said wheel are determined on the assumption that a minimum point of the radial runout of said wheel will be phase matched with a maximum point of the radial force variation of said tire and based on the weight and position of a heavy point of a static unbalance of said wheel and the weight and position of a light point of the static unbalance of said tire, a balance weight attachment step, in which the balance weight of the weight determined in said balance weight determination step is attached to the attachment position of said wheel that was determined in the balance weight determination step, and an assembling step, in which said wheel and said tire are assembled together upon phase matching the minimum point of the radial runout of said wheel and the maximum point of the radial force variation of said tire.

2. A tire/wheel assembly assembling line in which a tire and wheel are assembled together, said tire/wheel assembly assembling line being comprised of a wheel marking process, in which a minimum point of the radial runout of said wheel is marked, a tire marking process, in which a maximum point of the radial force variation of said tire is marked, a balance weight determination process, in which the weight and attachment position of a balance weight to be attached to said wheel are determined on the assumption that the minimum point of the radial runout of said wheel will be phase matched with the maximum point of the radial force variation of said tire and based on the weight and position of a heavy point of a static unbalance of said wheel and the weight and position of a light point of the static unbalance of said tire, a balance weight attachment process, in which the balance weight of the weight determined in said balance weight determination process is attached to the attachment position of said wheel that was determined in said balance weight determination process, and an assembling process, in which said wheel and said tire are assembled together upon phase matching said marked position of the wheel with said marked position of the tire.

* * * * *